(12) United States Patent
Goto et al.

(10) Patent No.: US 7,618,688 B2
(45) Date of Patent: Nov. 17, 2009

(54) LIQUID CRYSTAL COMPOUND HAVING LACTONE RING, LIQUID CRYSTAL COMPOSITION, AND LIQUID CRYSTAL DISPLAY DEVICE

(75) Inventors: Mayumi Goto, Ichihara (JP); Teruyo Sugiura, Ichihara (JP); Norikatsu Hattori, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 394 days.

(21) Appl. No.: 11/598,634

(22) Filed: Nov. 14, 2006

(65) Prior Publication Data

US 2007/0108410 A1    May 17, 2007

(30) Foreign Application Priority Data

Nov. 15, 2005    (JP)    ............... 2005-330186

(51) Int. Cl.
  C09K 19/34    (2006.01)
  C09K 19/30    (2006.01)
  C07D 309/16    (2006.01)
(52) U.S. Cl. ............... 428/1.1; 252/299.61; 252/299.63; 549/273
(58) Field of Classification Search ............ 252/299.61, 252/299.63; 428/1.1; 549/273
See application file for complete search history.

(56) References Cited

U.S. PATENT DOCUMENTS

| 4,818,431 A | 4/1989 | Eidenschink et al. ... | 252/299.61 |
| 5,480,580 A | 1/1996 | Sakashita et al. ....... | 252/299.61 |

FOREIGN PATENT DOCUMENTS

| EP | 0409066 A2 | 1/1991 |
| EP | 0 641 850 B1 | 3/1995 |

OTHER PUBLICATIONS

CAPLUS 1967: 472634.*
European Search Report dated Mar. 15, 2007 for related European Application No. EP 06 25 5821.

*Primary Examiner*—Shean C Wu
(74) *Attorney, Agent, or Firm*—Hogan & Hartson LLP

(57) ABSTRACT

A nematic liquid crystal compound represented by any one of formulas (a-1) to (a-6):

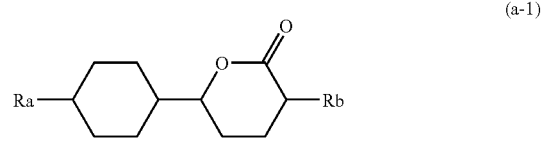

(a-1)

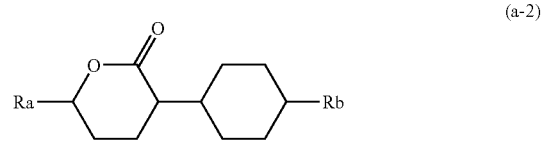

(a-2)

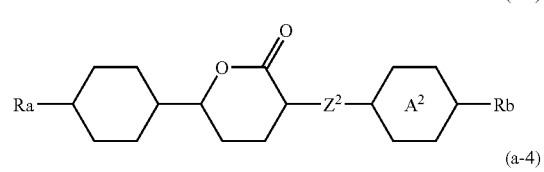

(a-3)

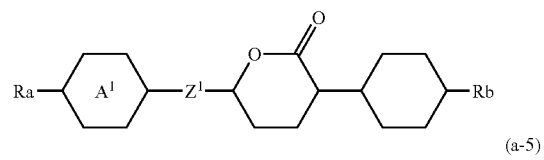

(a-4)

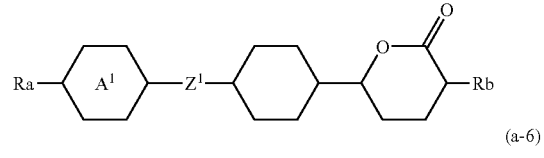

(a-5)

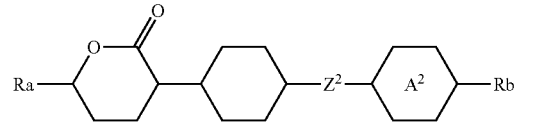

(a-6)

in formulas (a-1) to (a-6), Ra and Rb are each independently hydrogen or alkyl having 1 to 10 carbons, provided that in the alkyl, —CH2- may be replaced by —O—, —(CH2)2- may be replaced by —CH═CH—, and hydrogen may be replaced by a halogen; ring A1 and ring A2 are each independently trans-1,4-cyclohexylene or 1,4-phenylene, provided that in these rings hydrogen may be replaced by a halogen, and in the case where the ring is trans-1,4-cyclohexylene, —CH2- may be replaced by —O—, and —CH2CH— may be replaced by —CH═C—; and Z1 and Z2 are each independently a single bond, —COO—, —OCO—, —OCH2-, —CH2O— or —CH2CH2-, provided that in formula (a-3), in the case where ring A2 is trans-1,4-cyclohexylene, Z2 is a single bond, —COO—, —OCO—, —OCH2- or —CH2O—, in the case where Ra is —C3H7, Rb is —OC2H5, and Z2 is a single bond, ring A2 is trans-1,4-cyclohexylene, 1,3-dioxane-2,5-diyl, 2-fluoro-1,4-phenylene, 3-fluoro-1,4-phenylene, 2-fluoro-3-chloro-1,4-phenylene, 2-chloro-3-fluoro-1,4-phenylene or 2,3-dichloro-1,4-phenylene, and in formula (a-4), in the case where ring A1 is trans-1,4-cyclohexylene, Z1 is a single bond, —COO—, —OCO—, —OCH2O—.

15 Claims, No Drawings

FOREIGN PATENT DOCUMENTS

| | | |
|---|---|---|
| EP | 0 967 261 B1 | 12/1999 |
| JP | 59-164788 A | 9/1984 |
| JP | 3-128371 A | 5/1991 |
| JP | 7-72442 A | 3/1995 |
| JP | 2974805 B2 | 9/1999 |
| JP | 2974824 B2 | 9/1999 |
| JP | 2000-8040 | 1/2000 |
| JP | 2004-292774 A | 10/2004 |
| WO | WO 94/26720 A | 11/1994 |

* cited by examiner

LIQUID CRYSTAL COMPOUND HAVING LACTONE RING, LIQUID CRYSTAL COMPOSITION, AND LIQUID CRYSTAL DISPLAY DEVICE

CROSS REFERENCE TO RELATED APPLICATIONS

This application claims priority under 35 U.S.C. §119 to Japanese Patent Application No. JP 2005-330186, filed Nov. 15, 2005, which is expressly incorporated herein by reference in its entirety.

BACKGROUND OF THE INVENTION

1. Field of the Invention

The invention relates to a nematic liquid crystal compound having a lactone ring, a liquid crystal composition, and a liquid crystal display device.

2. Related Art

A liquid crystal display device is classified, depending on the display mode thereof, into such modes as DS (dynamic scattering), TN (twisted nematic), GH (guest host), STN (super twisted nematic), IPS (in-plane switching), VA (vertical alignment) and OCB (optically compensated bend). A liquid crystal composition contained in the liquid crystal display devices desirably has some or all of the following common characteristics in all the display modes.

(1) The composition is stable to external environmental factors, such as water, air, heat and light.

(2) The composition exhibits a liquid crystal phase in a wide temperature range centering around room temperature.

(3) The composition has a small viscosity.

(4) The composition can decrease a driving voltage upon driving the display device.

(5) The composition has an optimum dielectric anisotropy (Δ∈).

(6) The composition has an optimum optical anisotropy (Δn).

However, such a liquid crystal compound has not yet been found that satisfies all of characteristics (1) to (6) by a sole compound. Therefore, a liquid crystal composition is often obtained by mixing several kinds (e.g., a couple dozen kinds) of liquid crystal compounds. Accordingly, the liquid crystal compounds used as components of the composition necessarily have good compatibility with each other. A liquid crystal display device capable of being used in various environments, such as a very low temperature, has been demanded in recent years, and liquid crystal compounds exhibiting good compatibility at a very low temperature are thus also demanded.

In recent years, among the aforementioned display modes, such modes as IPS, VA and OCB are receiving attention as a display mode capable of overcoming a narrow viewing angle of a liquid crystal display device, which is the biggest problem of a liquid crystal display device. In particular, liquid crystal display devices of the VA mode and the IPS mode among these modes are being developed earnestly since it has excellent responsivity in addition to the wide viewing angle, and is capable of providing high-contrast display. The characteristics of the liquid crystal composition used in the liquid crystal display device of these modes reside in a negative dielectric anisotropy. It has been known that a liquid crystal composition having a large negative dielectric anisotropy can decrease the driving voltage of a liquid crystal display device containing the liquid crystal composition (as described in M. F. Leslie, *Mol. Cryst. Liq. Cryst.*, vol. 12, p. 57 (1970)).

Accordingly, liquid crystal compounds as the constitutional components of the liquid crystal composition are also demanded to have a larger negative dielectric anisotropy.

As a component of a liquid crystal composition having a negative dielectric anisotropy, various liquid crystal compounds where hydrogen at a lateral position of a benzene ring is replaced by fluorine have been investigated (as described, for example, in Japanese Patent No. 2,811,342 and JP H2-4725 A/1990). The following compound (c) (wherein R and R' are alkyls) has been reported, for example.

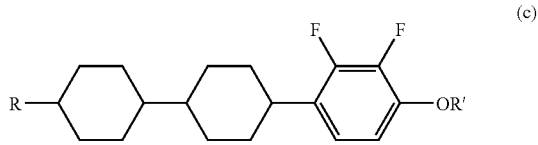

(c)

However, the compounds exemplified by the compound (c) have a negative dielectric anisotropy, but the extent thereof is not necessarily large in some cases, and therefore, the compounds are not sufficient in some cases for decreasing the driving voltage of the liquid crystal display devices of the VA mode and the IPS mode.

As a liquid crystal compound having a large negative dielectric anisotropy, the compound (d) has also been reported (as described in JP S59-10557 A/1984). The compound (d) (wherein R and R' are alkyls) has a considerably large negative dielectric anisotropy, but is not necessarily sufficient in chemical and physical stability.

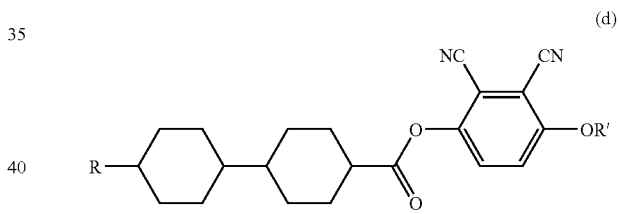

(d)

Various liquid crystal compounds having a lactone ring have been investigated (as described, for example, in JP 2004-292774 A/2004, JP S59-164788 A/1984, JP 2000-8040 A/2000, JP H9-110856 A/1997, JP H7-72442 A/1995, JP H7-133244 A/1995, JP H3-20269 A/1991, Japanese Patent No. 2,974,805, Japanese Patent No. 2,974,824, Japanese Patent No. 2,974,827 and JP H3-128371 A/1991).

For example, JP 2004-292774 A/2004 and JP S59-164788 A/1984 disclose nematic liquid crystal compounds having an aromatic ring as a ring adjacent to the lactone ring.

JP H9-110856 A/1997, JP H7-72442 A/1995, JP H7-133244 A/1995 and JP H3-128371 A/1991 disclose liquid crystal compounds having a lactone ring. However, the purpose of these compounds is a ferroelectric liquid crystal, and compounds having been tested for the advantages thereof through the working examples are liquid crystal compounds having an aromatic ring or a heterocyclic ring adjacent to the lactone ring. These compounds tend to have an increased optical anisotropy and have a problem upon use as a nematic liquid crystal.

JP H3-20269 A/1991 discloses a liquid crystal compound having a lactone ring used for a ferroelectric liquid crystal, but the ring adjacent to the lactone ring is bonded through —COO—, —O— or —CH$_2$O—. Therefore, the compound is insufficient in chemical and physical stability and has a problem upon using as a nematic liquid crystal.

JP 2000-8040 A/2000 discloses a compound apparently similar to the compounds of the invention, but the compound is disclosed merely as a synthesis intermediate.

Under the circumstances, such a liquid crystal compound is demanded that has a large negative dielectric anisotropy and that simultaneously has a suitable optical anisotropy and a high stability.

The term "liquid crystal compound" referred to herein is a generic term for a compound having a liquid crystal phase, such as a nematic phase, a smectic phase and so forth, and also for a compound having no liquid crystal phase but being useful as a component of a liquid crystal composition. The term "nematic liquid crystal compound" referred herein is a generic term for a compound having a nematic phase, and also for a compound having no nematic phase but being useful as a component of a nematic liquid crystal composition.

SUMMARY OF THE INVENTION

The inventions concerns a nematic liquid crystal compound represented by any one of formulas (a-1) to (a-6):

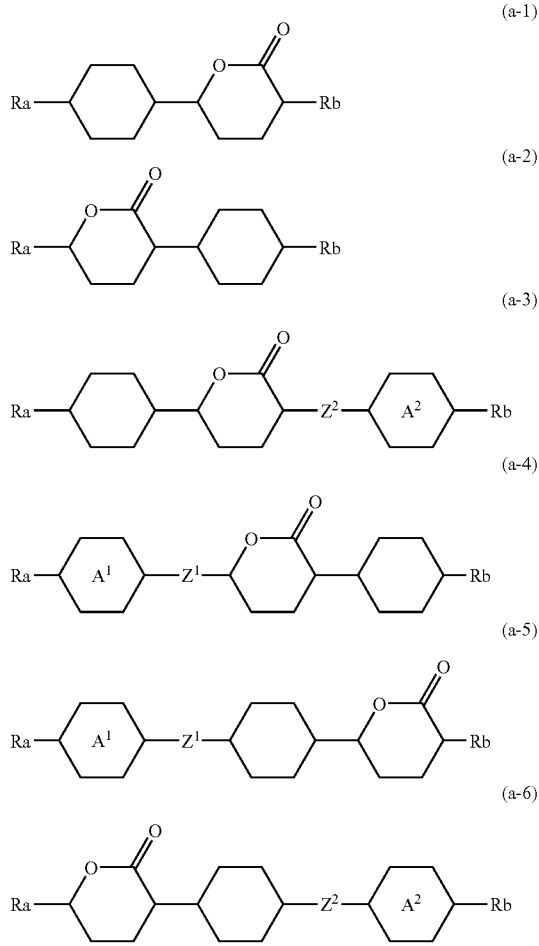

In formulas (a-1) to (a-6), Ra and Rb are independently hydrogen or alkyl having 1 to 10 carbons, provided that in the alkyl, —$CH_2$— may be replaced by —O—, —$(CH_2)_2$— may be replaced by —CH=CH—, and hydrogen may be replaced by a halogen; ring $A^1$ and ring $A^2$ are independently trans-1,4-cyclohexylene or 1,4-phenylene, provided that in these rings hydrogen may be replaced by a halogen, and in the case where the ring is trans-1,4-cyclohexylene, —$CH_2$— may be replaced by —O—, and —$CH_2CH$— may be replaced by —CH=C—; and $Z^1$ and $Z^2$ are independently a single bond, —COO—, —OCO—, —$OCH_2$—, —$CH_2O$— or —$CH_2CH_2$—, provided that in formula (a-3), in the case where ring $A^2$ is tris-1,4-cyclohexylene, $Z^2$ is a single bond, —COO—, —OCO—, —$OCH_2$— or —$CH_2O$—, in the case where Ra is —$C_3H_7$, Rb is —$OC_2H_5$, and $Z^2$ is a single bond, ring $A^2$ is trans-1,4-cyclohexylene, 1,3-dioxane-2,5-diyl, 2-fluoro-1,4-phenylene, 3-fluoro-1,4-phenylene, 2-fluoro-3-chloro-1,4-phenylene, 2-chloro-3-fluoro-1,4-phenylene or 2,3-dichloro-1,4-phenylene, and in formula (a-4), in the case where ring $A^1$ is trans-1,4-cyclohexylene, $Z^1$ is a single bond, —COO—, —OCO—, —$OCH_2$— or —$CH_2O$—.

The invention also concerns a nematic liquid crystal composition that includes the nematic liquid crystal compound, a liquid crystal display device comprising the nematic liquid crystal composition, and so forth.

DETAILED DESCRIPTION OF THE INVENTION

Reference will now be made in detail to the preferred embodiments of the invention. This invention may, however, be embodied in many different forms and should not be construed as limited to the embodiments set forth herein. In addition and as will be appreciated by one of skill in the art, the invention may be embodied as a method, system or process.

One of the advantages of the invention is to provide a liquid crystal compound that has stability to heat, light and so forth, a high clearing point, a suitable optical anisotropy, a large negative dielectric anisotropy, and excellent compatibility with other liquid crystal compounds.

Another one of the advantages of the invention is to provide a liquid crystal composition that contains the compound and has a low viscosity, a suitable optical anisotropy, a suitable negative dielectric anisotropy, a low threshold voltage, a high maximum temperature of a nematic phase (phase transition temperature from a nematic phase to an isotropic phase), and a low minimum temperature of a nematic phase.

Still another one of the advantages of the invention is to provide a liquid crystal display device that contains the composition, has a short response time, a small electric power consumption, a small driving voltage and a large contrast, and is capable of being used in a wide temperature range.

It has been found that a particular liquid crystal compound having a lactone ring and a cyclohexane ring bonded through a single bond or —$CH_2CH_2$— has stability to heat, light and so forth, a suitable optical anisotropy, a large negative dielectric anisotropy and excellent compatibility with other liquid crystal compounds; a liquid crystal composition containing the compound has a small viscosity, a suitable optical anisotropy, a suitable negative dielectric anisotropy, a low threshold voltage, a high maximum temperature of a nematic phase, and a low minimum temperature of a nematic phase; and a liquid crystal display device containing the composition has a short response time, a small electric power consumption, a small driving voltage and a large contrast, and is capable of being used in a wide temperature range, and such an intermediate compound has been found that has stability to heat, light and so forth, is capable of being applied to a wide variety of reactions, and is capable of producing the liquid crystal compound of the invention.

The invention includes the following features:

1. A nematic liquid crystal compound represented by any one of formulas (a-1) to (a-6):

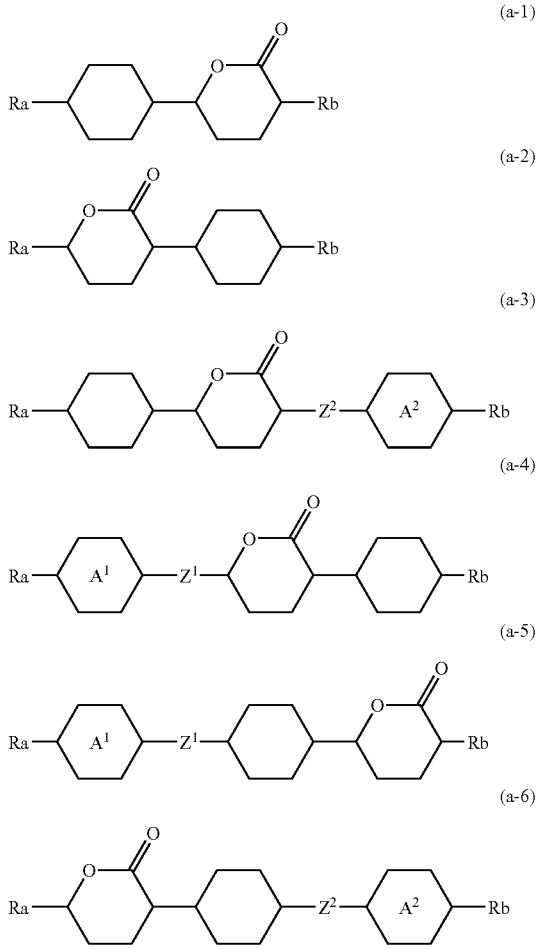

In formulas (a-1) to (a-6), Ra and Rb are each independently hydrogen or alkyl having 1 to 10 carbons, provided that in the alkyl, —CH$_2$— may be replaced by —O—, —(CH$_2$)$_2$— may be replaced by —CH=CH—, and hydrogen may be replaced by a halogen; ring A$^1$ and ring A$^2$ are each independently trans-1,4-cyclohexylene or 1,4-phenylene, provided that in these rings hydrogen may be replaced by a halogen, and in the case where the ring is trans-1,4-cyclohexylene, —CH$_2$— may be replaced by —O—, and —CHCH— may be replaced by —CH=C—; and Z$^1$ and Z$^2$ are each independently a single bond, —COO—, —OCO—, —OCH$_2$—, —CH$_2$O— or —CH$_2$CH$_2$—, provided that in formula (a-3), in the case where ring A$^2$ is trans-1,4-cyclohexylene, Z$^2$ is a single bond, —COO—, —OCO—, —OCH$_2$— or —CH$_2$O—, in the case where Ra is —C$_3$H$_7$, Rb is —OC$_2$H$_5$, and Z$^2$ is a single bond, ring A$^2$ is trans-1,4-cyclohexylene, 1,3-dioxane-2,5-diyl, 2-fluoro-1,4-phenylene, 3-fluoro-1,4-phenylene, 2-fluoro-3-chloro-1,4-phenylene, 2-chloro-3-fluoro-1,4-phenylene or 2,3-dichloro-1,4-phenylene, and in formula (a-4), in the case where ring A$^1$ is trans-1,4-cyclohexylene, Z$^1$ is a single bond, —COO—, —OCO—, —OCH$_2$— or —CH$_2$O—.

2. The nematic liquid crystal compound according to item 1, wherein the compound is represented by formula (a-1) or (a-2), and wherein Ra and Rb are each independently hydrogen, alkyl having 1 to 10 carbons or alkoxy having 1 to 9 carbons.

3. The nematic liquid crystal compound according to item 1, wherein the compound is represented by formula (a-1) or (a-2), and wherein Ra and Rb are each independently hydrogen or alkyl having 1 to 10 carbons.

4. The nematic liquid crystal compound according to item 1, wherein the compound is represented by formula (a-3), (a-4), (a-5) or (a-6), and wherein Z$^1$ or Z$^2$ is a single bond.

5. The nematic liquid crystal compound according to item 1, wherein the compound is represented by formula (a-3), (a-4), (a-5) or (a-6), and wherein ring A$^1$ or ring A$^2$ is 1,4-cyclohexylene.

6. The nematic liquid crystal compound according to item 1, wherein the compound is represented by formula (a-3), (a-4), (a-5) or (a-6), wherein Z$^1$ or Z$^2$ is a single bond, and ring A$^1$ or ring A$^2$ is 1,4-cyclohexylene.

7. The nematic liquid crystal compound according to item 1, wherein the compound is represented by formula (a-3), (a-4), (a-5) or (a-6), wherein Ra and Rb are each independently hydrogen or alkyl having 1 to 10 carbons, Z$^1$ or Z$^2$ is a single bond, and ring A$^1$ or ring A$^2$ is 1,4-cyclohexylene.

8. The nematic liquid crystal compound according to item 1, wherein the compound is represented by formula (a-3), (a-4), (a-5) or (a-6), and wherein ring A$^1$ or ring A$^2$ is 1,4-phenylene, arbitrary hydrogen of which may be replaced by a halogen.

9. The nematic liquid crystal compound according to item 1, wherein the compound is represented by formula (a-3), (a-4), (a-5) or (a-6), wherein Z$^1$ or Z$^2$ is a single bond, and ring A$^1$ or ring A$^2$ is 1,4-phenylene, arbitrary hydrogen of which may be replaced by a halogen.

10. The nematic liquid crystal compound according to item 1, wherein the compound is represented by formula (a-3), (a-4), (a-5) or (a-6), wherein Ra and Rb are each independently hydrogen or alkyl having 1 to 10 carbons, Z$^1$ or Z$^2$ is a single bond, and ring A$^1$ or ring A$^2$ is 1,4-phenylene, arbitrary hydrogen of which may be replaced by a halogen.

11. A nematic liquid crystal compound represented by any one of formulas (b-1) to (b-6):

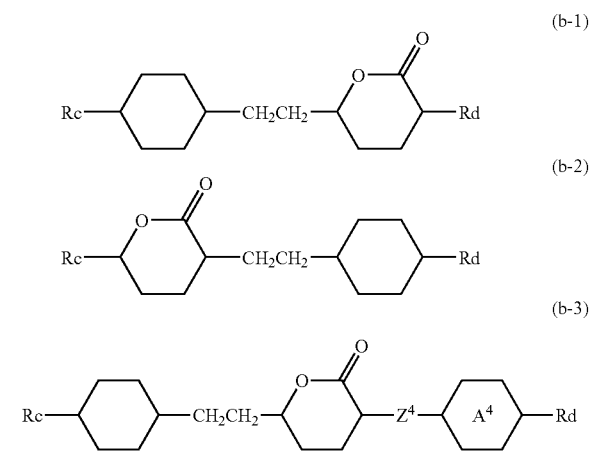

-continued (b-4)
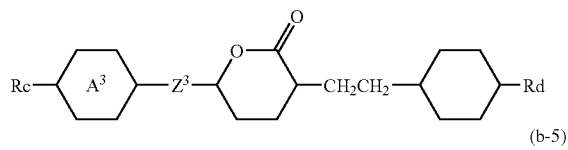

(b-5)
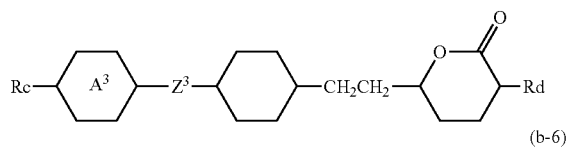

(b-6)
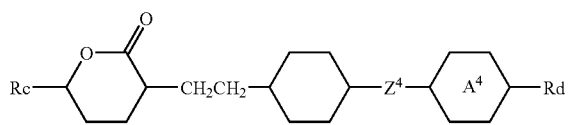

In formulas (b-1) to (b-6), Rc and Rd are each independently hydrogen, a halogen or alkyl having 1 to 10 carbons, provided that in the alkyl, —CH₂— may be replaced by —O—, —(CH₂)₂— may be replaced by —CH=CH—, and hydrogen may be replaced by a halogen; ring A³ and ring A⁴ are each independently trans-1,4-cyclohexylene or 1,4-phenylene, provided that in these rings hydrogen may be replaced by a halogen, and in the case where the ring is trans-1,4-cyclohexylene, —CH₂— may be replaced by —O—, and —CH₂CH— may be replaced by —CH=C—; and Z³ and Z⁴ are each independently a single bond, —COO—, —OCO—, —OCH2-, —CH2O— or —CH2CH2-, provided that in formula (b-2), in the case where Rc is —C₄H₉, Rd is alkyl having 1 to 10 carbons or alkoxy having 1 to 4 or 6 to 9 carbons.

12. The nematic liquid crystal compound according to item 11, wherein the compound is represented by formula (b-1) or (b-2), and Rc and Rd are each independently hydrogen, alkyl having 1 to 10 carbons or alkoxy having 1 to 9 carbons.

13. The nematic liquid crystal compound according to item 11, wherein the compound is represented by formula (b-1) or (b-2), and wherein Rc and Rd are each independently hydrogen or alkyl having 1 to 10 carbons.

14. The nematic liquid crystal compound according to item 11, wherein the compound is represented by formula (b-3), (b-4), (b-5) or (b-6), and wherein Z³ or Z⁴ is a single bond.

15. The nematic liquid crystal compound according to item 11, wherein the compound is represented by formula (b-3), (b-4), (b-5) or (b-6), and wherein ring A³ or ring A⁴ is 1,4-cyclohexylene.

16. The nematic liquid crystal compound according to item 11, wherein the compound is represented by formula (b-3), (b-4), (b-5) or (b-6), wherein Z³ or Z⁴ is a single bond, and ring A³ or ring A⁴ is 1,4-cyclohexylene.

17. The nematic liquid crystal compound according to item 11, wherein the compound is represented by formula (b-3), (b-4), (b-5) or (b-6), wherein Rc and Rd are each independently hydrogen or alkyl having 1 to 10 carbons, Z³ or Z⁴ is a single bond, and ring A³ or ring A⁴ is 1,4-cyclohexylene.

18. The nematic liquid crystal compound according to item 11, wherein the compound is represented by formula (b-3), (b-4), (b-5) or (b-6), and wherein ring A³ or ring A⁴ is 1,4-phenylene, arbitrary hydrogen of which may be replaced by a halogen.

19. The nematic liquid crystal compound according to item 11, wherein the compound is represented by formula (b-3), (b-4), (b-5) or (b-6), wherein Z³ or Z⁴ is a single bond, and ring A³ or ring A⁴ is 1,4-phenylene, arbitrary hydrogen of which may be replaced by a halogen.

20. The nematic liquid crystal compound according to item 11, wherein the compound is represented by formula (b-3), (b-4), (b-5) or (b-6), wherein Rc and Rd are each independently hydrogen or alkyl having 1 to 10 carbons, Z³ or Z⁴ is a single bond, and ring A³ or ring A⁴ is 1,4-phenylene, arbitrary hydrogen of which may be replaced by a halogen.

21. A nematic liquid crystal composition that includes at least one compound selected from the group of compounds according any one of items 1 to 20.

22. The nematic liquid crystal composition according to item 21, wherein the composition further includes at least one compound selected from the group of compounds represented by formulas (1), (2), (3), (4), (5), (6), (7), (8) and (9):

(1)
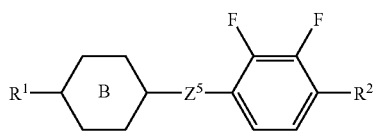

(2)
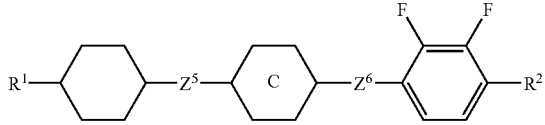

(3)
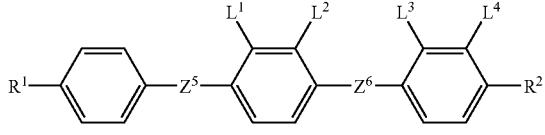

(4)
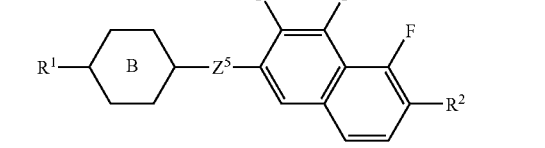

(5)
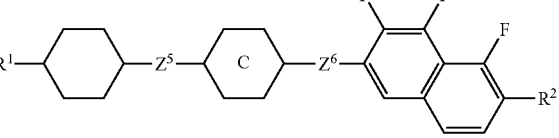

(6)
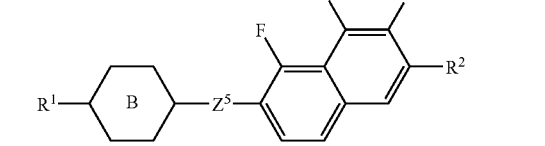

(7)
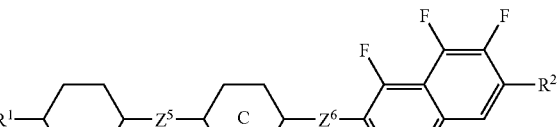

-continued

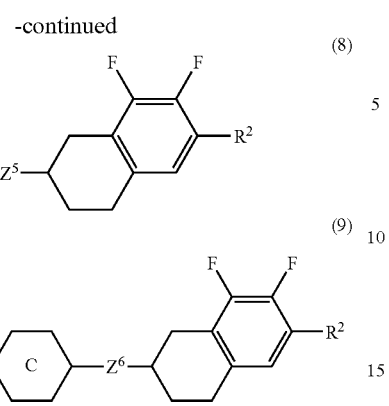

In formulas (1) to (9), $R^1$ and $R^2$ are each independently alkyl having 1 to 10 carbons, provided that in the alkyl, —$CH_2$— may be replaced by —O—, —$(CH_2)_2$— may be replaced by —CH=CH—, and hydrogen may be replaced by fluorine, and $R^1$ may be fluorine; ring B and ring C are each independently 1,4-cyclohexylene, 1,4-phenylene or decahydro-2,6-naphthylene; $Z^5$ and $Z^6$ are each independently —$(CH_2)_2$—, —COO— or a single bond; and $L^1$, $L^2$, $L^3$ and $L^4$ are each independently hydrogen or fluorine, provided that at least one of $L^1$, $L^2$, $L^3$ and $L^4$ is hydrogen.

23. The nematic liquid crystal composition according to item 21, wherein the composition further includes at least one compound selected from the group of compounds represented by formulas (10), (11) and (12):

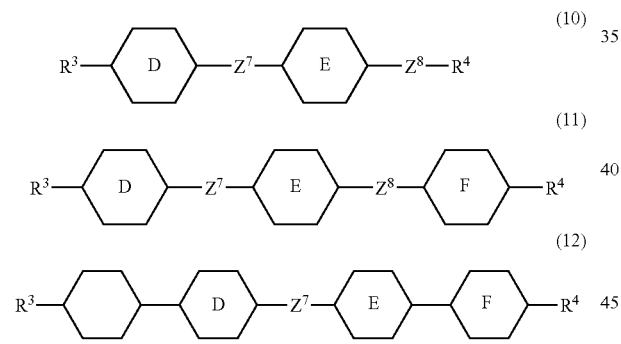

In formulas (10) to (12), $R^3$ and $R^4$ are each independently alkyl having 1 to 10 carbons, provided that in the alkyl, —$CH_2$— may be replaced by —O—, —$(CH_2)_2$— may be replaced by —CH=CH—, and hydrogen may be replaced by fluorine; ring D, ring E and ring F are each independently 1,4-cyclohexylene, pyrimidine-2,5-diyl, or 1,4-phenylene, arbitrary hydrogen of which may be replaced by fluorine; and $Z^7$ and $Z^8$ are each independently —C≡C—, —COO—, —$(CH_2)_2$—, —CH=CH— or a single bond.

24. The nematic liquid crystal composition according to item 22, wherein the composition further includes at least one compound selected from the group of compounds represented by formulas (10), (11) and (12) in item 23.

25. The nematic liquid crystal composition according to any one of items 21 to 24, wherein the composition further includes at least one optically active compound.

26. A liquid crystal display device that includes the nematic liquid crystal composition according to any one of items 21 to 25.

According to the invention, a liquid crystal compound is obtained that has stability to heat, light and so forth, a high clearing point, a suitable optical anisotropy, a large negative dielectric anisotropy, and excellent compatibility with other liquid crystal compounds. According to the invention, furthermore, a liquid crystal composition is obtained that has a low viscosity, a suitable optical anisotropy, a suitable negative dielectric anisotropy, a low threshold voltage, a high maximum temperature of a nematic phase, and a low minimum temperature of a nematic phase. According to the invention, moreover, a liquid crystal display device is obtained that has a short response time, a small electric power consumption, a small driving voltage and a large contrast, and is capable of being used in a wide temperature range.

The liquid crystal compound of the invention is a nematic liquid crystal compound having a lactone ring and a cyclohexane ring in the molecule thereof, the details of which are shown below.

Liquid Crystal Compounds (a-1) to (a-6)

A first embodiment of the liquid crystal compound of the invention includes the compounds represented by formulas (a-1) to (a-6) shown below (hereinafter, referred to as liquid crystal compounds (a-1) to (a-6) in some cases). The liquid crystal compounds (a-1) to (a-6) are bicyclic or tricyclic compounds having a lactone ring and a cyclohexane ring, in which the lactone ring and the cyclohexane ring are bonded through a single bond, and having hydrogen or an alkyl group having 10 or less carbons at the end of the compound.

The liquid crystal compound is useful as a nematic liquid crystal compound owing to the aforementioned structure. The liquid crystal compound exhibits excellent stability to heat, light and so forth, has a high clearing point, has an optical anisotropy in a suitable range of preferably approximately 0.120 or less, and more preferably from approximately −0.020 to approximately 0.110, has a negative dielectric anisotropy in a suitable range of preferably approximately −3 or less, and more preferably from approximately −12 to approximately −4, and exhibits excellent compatibility with other liquid crystal compounds.

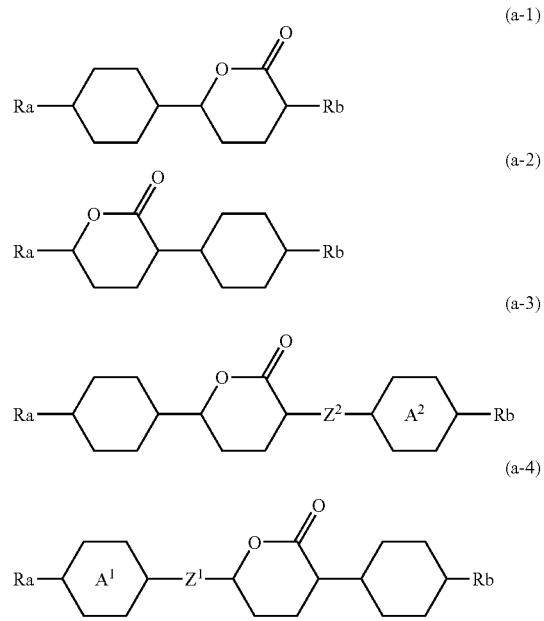

-continued

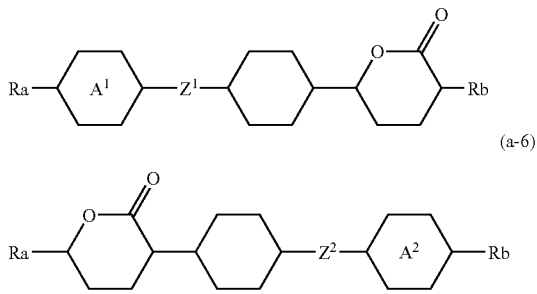

(a-5)

(a-6)

In the liquid crystal compounds (a-1) to (a-6), Ra and Rb are each independently hydrogen or alkyl having 1 to 10 carbons, and in the alkyl, —$CH_2$— may be replaced by —O—, and —$(CH_2)_2$— may be replaced by —CH=CH—.

Examples of Ra and Rb include hydrogen, alkyl having 1 to 10 carbons, alkoxy having 1 to 9 carbons, alkoxyalkyl having 2 to 9 carbons, alkoxyalkoxy having 2 to 8 carbons, alkenyl having 2 to 10 carbons, alkenyloxy having 2 to 9 carbons, alkenyloxyalkyl having 3 to 9 carbons and alkoxyalkenyl having 3 to 9 carbons. The alkyl chain in these groups is preferably linear alkyl. In the case where the alkyl is linear alkyl, the temperature range of the liquid crystal phase can be widened, and the viscosity can be decreased.

One or more hydrogen in these groups may be replaced by a halogen, and the halogen for replacing hydrogen is preferably fluorine and chlorine.

Ra and Rb are preferably alkyl, alkoxy, alkoxyalkyl, alkenyl, fluoroalkyl or fluoroalkoxy, more preferably alkyl, alkoxy, alkoxyalkyl or alkenyl, and further preferably alkyl, alkoxy or alkenyl. The configuration of the alkenyl is preferably a trans configuration.

Examples of the alkyl include —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$ and —$C_{10}H_{21}$.

Examples of the alkoxy include —$OCH_3$, —$OC_2H_5$, —$OC_3H_7$, —$OC_4H_9$, —$OC_5H_{11}$, —$OC_6H_{13}$, —$OC_7H_{15}$, —$OC_8H_{17}$ and —$OC_9H_{19}$.

Examples of the alkenyl include —CH=$CH_2$, —CH=$CHCH_3$, —$CH_2$CH=$CH_2$, —CH=$CHC_2H_5$, —$CH_2$CH=$CHCH_3$, —$(CH_2)_2$CH=$CH_2$, —CH=$CHC_3H_7$, —$CH_2$CH=$CHC_2H_5$, —$(CH_2)_2$CH=$CHCH_3$ and —$(CH_2)_3$CH=$CH_2$.

Examples of the alkenyloxy include —$OCH_2$CH=$CH_2$, —$OCH_2$CH=$CHCH_3$ and —$OCH_2$CH=$CHC_2H_5$.

Examples of the alkyl in which hydrogen is replaced by a halogen include —$CH_2$F, —$CHF_2$, —$CF_3$, —$(CH_2)_2$F, —$CF_2CH_2$F, —$CF_2CHF_2$, —$CH_2CF_3$, —$CF_2CF_3$, —$(CH_2)_3$F, —$(CF_2)_2CF_3$, —$CF_2$CHFCF$_3$ and —CHFCF$_2$CF$_3$.

Examples of the alkoxy in which hydrogen is replaced by a halogen include —$OCF_3$, —$OCHF_2$, —$OCH_2$F, —$OCF_2CF_3$, —$OCF_2CHF_2$, —$OCF_2CH_2$F, —$OCF_2CF_2CF_3$, —$OCF_2$CHFCF$_3$ and —OCHFCF$_2$CF$_3$.

Examples of the alkenyl in which hydrogen is replaced by a halogen include —CH=CHF, —CH=$CF_2$, —CF=CHF, —CH=$CHCH_2$F, —CH=$CHCF_3$ and —$(CH_2)_2$CH=$CF_2$.

Among these groups for Ra and Rb, —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$OCH_3$, —$OC_2H_5$, —$OC_3H_7$, —$OC_4H_9$, —$OC_5H_{11}$, —$OC_6H_{13}$, —$OC_7H_{15}$, —$OC_8H_{17}$ and —$OC_9H_{19}$ are preferred.

In the liquid crystal compounds (a-1) to (a-6), ring $A^1$ and ring $A^2$ are each independently trans-1,4-cyclohexylene or 1,4-phenylene, and in these rings hydrogen may be replaced by a halogen. In the case where the ring is trans-1,4-cyclohexylene, —$CH_2$— may be replaced by —O—, and —$CH_2$CH— may be replaced by —CH=C—.

In the case where the rings are trans-1,4-cyclohexylene, the optical anisotropy can be decreased, and the viscosity can be decreased. In the case where the liquid crystal compound is added to a liquid crystal composition, the maximum temperature of the nematic phase of the composition can be increased.

In the case where the rings are 1,4-phenylene, hydrogen of which may be replaced by a halogen, the optical anisotropy can be relatively increased, and the orientational order parameter can be increased.

Among these groups for ring $A^1$ and ring $A^2$, trans-1,4-cyclohexylene, 1,4-cyclohexenylene, 1,3-dioxane-2,5-diyl, 1,4-phenylene, 2-fluoro-1,4-phenylene, 3-fluoro-1,4-phenylene, 2,3-difluoro-1,4-phenylene, 2-fluoro-3-chloro-1,4-phenylene, 2-chloro-3-fluoro-1,4-phenylene and 2,3-dichloro-1,4-phenylene are preferred, and trans-1,4-cyclohexylene, 1,4-phenylene, 2-fluoro-1,4-phenylene, 3-fluoro-1,4-phenylene and 2,3-difluoro-1,4-phenylene are more preferred.

In the liquid crystal compounds (a-1) to (a-6), $Z^1$ and $Z^2$ are each independently a single bond, —COO—, —OCO—, —$OCH_2$—, —$CH_2O$— or —$CH_2CH_2$—. Among these groups, a single bond is preferred for widening the temperature range of the liquid crystal phase and for decreasing the viscosity.

In formula (a-3), in the case where ring $A^2$ is trans-1,4-cyclohexylene, $Z^2$ is a single bond, —COO—, —OCO—, —$OCH_2$— or —$CH_2O$—. In formula (a-3), in the case where Ra is —$C_3H_7$, Rb is —$OC_2H_5$, and $Z^2$ is a single bond, ring $A^2$ is trans-1,4-cyclohexylene, 1,3-dioxane-2,5-diyl, 2-fluoro-1,4-phenylene, 3-fluoro-1,4-phenylene, 2-fluoro-3-chloro-1,4-phenylene, 2-chloro-3-fluoro-1,4-phenylene or 2,3-dichloro-1,4-phenylene.

In formula (a-4), in the case where ring $A^1$ is trans-1,4-cyclohexylene, $Z^1$ is a single bond, —COO—, —OCO—, —$OCH_2$— or —$CH_2O$—.

The liquid crystal compounds (a-1) to (a-6) can be adjusted in such characteristics as optical anisotropy, dielectric anisotropy and so forth by appropriately selecting the end groups Ra and Rb, the rings $A^1$ and $A^2$, and the bonding groups $Z^1$ and $Z^2$, within the aforementioned ranges.

In the liquid crystal compounds (a-1) and (a-2), in the case where Ra and Rb are each independently hydrogen, alkyl having 1 to 10 carbons or alkoxy having 1 to 9 carbons, there is a tendency that the compatibility is improved. Particularly, in the case where Ra and Rb are each independently hydrogen or alkyl having 1 to 10 carbons, the tendency becomes remarkable.

In the liquid crystal compounds (a-3), (a-4), (a-5) and (a-6), in the case where $Z^1$ or $Z^2$ is a single bond, there is a tendency that the clearing point is increased.

The clearing point referred herein is a temperature at which a liquid crystal compound transfers from a certain phase to an isotropic phase, and is specifically phase transition temperatures from a nematic phase to an isotropic phase, from a smectic phase to an isotropic phase, and from a crystalline phase to an isotropic phase.

In the liquid crystal compounds (a-3), (a-4), (a-5) and (a-6), in the case where Ra and Rb are each independently hydrogen or alkyl having 1 to 10 carbons, there is a tendency that the clearing point is increased.

In the liquid crystal compounds (a-3), (a-4), (a-5) and (a-6), in the case where ring $A^1$ or ring $A^2$ is 1,4-cyclohexylene, there is a tendency that the optical anisotropy is decreased, and there is a tendency that the clearing point is increased.

In the liquid crystal compounds (a-3), (a-4), (a-5) and (a-6), in the case where ring $A^1$ or ring $A^2$ is 1,4-phenylene, arbitrary hydrogen of which may be replaced by a halogen, there is a tendency that the optical anisotropy is increased, and there is a tendency that the clearing point is increased.

Among the liquid crystal compounds (a-1) to (a-6), compounds represented by formulas (a-1), (a-2), (a-3-1) to (a-3-5), (a-4-1) to (a-4-4), (a-5-1) to (a-5-13) and (a-6-1) to (a-6-13) shown below (hereinafter, referred to as liquid crystal compounds (a-1), (a-2), (a-3-1) to (a-3-5), (a-4-1) to (a-4-4), (a-5-1) to (a-5-13) and (a-6-1) to (a-6-13) in some cases) are preferred.

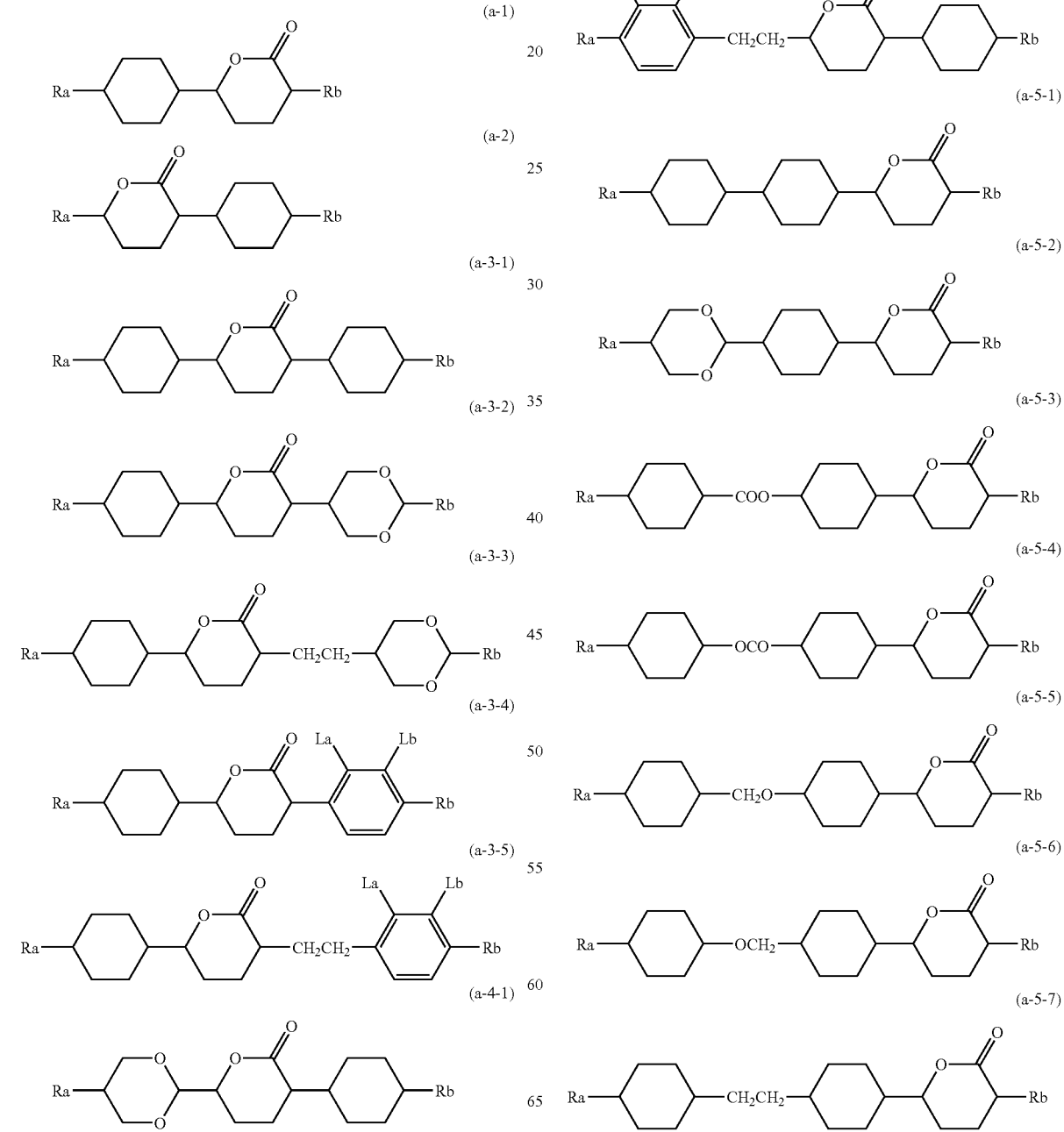

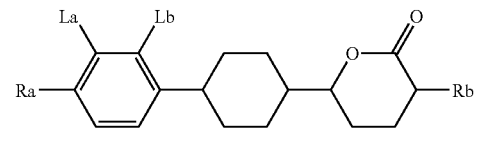
(a-5-8)

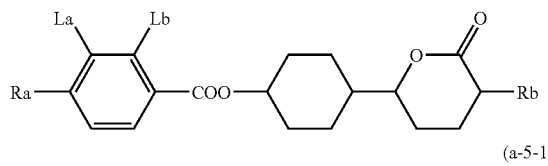
(a-5-9)

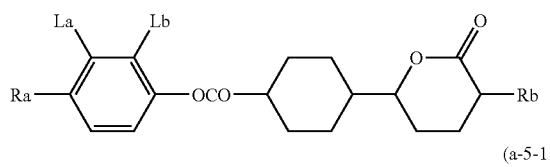
(a-5-10)

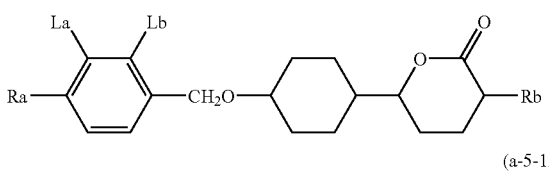
(a-5-11)

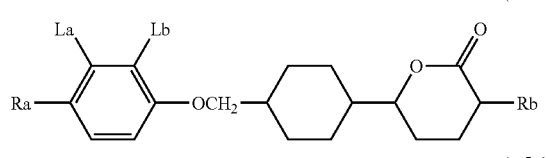
(a-5-12)

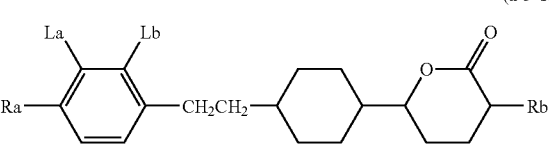
(a-5-13)

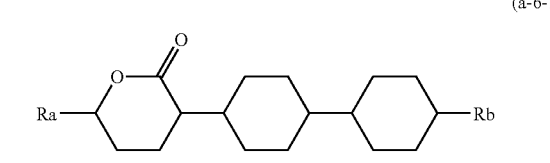
(a-6-1)

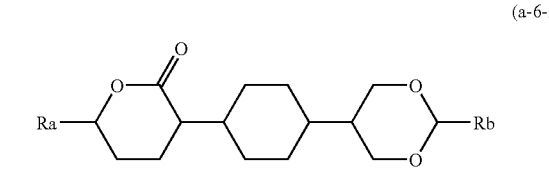
(a-6-2)

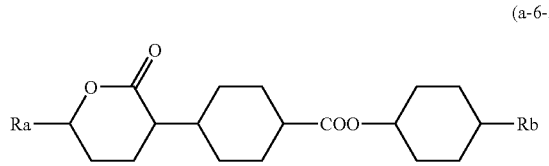
(a-6-3)

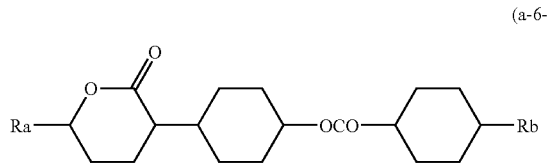
(a-6-4)

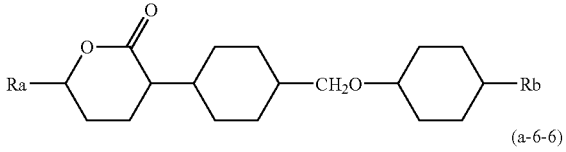
(a-6-5)

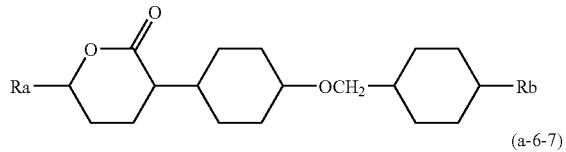
(a-6-6)

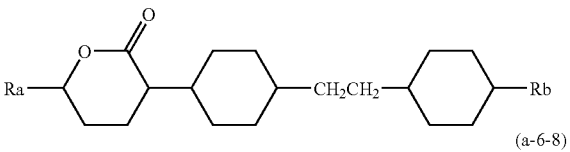
(a-6-7)

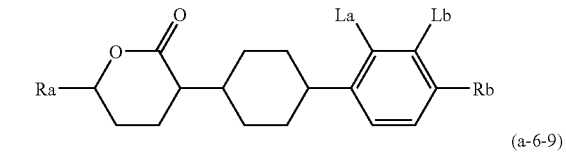
(a-6-8)

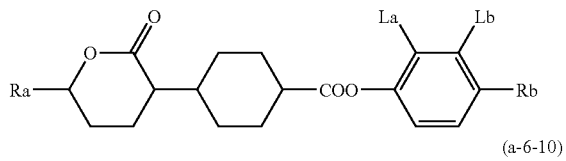
(a-6-9)

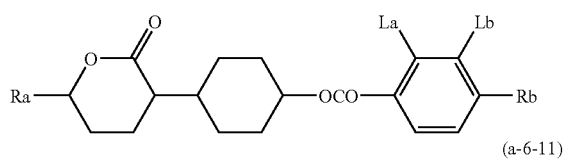
(a-6-10)

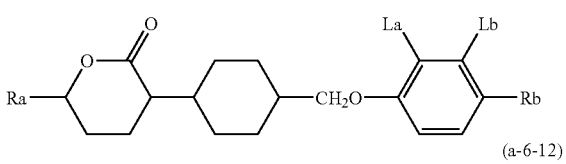
(a-6-11)

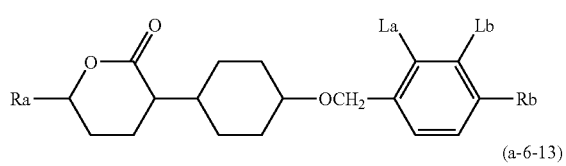
(a-6-12)

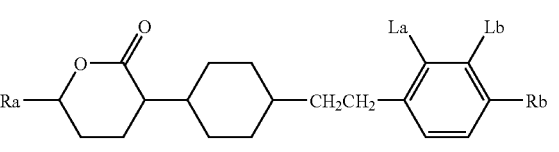
(a-6-13)

In the above formulas, the definitions of Ra and Rb are the same as those in the liquid crystal compounds (a-1) to (a-6), and La and Lb are each independently hydrogen or a halogen, and preferably hydrogen, fluorine or chlorine.

Liquid Crystal Compounds (b-1) to (b-6)

A second embodiment of the liquid crystal compound of the invention includes the compounds represented by formulas (b-1) to (b-6) shown below (hereinafter, referred to as liquid crystal compounds (b-1) to (b-6) in some cases). The liquid crystal compounds (b-1) to (b-6) are bicyclic or tricyclic compounds having a lactone ring and a cyclohexane ring, in which the lactone ring and the cyclohexane ring are bonded through —CH$_2$CH$_2$—, and having hydrogen or a group having 10 or less carbons at the end of the compound.

The liquid crystal compound is useful as a nematic liquid crystal compound owing to the aforementioned structure. The liquid crystal compound exhibits excellent stability to heat, light and so forth, has a high clearing point, has an optical anisotropy in a suitable range of preferably approximately 0.120 or less, and more preferably from approximately –0.020 to approximately 0.110, has a negative dielectric anisotropy in a suitable range of preferably approximately –3 or less, and more preferably from approximately –12 to approximately –4, and exhibits excellent compatibility with other liquid crystal compounds.

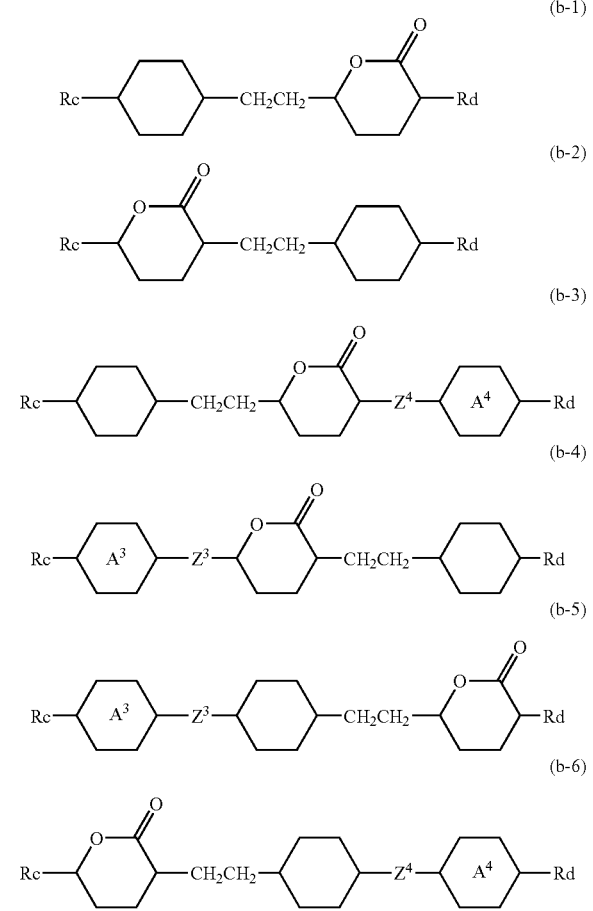

In the liquid crystal compounds (b-1) to (b-6), Rc and Rd are each independently hydrogen or alkyl having 1 to 10 carbons, and in the alkyl, —CH$_2$— may be replaced by —O—, and —(CH$_2$)$_2$— may be replaced by —CH=CH—.

In formula (b-2), in the case where Rc is —C$_4$H$_9$, Rd is alkyl having 1 to 10 carbons or alkoxy having 1 to 4 or 6 to 9 carbons.

Examples of Rc and Rd include hydrogen, alkyl having 1 to 10 carbons, alkoxy having 1 to 9 carbons, alkoxyalkyl having 2 to 9 carbons, alkoxyalkoxy having 2 to 8 carbons, alkenyl having 2 to 10 carbons, alkenyloxy having 2 to 9 carbons, alkenyloxyalkyl having 3 to 9 carbons and alkoxyalkenyl having 3 to 9 carbons. The alkyl chain in these groups is preferably linear alkyl. In the case where the alkyl is linear alkyl, the temperature range of the liquid crystal phase can be widened, and the viscosity can be decreased.

One or more hydrogen in these groups may be replaced by a halogen, and the halogen for replacing hydrogen is preferably fluorine and chlorine.

Rc and Rd are preferably alkyl, alkoxy, alkoxyalkyl, alkenyl, fluoroalkyl or fluoroalkoxy, more preferably alkyl, alkoxy, alkoxyalkyl or alkenyl, and further preferably alkyl, alkoxy or alkenyl. The configuration of the alkenyl is preferably a trans configuration.

Examples of the alkyl include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$ and —C$_{10}$H$_{21}$.

Examples of the alkoxy include —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_{17}$ and —OC$_9$H$_{19}$.

Examples of the alkenyl include —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$CH=CH$_2$, —CH=CHC$_3$H$_7$, —CH$_2$CH=CHC$_2$H$_5$, —(CH$_2$)$_2$CH=CHCH$_3$ and —(CH$_2$)$_3$CH=CH$_2$.

Examples of the alkenyloxy include —OCH$_2$CH=CH$_2$, —OCH$_2$CH=CHCH$_3$ and —OCH$_2$CH=CHC$_2$H$_5$.

Examples of the alkyl in which hydrogen is replaced by a halogen include —CH$_2$F, —CHF$_2$, —CF$_3$, —(CH$_2$)$_2$F, —CF$_2$CH$_2$F, —CF$_2$CHF$_2$, —CH$_2$CF$_3$, —CF$_2$CF$_3$, —(CH$_2$)$_3$F, —(CF$_2$)$_2$CF$_3$, —CF$_2$CHFCF$_3$ and —CHFCF$_2$CF$_3$.

Examples of the alkoxy in which hydrogen is replaced by a halogen include —OCF$_3$, —OCHF$_2$, —OCH$_2$F, —OCF$_2$CF$_3$, —OCF$_2$CHF$_2$, —OCF$_2$CH$_2$F, —OCF$_2$CF$_2$CF$_3$, —OCF$_2$CHFCF$_3$ and —OCHFCF$_2$CF$_3$.

Examples of the alkenyl in which hydrogen is replaced by a halogen include —CH=CHF, —CH=CF$_2$, —CF=CHF, —CH=CHCH$_2$F, —CH=CHCF$_3$ and —(CH$_2$)$_2$CH=CF$_2$.

Among these groups for Rc and Rd, —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_{17}$ and —OC$_9$H$_{19}$ are preferred.

In the liquid crystal compounds (b-1) to (b-6), ring A$^3$ and ring A$^4$ are each independently trans-1,4-cyclohexylene or 1,4-phenylene, and in these rings hydrogen may be replaced by a halogen. In the case where the ring is trans-1,4-cyclohexylene, —CH$_2$— may be replaced by —O—, and —CH$_2$CH— may be replaced by —CH=C—.

In the case where the rings are trans-1,4-cyclohexylene, the optical anisotropy can be decreased, and the viscosity can be decreased. In the case where the liquid crystal compound is added to a liquid crystal composition, the maximum temperature of the nematic phase of the composition can be increased.

In the case where the rings are 1,4-phenylene, hydrogen of which may be replaced by a halogen, the optical anisotropy can be relatively increased, and the orientational order parameter can be increased.

Among these groups for ring A$^3$ and ring A$^4$, trans-1,4-cyclohexylene, 1,4-cyclohexenylene, 1,3-dioxane-2,5-diyl, 1,4-phenylene, 2-fluoro-1,4-phenylene, 3-fluoro-1,4-phenylene, 2,3-difluoro-1,4-phenylene, 2-fluoro-3-chloro-1,4-phenylene, 2-chloro-3-fluoro-1,4-phenylene and 2,3-dichloro-1,4-phenylene are preferred, and trans-1,4-cyclohexylene, 1,4-phenylene, 2-fluoro-1,4-phenylene, 3-fluoro-1,4-phenylene and 2,3-difluoro-1,4-phenylene are more preferred.

In the liquid crystal compounds (b-1) to (b-6), Z$^3$ and Z$^4$ are each independently a single bond, —COO—, —OCO—, —OCH$_2$—, —CH$_2$O— or —CH$_2$CH$_2$—. Among these groups, a single bond is preferred for widening the temperature range of the liquid crystal phase and for decreasing the viscosity.

The liquid crystal compounds (b-1) to (b-6) can be adjusted in such characteristics as optical anisotropy, dielectric anisotropy and so forth by appropriately selecting the end groups Rc and Rd, the rings A$^3$ and A$^4$, and the bonding groups Z$^3$ and Z$^4$, within the aforementioned ranges.

In the liquid crystal compounds (b-1) and (b-2), in the case where Rc and Rd are each independently hydrogen, alkyl having 1 to 10 carbons or alkoxy having 1 to 9 carbons, there is a tendency that the compatibility is improved. Particularly, in the case where Rc and Rd are independently hydrogen or alkyl having 1 to 10 carbons, the tendency becomes remarkable.

In the liquid crystal compounds (b-3), (b-4), (b-5) and (b-6), in the case where Z$^3$ or Z$^4$ is a single bond, there is a tendency that the clearing point is increased.

In the liquid crystal compounds (b-3), (b-4), (b-5) and (b-6), in the case where Rc and Rd are independently hydrogen or alkyl having 1 to 10 carbons, there is a tendency that the clearing point is increased.

In the liquid crystal compounds (b-3), (b-4), (b-5) and (b-6), in the case where ring A$^3$ or ring A$^4$ is 1,4-cyclohexylene, there is a tendency that the optical anisotropy is decreased, and there is a tendency that the clearing point is increased.

In the liquid crystal compounds (b-3), (b-4), (b-5) and (b-6), in the case where ring A$^3$ or ring A$^4$ is 1,4-phenylene, arbitrary hydrogen of which may be replaced by a halogen, there is a tendency that the optical anisotropy is increased.

Among the liquid crystal compounds (b-1) to (b-6), compounds represented by formulas (b-1), (b-2), (b-3-1) to (b-3-4), (b-4-1) to (b-4-3), (b-5-1) to (b-5-12) and (b-6-1) to (b-6-12) shown below (hereinafter, referred to as liquid crystal compounds (b-1), (b-2), (b-3-1) to (b-3-4), (b-4-1) to (b-4-3), (b-5-1) to (b-5-12) and (b-6-1) to (b-6-12) in some cases) are preferred.

(b-1)
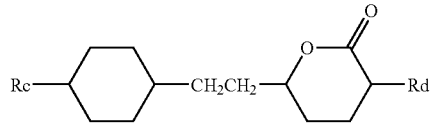

(b-2)
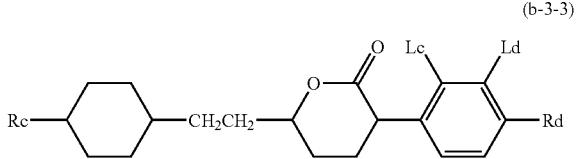

(b-3-1)
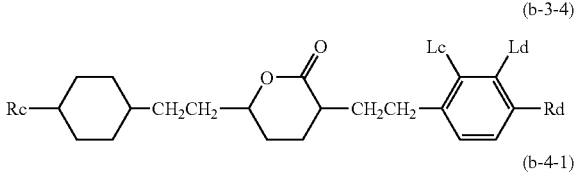

(b-3-2)
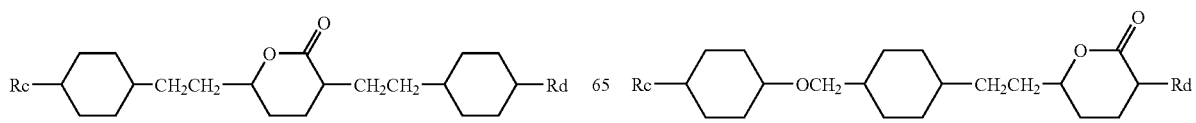

-continued (b-3-3)
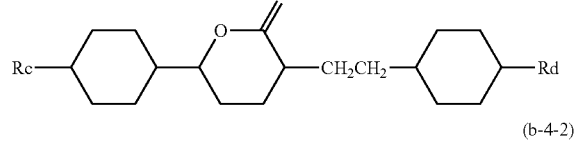

(b-3-4)
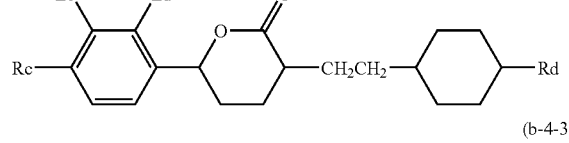

(b-4-1)
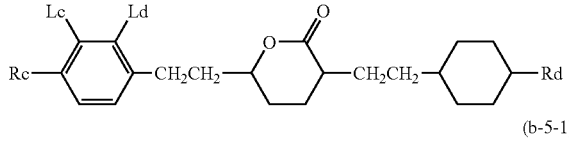

(b-4-2)
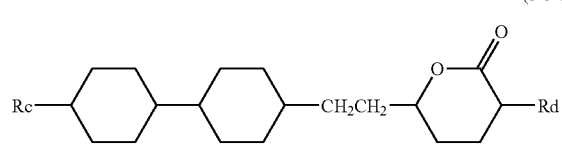

(b-4-3)
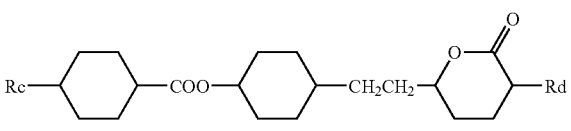

(b-5-1)
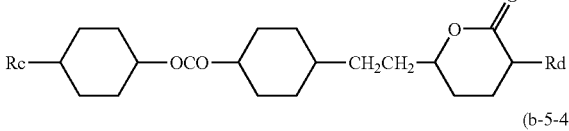

(b-5-2)
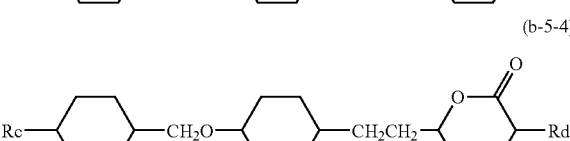

(b-5-3)

(b-5-4)
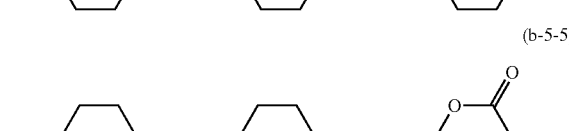

(b-5-5)

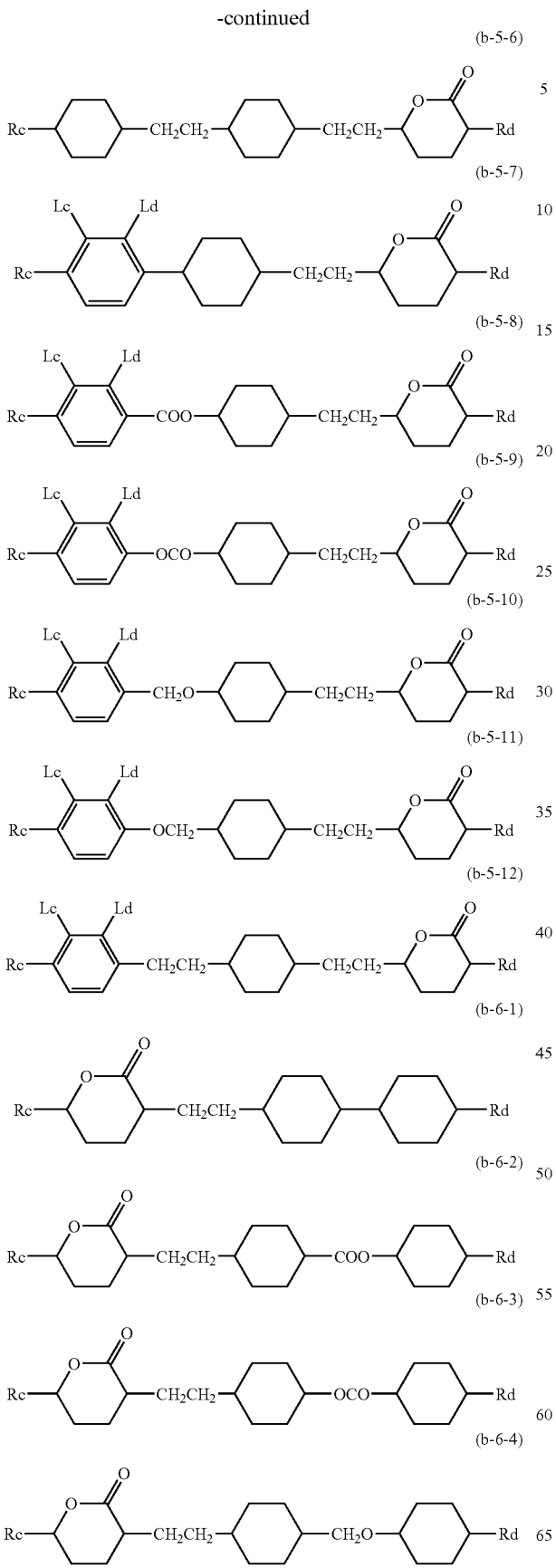
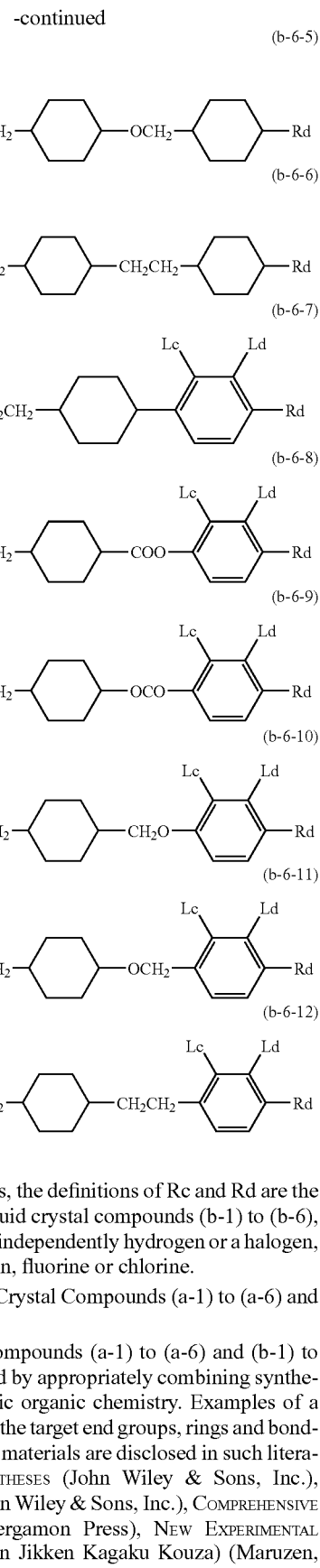

In the above formulas, the definitions of Rc and Rd are the same as those in the liquid crystal compounds (b-1) to (b-6), and Lc and Ld are each independently hydrogen or a halogen, and preferably hydrogen, fluorine or chlorine.

Synthesis of Liquid Crystal Compounds (a-1) to (a-6) and (b-1) to (b-6)

The liquid crystal compounds (a-1) to (a-6) and (b-1) to (b-6) can be synthesized by appropriately combining synthesis methods of synthetic organic chemistry. Examples of a method for introducing the target end groups, rings and bonding groups into starting materials are disclosed in such literatures as ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), NEW EXPERIMENTAL CHEMISTRY COURSE (Shin Jikken Kagaku Kouza) (Maruzen, Inc.), and so forth.

Formation of Bonding Groups $Z^1$, $Z^2$, $Z^3$ and $Z^4$

One example of a method for forming the bonding groups $Z^1$, $Z^2$, $Z^3$ and $Z^4$ is described. A scheme of forming the bonding group is shown below. In the scheme, $MSG^1$ and $MSG^2$ are a monovalent organic group. Plural compounds of $MSG^1$ (or $MSG^2$) used in the scheme may be the same as each other or different from each other. The compounds (a-A) to (a-E) correspond to the liquid crystal compounds (a-1) to (a-6).

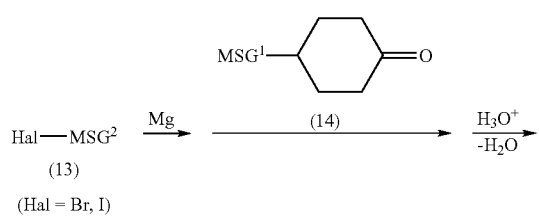

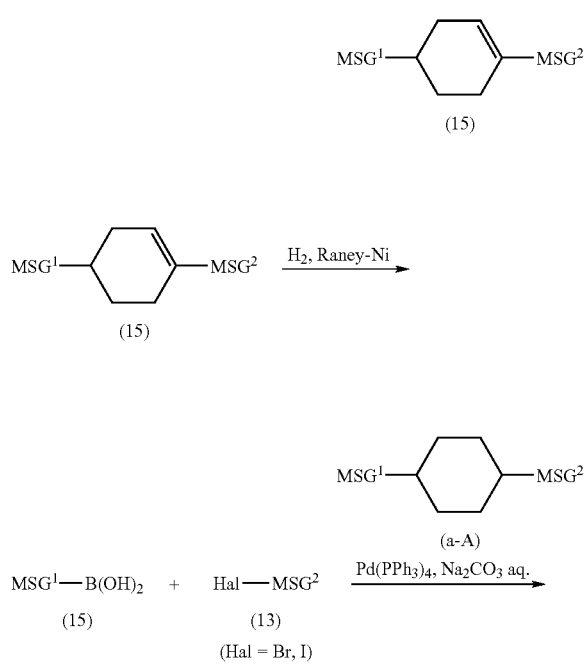

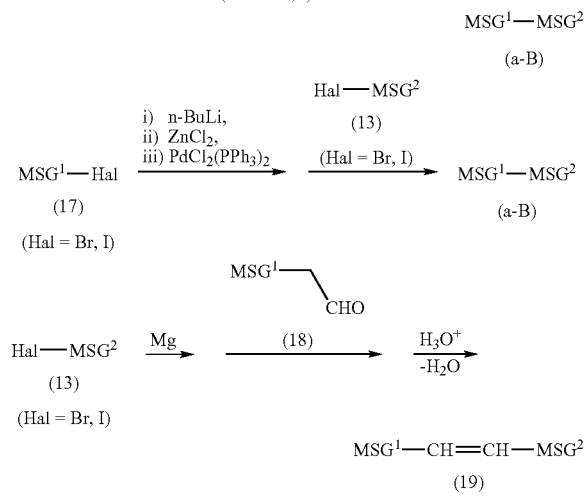

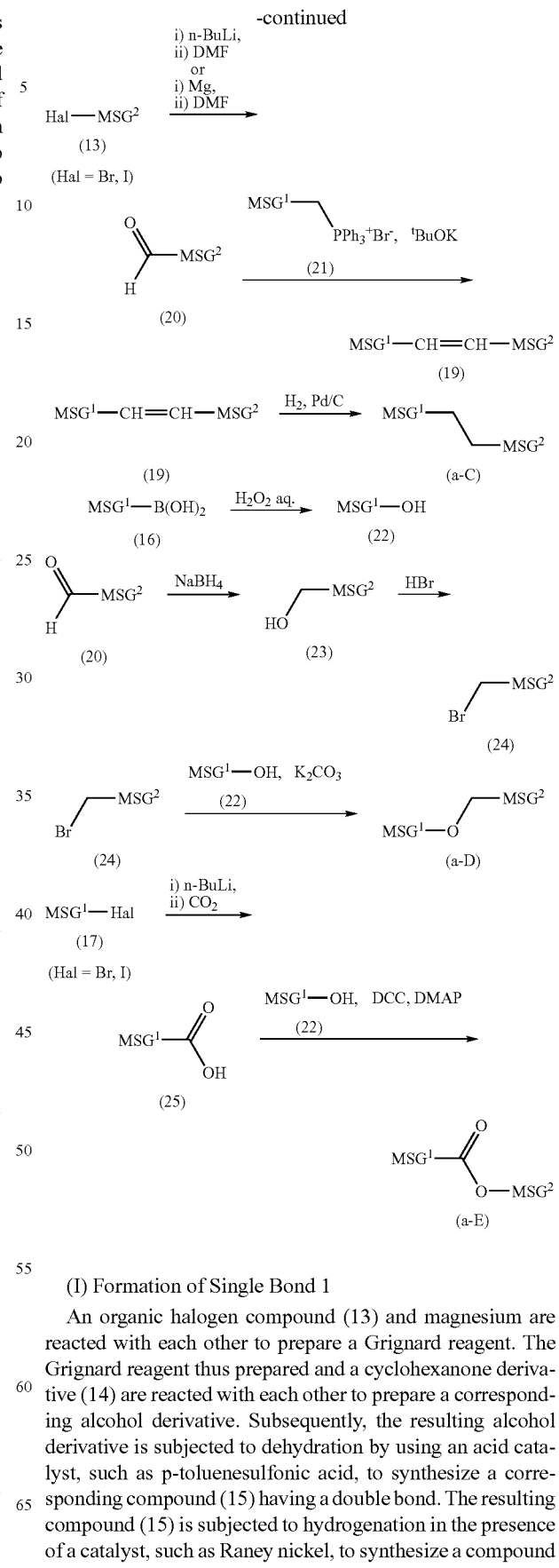

(I) Formation of Single Bond 1

An organic halogen compound (13) and magnesium are reacted with each other to prepare a Grignard reagent. The Grignard reagent thus prepared and a cyclohexanone derivative (14) are reacted with each other to prepare a corresponding alcohol derivative. Subsequently, the resulting alcohol derivative is subjected to dehydration by using an acid catalyst, such as p-toluenesulfonic acid, to synthesize a corresponding compound (15) having a double bond. The resulting compound (15) is subjected to hydrogenation in the presence of a catalyst, such as Raney nickel, to synthesize a compound (a-A). The cyclohexanone derivative (14) can be synthesized according, for example, to a method disclosed in JP S59-7122 A/1984.

(II) Formation of Single Bond 2

A dihydroxyborane derivative (16) and an organic halogen compound (13) are reacted with each other in the presence of, for example, a catalyst containing a carbonate salt aqueous solution and tetrakis(triphenylphosphine) palladium (Pd (PPh$_3$)$_4$) to synthesize a compound (a-B).

In the alternative, an organic halogen compound (17) is reacted with butyllithium and then reacted with zinc chloride, and the resulting compound is then reacted with a compound (13) in the presence of bistriphenylphosphine dichloropalladium (Pd(PPh$_3$)$_2$Cl$_2$) as a catalyst to synthesize a compound (a-B).

(III) Formation of —(CH$_2$)$_2$—

An organic halogen compound (13) having a monovalent organic group MSG$^2$ and magnesium are reacted with each other to prepare a Grignard reagent. The Grignard reagent thus prepared and an aldehyde derivative (18) are reacted with each other to synthesize a corresponding alcohol derivative. Subsequently, the resulting alcohol derivative is subjected to dehydration by using an acid catalyst, such as p-toluenesulfonic acid, to synthesize a corresponding compound (19) having a double bond. In alternative, a compound obtained by treating the organic halogen compound (13) with butyllithium or magnesium is reacted with a formamide, such as N,N-dimethylformamide (DMF), to obtain an aldehyde (20). The resulting aldehyde (20) is reacted with a phosphoylide obtained by treating a phosphonium salt (21) with a base, such as tert-butoxide, to synthesize a corresponding compound (19) having a double bond.

The compound (19) is subjected to hydrogenation in the presence of a catalyst, such as carbon-supported palladium (Pd/C), to synthesize a compound (a-C) having —(CH$_2$)$_2$—.

(IV) Formation of —CH$_2$O— and —OCH$_2$—

A dihydroxyborane derivative (16) is oxidized with an oxidizing agent, such as hydrogen peroxide, to obtain an alcohol derivative (22). Separately, an aldehyde derivative (20) is reduced with a reducing agent, such as sodium borohydride, to obtain a compound (23). The resulting compound (23) is halogenated with hydrobromic acid or the like to obtain an organic halogen compound (24). The compound (22) and the compound (24) thus obtained are reacted with each other in the presence of potassium carbonate or the like to synthesize a compound (a-D).

(V) Formation of —COO— and —OCO—

A compound (17) is reacted with butyllithium to obtain a lithiated compound, which is then reacted with carbon dioxide to obtain a carboxylic acid (25). The carboxylic acid (25) and an alcohol (22) or a phenol, which is synthesized by a known method, are subjected to dehydration condensation to synthesize a compound (a-E) having —COO—. A compound having —OCO— can also be synthesized in the same manner.

Synthesis Method of Liquid Crystal Compounds (a-1) to (a-6)

The liquid crystal compounds (a-1), (a-3), (a-4) and (a-5) of the invention can be synthesized in the following manner. An oxetane compound (26) synthesized by a method disclosed in JP 2000-8040 A/2000 is coupled with a tert-butyl ester (27) by a method disclosed in M. Yamaguchi, et al., Tetrahedron Lett., vol. 25(11), p. 1159 (1984), and then subjected to deprotection and cyclization reaction to synthesize the target compounds (a-1), (a-3), (a-4) and (a-5).

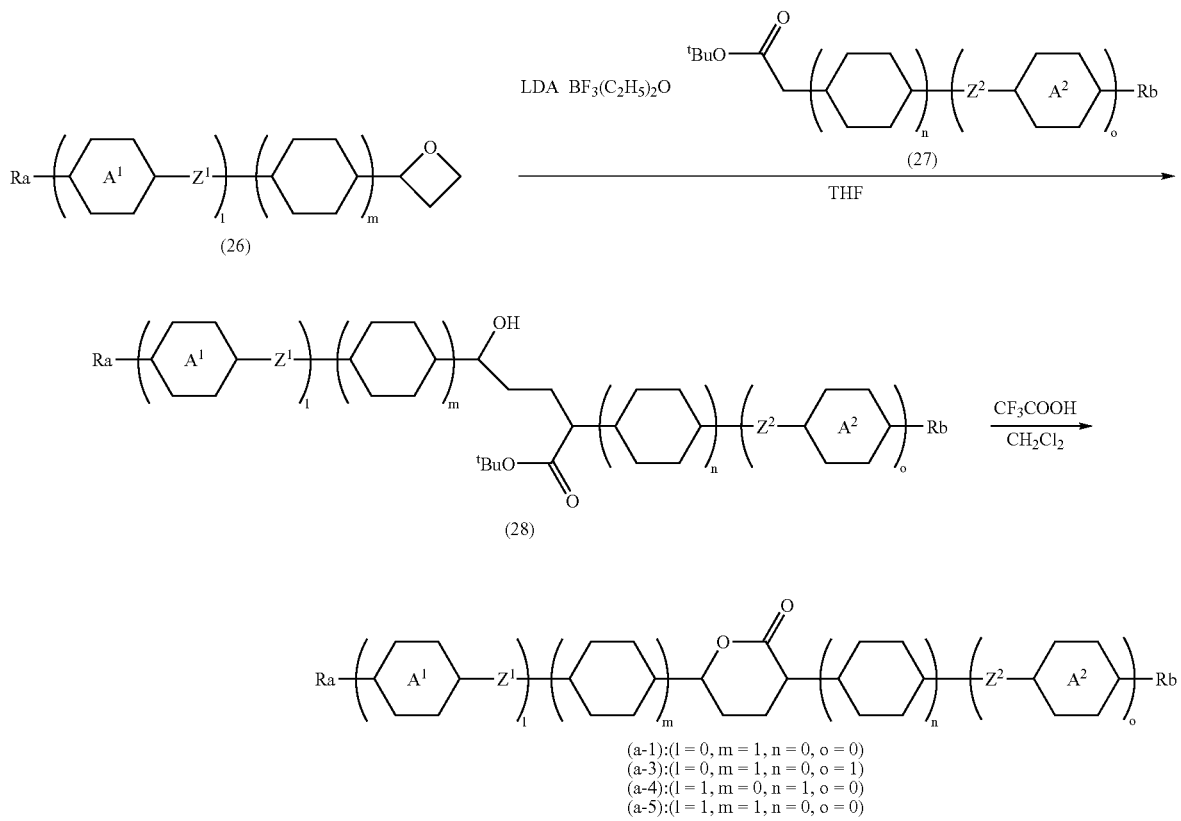

(a-1):(l = 0, m = 1, n = 0, o = 0)
(a-3):(l = 0, m = 1, n = 0, o = 1)
(a-4):(l = 1, m = 0, n = 1, o = 0)
(a-5):(l = 1, m = 1, n = 0, o = 0)

The liquid crystal compounds (a-2) and (a-6) can be synthesized in the following manner. A nitrile (19) and an iodide (20) obtained by a method disclosed in *J. Org. Chem.*, vol. 48, p. 5381 (1983) are reacted with each other according to a method disclosed in *J. Org. Chem.*, vol. 50, p. 670 (1985) to obtain a compound (21). The compound (21) is deprotected by refluxing under heating in the presence of a catalytic amount of pyridinium p-toluenesulfonate, and then reduced with sodium borohydride or the like to obtain an alcohol (23). The alcohol (23) is subjected to hydrolysis and cyclization reaction by refluxing under heating in concentrated hydrochloric acid to obtain the target compounds (a-2) and (a-6).

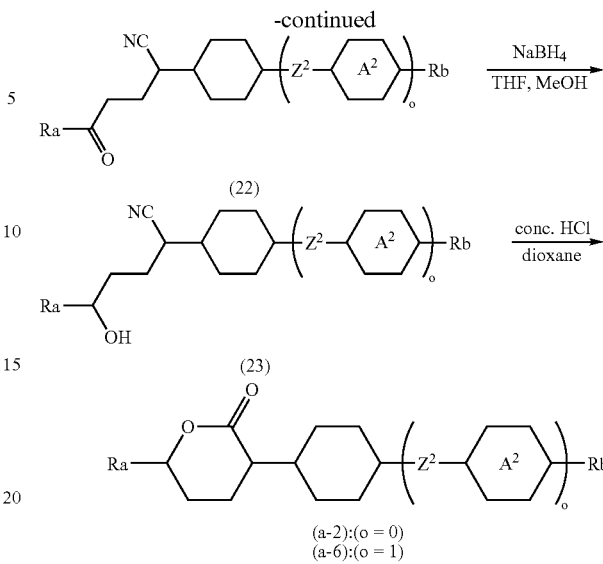

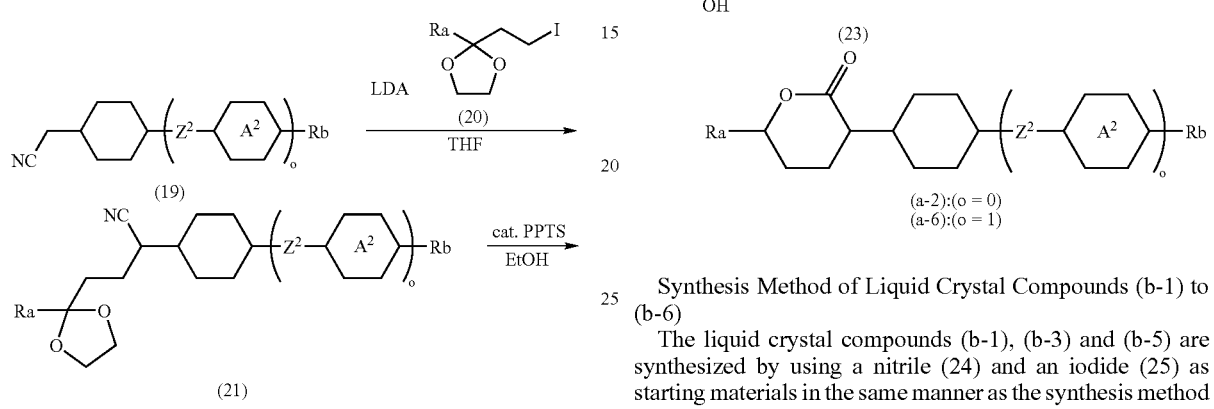

Synthesis Method of Liquid Crystal Compounds (b-1) to (b-6)

The liquid crystal compounds (b-1), (b-3) and (b-5) are synthesized by using a nitrile (24) and an iodide (25) as starting materials in the same manner as the synthesis method for the liquid crystal compounds (a-2) and (a-6).

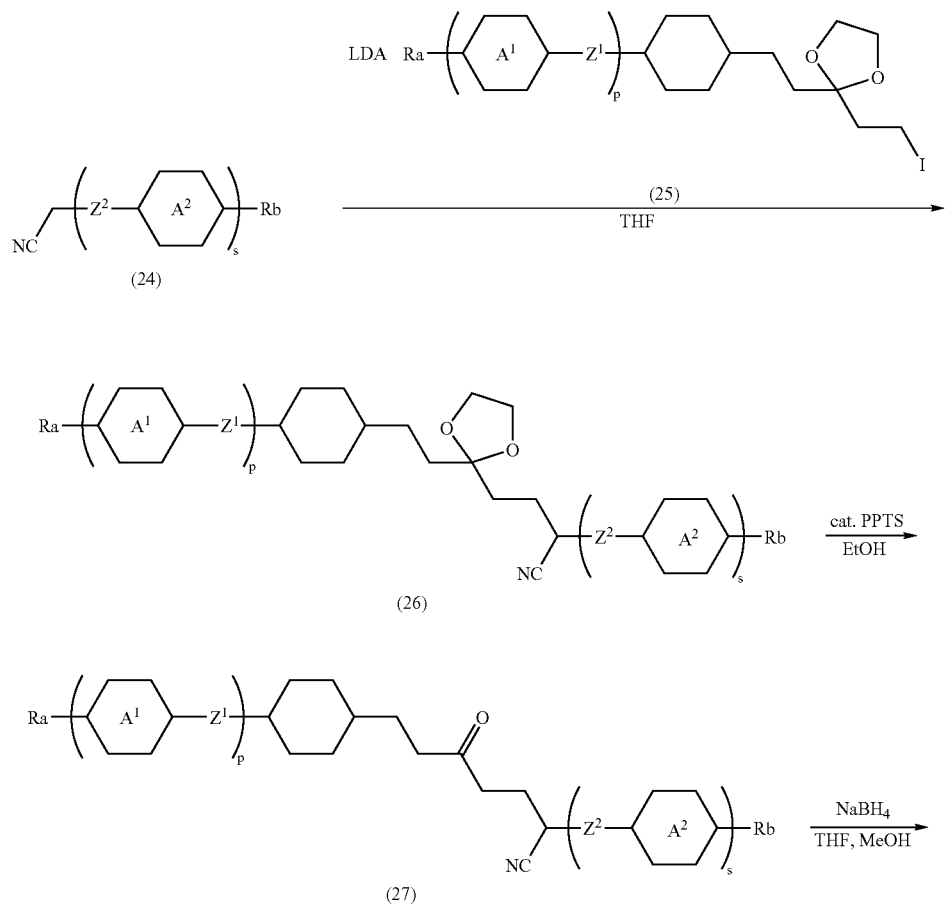

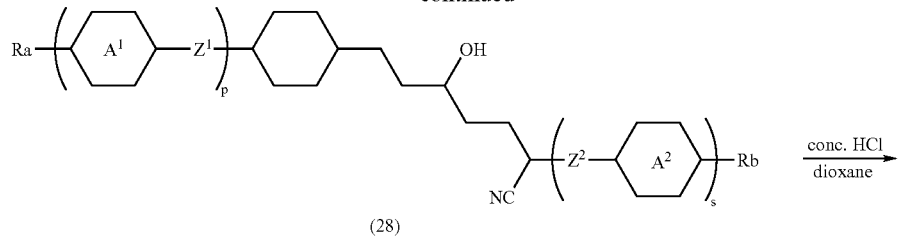
(28)
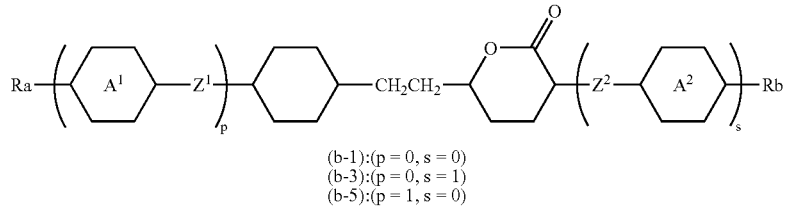
(b-1):(p = 0, s = 0)
(b-3):(p = 0, s = 1)
(b-5):(p = 1, s = 0)
The liquid crystal compounds (b-2), (b-4) and (b-6) are synthesized by using a nitrile (29) and an iodide (30) as starting materials in the same manner as the synthesis method for the liquid crystal compounds (a-2) and (a-6).
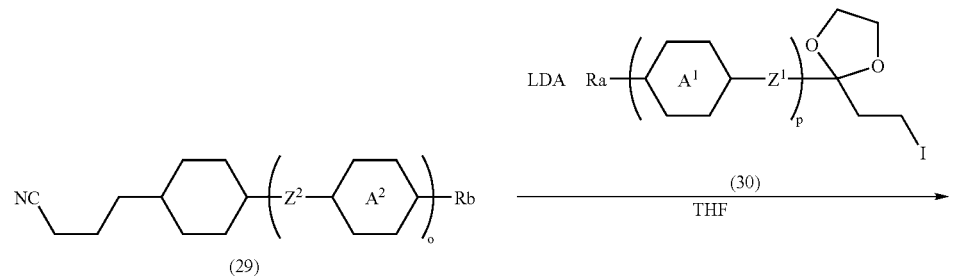
(29)
(30)
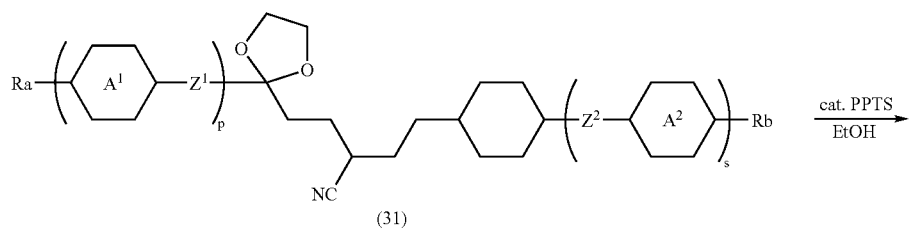
(31)
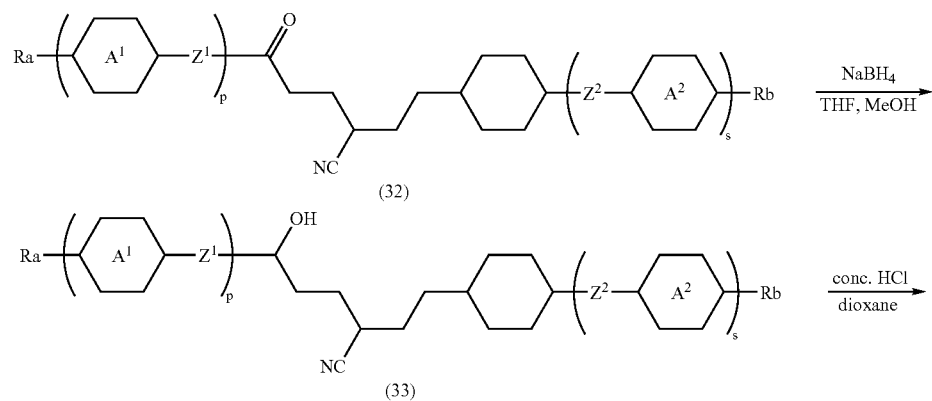
(32)
(33)

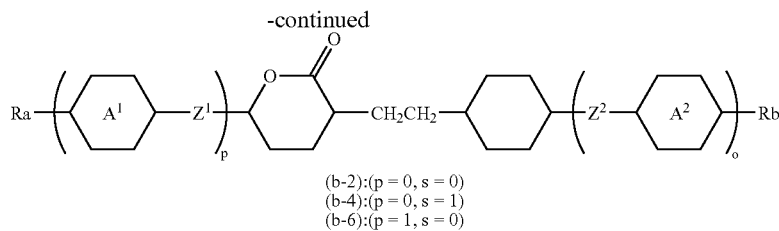

(b-2): (p = 0, s = 0)
(b-4): (p = 0, s = 1)
(b-6): (p = 1, s = 0)

Liquid Crystal Composition

The liquid crystal composition of the invention will be described below. The liquid crystal composition of the invention contains at least one compound selected from the group consisting of the compounds represented by formulas (a-1) to (a-6) and (b-1) to (b-6). The liquid crystal composition may contain two or more of the compounds (a-1) to (a-6) and (b-1) to (b-6). The liquid crystal composition may contain only the compounds (a-1) to (a-6) and (b-1) to (b-6). The liquid crystal composition may contain only the compounds (a-1) to (a-6), or in alternative, may contain only the compounds (b-1) to (b-6). The content of the compounds (a-1) to (a-6) and (b-1) to (b-6) in the liquid crystal composition of the invention is not particularly limited, and the liquid crystal composition preferably contains the compounds (a-1) to (a-6) and (b-1) to (b-6) in a ratio of from approximately 1% to approximately 99% by weight based on the total weight of the liquid crystal compounds contained in the liquid crystal composition. Upon preparing the liquid crystal composition of the invention, the components may be selected in consideration, for example, of the dielectric anisotropy of the compounds (a-1) to (a-6) and (b-1) to (b-6).

The liquid crystal composition has a low viscosity, a suitable optical anisotropy, a suitable negative dielectric anisotropy, a low threshold voltage, a high maximum temperature of a nematic phase (phase transition temperature from a nematic phase to an isotropic phase), and a low minimum temperature of a nematic phase.

The liquid crystal composition of the invention may contain, in addition to the compounds (a-1) to (a-6) and (b-1) to (b-6), at least one compound selected from the group of compounds represented by formulas (1) to (9) below (hereinafter, referred to as compounds (1) to (9) in some cases).

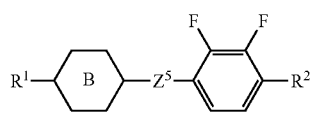

(1)

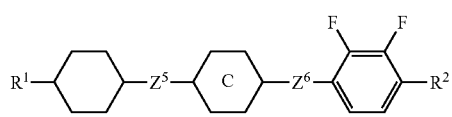

(2)

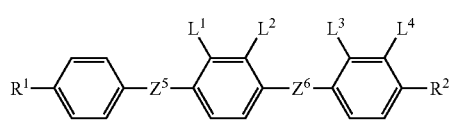

(3)

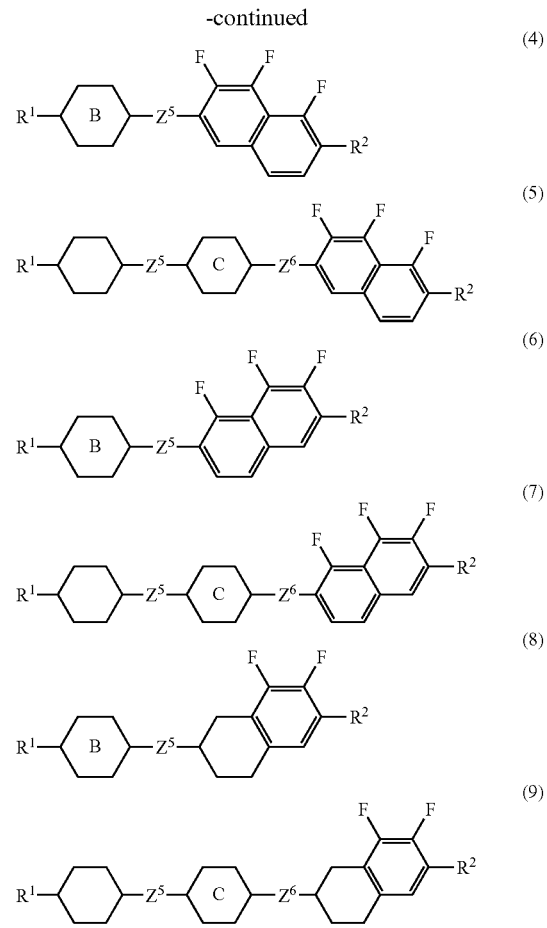

In formulas (1) to (9), $R^1$ and $R^2$ are each independently alkyl having 1 to 10 carbons, provided that in the alkyl, —$CH_2$— may be replaced by —O—, —$(CH_2)_2$— may be replaced by —CH=CH—, and hydrogen may be replaced by fluorine, and $R^1$ may be fluorine; ring B and ring C are independently 1,4-cyclohexylene, 1,4-phenylene or decahydro-2,6-naphthylene; $Z^5$ and $Z^6$ are each independently —$(CH_2)_2$—, —COO— or a single bond; and $L^1$, $L^2$, $L^3$ and $L^4$ are each independently hydrogen or fluorine, provided that at least one of $L^1$, $L^2$, $L^3$ and $L^4$ is hydrogen.

In the case where the additional compound is a compound represented by formula (1), the liquid crystal composition can have a low viscosity, a small optical anisotropy, and a further low threshold voltage.

In the case where the additional compound is a compound represented by formula (2), the liquid crystal composition can have a high maximum temperature of a nematic phase, a large optical anisotropy, and a further low threshold voltage.

In the case where the additional compound is a compound represented by formula (3), the liquid crystal composition can have a large optical anisotropy and a further low threshold voltage.

In the case where the additional compound is a compound represented by formulas (4) to (7), the liquid crystal composition can have a high maximum temperature of a nematic phase, a large optical anisotropy, and a further low threshold voltage.

In the case where the additional compound is a compound represented by formulas (8) and (9), the liquid crystal composition can have a high maximum temperature of a nematic phase and a further low threshold voltage.

The content of the compounds (1) to (9) in the liquid crystal composition of the invention is not particularly limited, and in order to prevent the absolute value of the negative dielectric anisotropy from being decreased, the liquid crystal composition preferably contains the compounds (1) to (9) in a ratio of approximately 10% by weight or more, and more preferably from approximately 40% to approximately 90% by weight, based on the total weight of the liquid crystal compounds contained in the liquid crystal composition.

The liquid crystal composition of the invention may contain, in addition to the compounds (a-1) to (a-6) and (b-1) to (b-6), at least one compound selected from the group of compounds represented by formulas (10) to (12) below (hereinafter, referred to as compounds (10) to (12) in some cases).

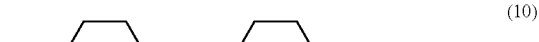

(10)

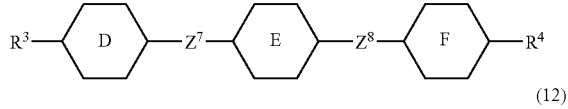

(11)

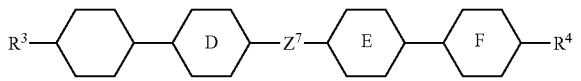

(12)

In formulas (10) to (12), $R^3$ and $R^4$ are each independently alkyl having 1 to 10 carbons, provided that in the alkyl, —$CH_2$— may be replaced by —O—, —$(CH_2)_2$— may be replaced by —CH=CH—, and hydrogen may be replaced by fluorine; ring D, ring E and ring F are each independently 1,4-cyclohexylene, pyrimidine-2,5-diyl, or 1,4-phenylene, arbitrary hydrogen of which may be replaced by fluorine; and $Z^7$ and $Z^8$ are each independently —C≡C—, —COO—, —$(CH_2)_2$—, —CH=CH— or a single bond.

In the case where the additional compound is a compound represented by formula (10), the liquid crystal composition can have a low viscosity and an optical anisotropy in a suitable range, preferably from approximately 0.010 to approximately 0.300.

In the case where the additional compound is a compound represented by formulas (11) and (12), the liquid crystal composition can have a high maximum temperature of a nematic phase and an optical anisotropy in a suitable range, preferably from approximately 0.010 to approximately 0.300.

The content of the compounds (10) to (12) in the liquid crystal composition of the invention is not particularly limited, and in order to decrease the viscosity, the liquid crystal composition preferably contains a large amount of the compounds. However, there is a tendency that the threshold voltage of the liquid crystal composition is increased when the content of the compounds (10) to (12) is increased, and therefore, in the case where the liquid crystal composition of the invention is used in a liquid crystal device of a VA mode, the content of the compounds (10) to (12) is preferably approximately 70% by weight or less, and more preferably approximately 60% by weight or less, based on the total weight of the liquid crystal compounds contained in the liquid crystal composition.

The liquid crystal composition of the invention may contain, in addition to the compounds (a-1) to (a-6) and (b-1) to (b-6), at least one compound selected from the group of compounds represented by formulas (1), (2), (3), (4), (5), (6), (7), (8) and (9) and at least one compound selected from the group of compounds represented by formulas (10), (11) and (12).

In the case where the liquid crystal composition of the invention has the aforementioned formulation, the composition has a low viscosity, a large negative dielectric anisotropy, a low threshold voltage and a wide temperature range of a liquid crystal phase.

Among the compounds (1) to (12), compounds represented by formulas (1-1) to (1-6), (2-1) to (2-6), (3-1) to (3-5), (4-1), (5-1) and (5-2), (6-1), (7-1) and (7-2), (8-1), (9-1) and (9-2), (10-1) to (10-11), (11-1) to (11-23), and (12-1) to (12-6) are preferred. In these compounds, $R^1$, $R^2$, $R^3$ and $R^4$ have the same meanings as in the invention.

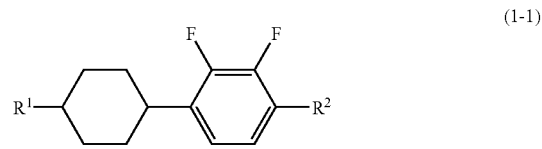

(1-1)

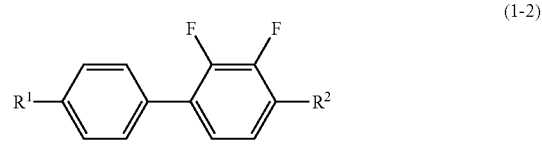

(1-2)

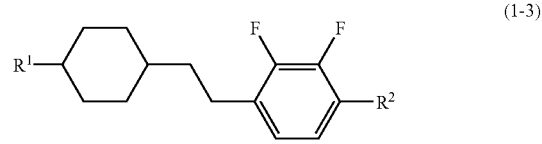

(1-3)

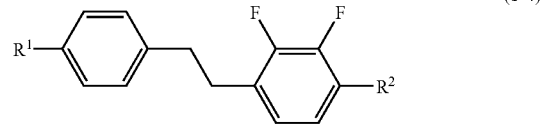

(1-4)

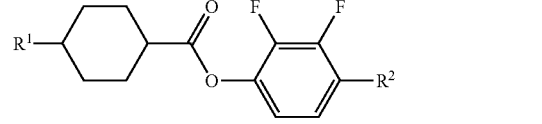

(1-5)

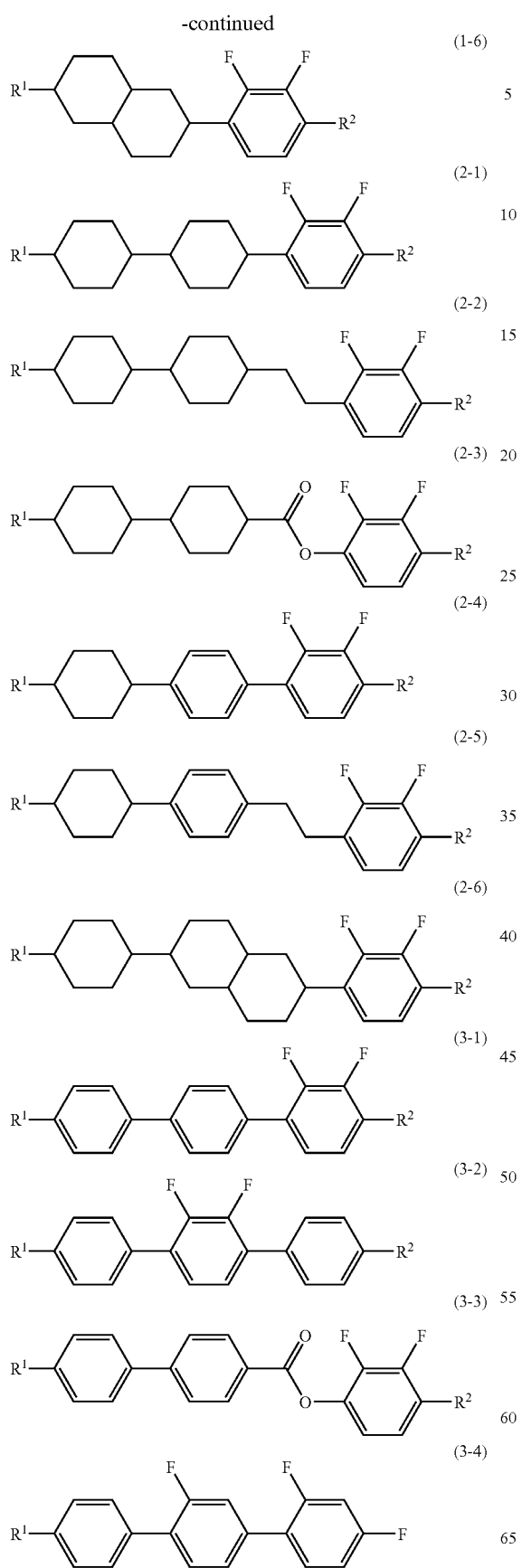
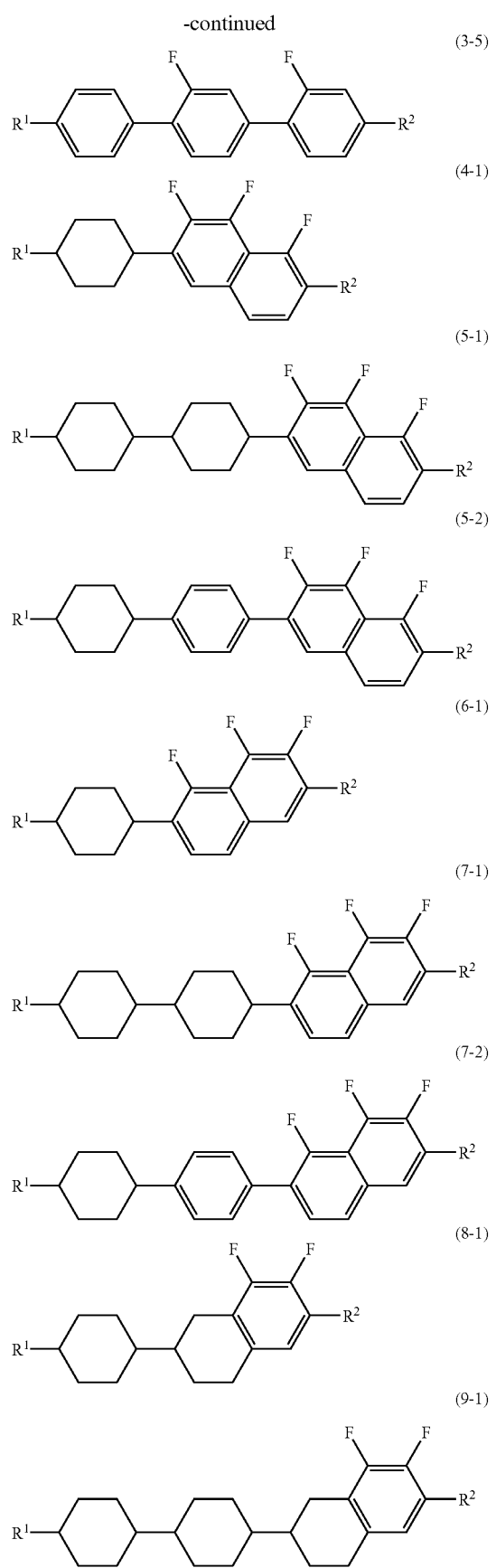

-continued
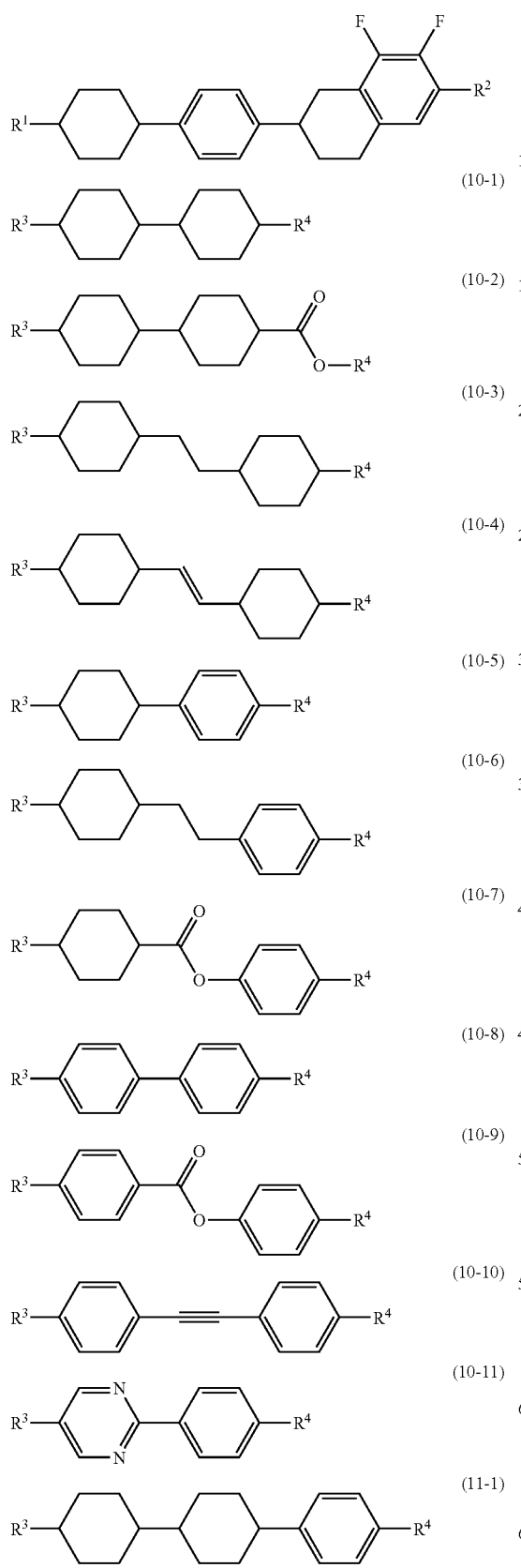
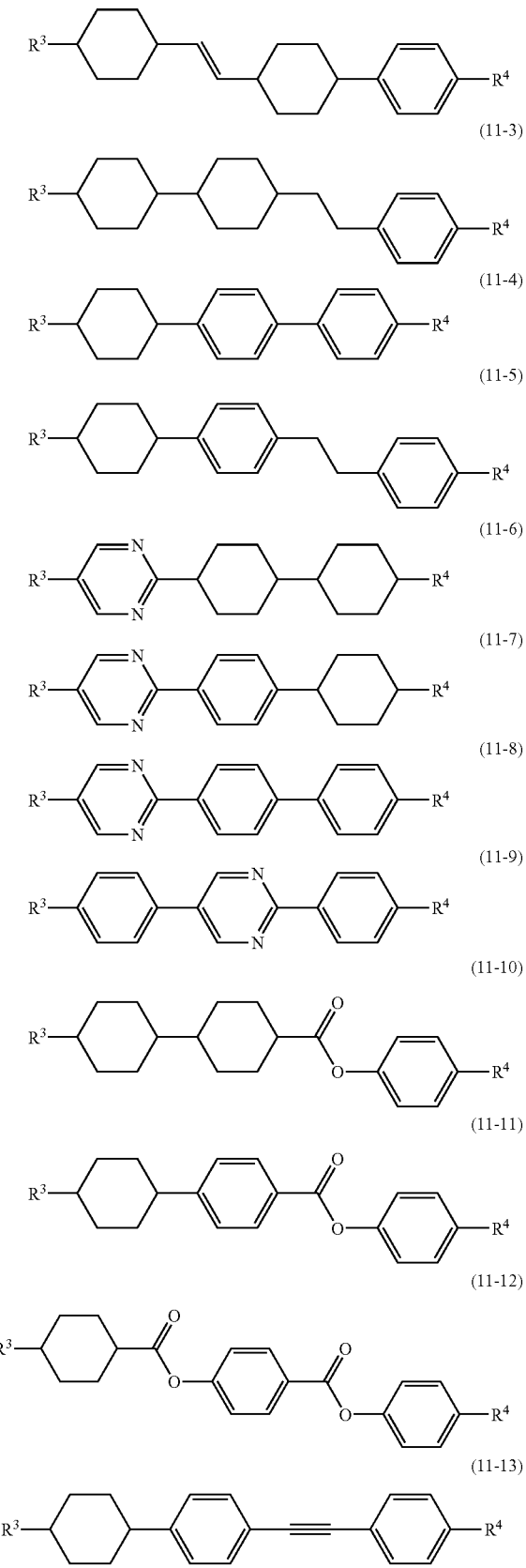

-continued (11-14)
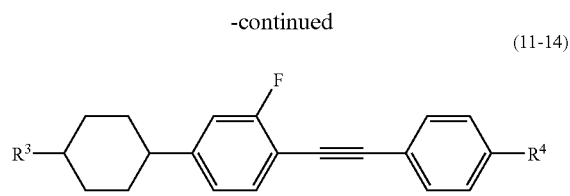

(11-15)
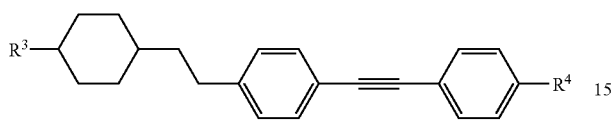

(11-16)
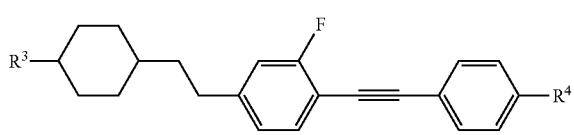

(11-17)
(11-18)
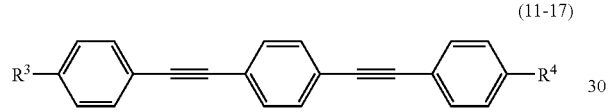

(11-19)
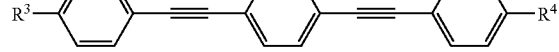

(11-20)
(11-21)
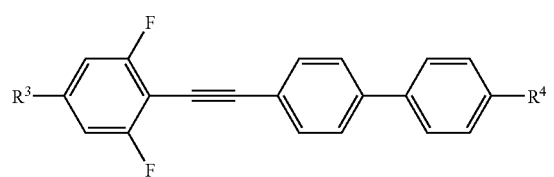

(11-22)
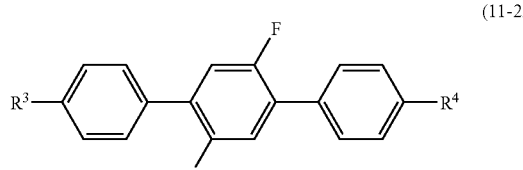

-continued (11-23)
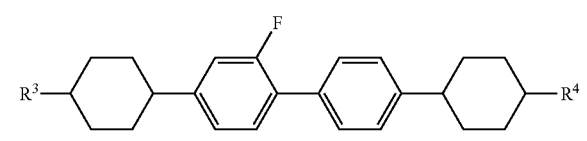

(12-1)
(12-2)
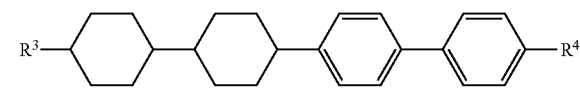

(12-3)
(12-4)
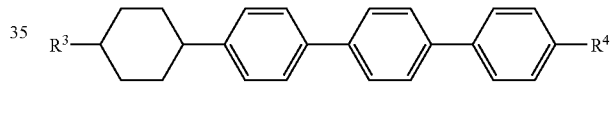

(12-5)
(12-6)

The liquid crystal composition of the invention may further contain an additive, such as an optically active compound, a coloring matter, a defoaming agent, an ultraviolet light absorbent and an antioxidant.

For example, in the case where an optically active compound is added to the liquid crystal composition, a helical structure of liquid crystal is induced to provide a twist angle. The optically active compound referred herein means a compound capable of inducing a helical structure of liquid crystal to provide a twist angle (chiral dopant), and examples thereof include compounds represented by formulas (Op-1) to (Op-12) below.

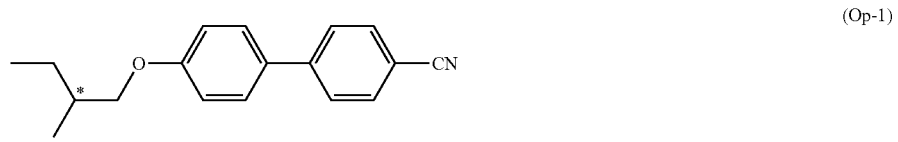 (Op-1)
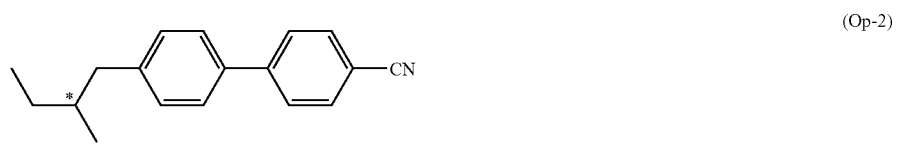 (Op-2)
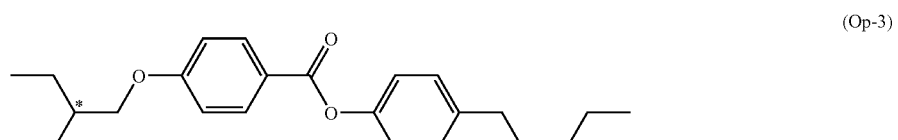 (Op-3)
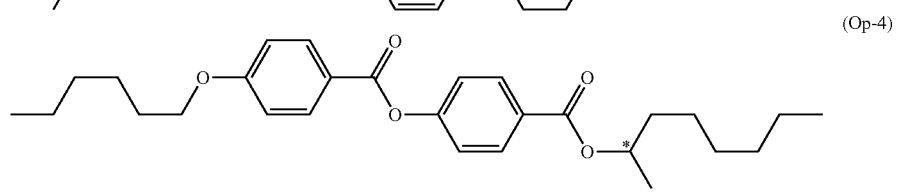 (Op-4)
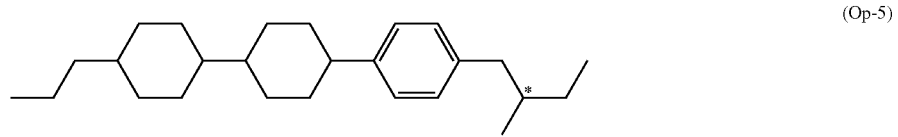 (Op-5)
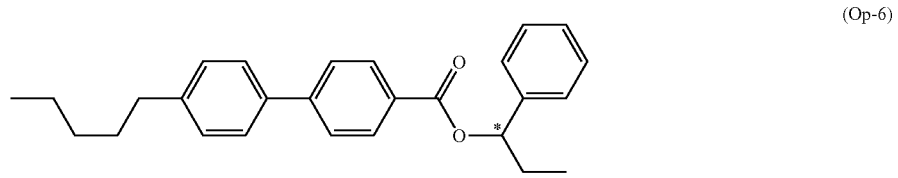 (Op-6)
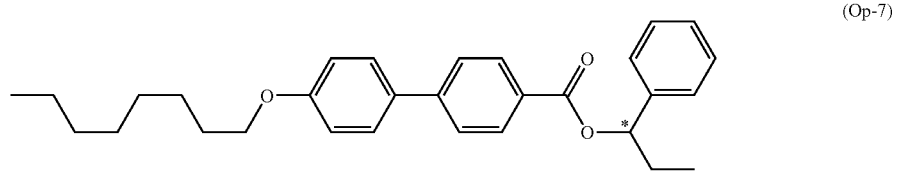 (Op-7)
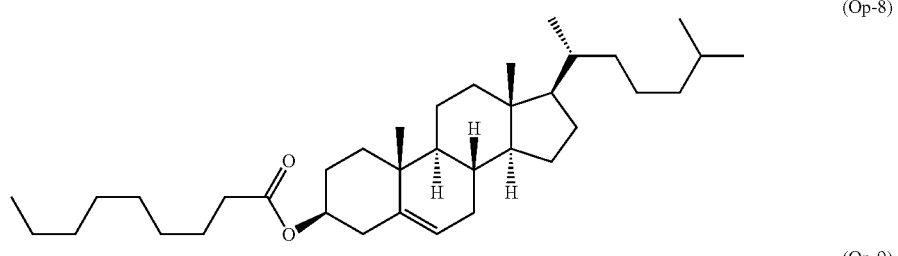 (Op-8)
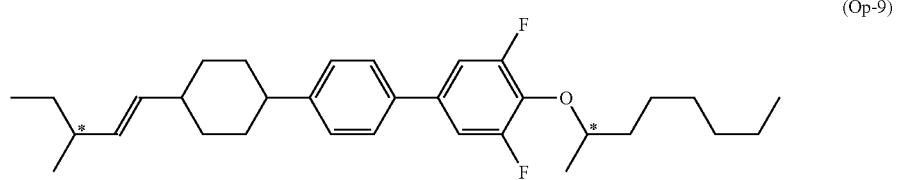 (Op-9)

-continued

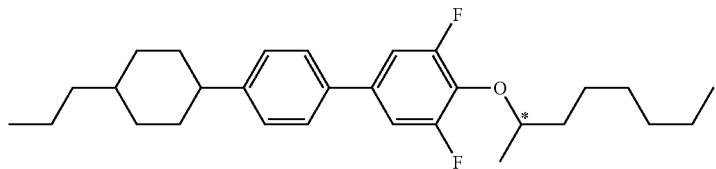
(Op-10)

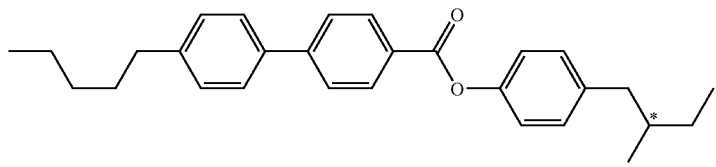
(Op-11)

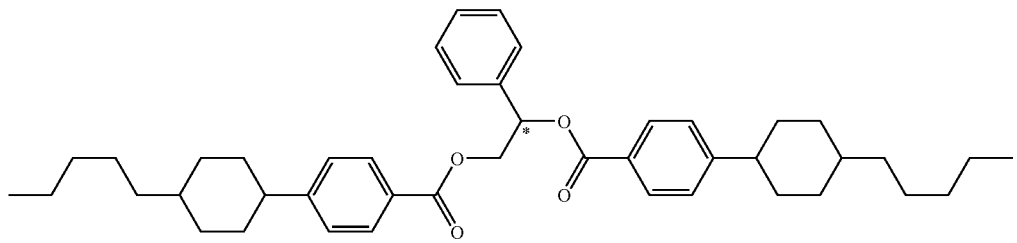
(Op-12)

Production Method of Liquid Crystal Composition

The liquid crystal composition of the invention can be produced in the following manner. In the case where compounds as the constitutional components are in a liquid state, the compounds may be mixed and shaken to prepare the composition. In the case where compounds as the constitutional components include solid, the compounds may be mixed and heated to make the solid into a liquid state, followed by shaking, to prepare the composition. The liquid crystal composition of the invention may be produced in any other known methods.

Liquid Crystal Display Device

The liquid crystal composition of the invention may be used in a device having a PC mode, a TN mode, an STN mode, a BTN mode, an ECB mode, an OCB mode, an IPS mode and a VA mode, and in particular, may be used in a device of an EPS mode and a VA mode by a vertical orientation system. The driving mode of the liquid crystal display devices may be a passive matrix (PM) driving system or an active matrix (AM) driving system.

The liquid crystal display device of the invention can be used as an NCAP (nematic curvilinear aligned phase) device prepared by microcapsulating the liquid crystal composition, and as a PD (polymer dispersed) device having a three-dimensional network polymer formed in the liquid crystal composition, for example, a PN (polymer network) device.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be described in more detail with reference to examples below, but the invention is not construed as being limited to the examples. All occurrences of "%" are by weight unless otherwise indicated.

The resulting compounds are identified by magnetic nuclear resonance spectra obtained by $^1$H-NMR analysis, gas chromatograms obtained by gas chromatography (GC) analysis, and so forth, as described below.

H-NMR Analysis

A DRX-500 (produced by Bruker Biospin Co., Ltd.) was used for measurement. A sample produced in the examples and so forth was dissolved in a deuterated solvent capable of dissolving the sample, such as $CDCl_3$, and the measurement was carried out at room temperature and 500 MHz with an accumulated number of 24. In the description of the resulting nuclear resonance spectra, s means a singlet, d means a doublet, t means a triplet, q means a quartet, and m means a multiplet. Tetramethylsilane (TMS) was used as a standard substance indicating zero point of chemical shift δ.

GC Analysis

A Gas Chromatograph Model GC-14B made by Shimadzu was used for measurement. Capillary column CBP1-M25-025 (length: 25 m, bore: 0.22 mm, film thickness: 0.25 μm, dimethylpolysiloxane as stationary phase, no polarity) produced by Shimadzu Corp. was used as a column. Helium was used as a carrier gas and adjusted to a flow rate of 1 mL/min. The temperature of a sample vaporizing chamber was 280° C., and the temperature of the detector (FID) was 300° C.

The sample was dissolved in toluene to prepare a 1% by weight solution, and 1 μL of the resulting solution was injected into the sample vaporizing chamber.

A Chromatopac Model C-R6A, produced by Shimadzu Corp., or an equivalent thereof was used as a recorder. The gas chromatogram obtained showed a retention time of a peak and a peak area corresponding to the component compound.

Solvents for diluting the sample may also be chloroform, hexane, and so forth. The following capillary columns may also be used: a capillary column DB-1, produced by Agilent Technologies Inc. (length: 30 m, bore: 0.32 mm, film thickness: 0.25 μm), a capillary column HP-1, produced by Agilent Technologies Inc. (length: 30 m, bore: 0.32 mm, film thickness: 0.25 μm), a capillary column Rtx-1, produced by Restek Corporation (length: 30 m, bore: 0.32 mm, film thickness: 0.25 μm), and a capillary column BP-1, produced by SGE International Pty. Ltd. (length: 30 m, bore: 0.32 mm, film thickness: 0.25 μm).

An area ratio of each peak in the gas chromatogram corresponds to a ratio of the component compound. In general, the percentages by weight of the component compounds of the analyzed sample are not completely identical to the percentages by area of the peaks of the analyzed sample. According to the invention, however, the percentages by weight of the component compounds of the analyzed sample correspond to the percentages by area of the peaks of the analyzed sample because the correction coefficient is substantially 1 when the aforementioned columns are used in the invention.

Sample of Liquid Crystal Compound for Measuring Characteristics

A sample of the liquid crystal compound for measuring characteristics includes two cases, i.e., the case where the compound itself is used as a sample, and the case where the compound is mixed with mother liquid crystals to prepare a sample.

In the later case where a sample is prepared by mixing the compound with mother liquid crystals, the measurement is carried out in the following manner. A sample was produced by mixing 15% by weight of the compound and 85% by weight of mother liquid crystals. A value of characteristics of the compound was calculated by extrapolating from a value obtained by measurement.

Extrapolated Value=(100×(measured value of sample)−(percentage by weight of mother liquid crystals)×(value measured for mother liquid crystals))/(percentage by weight of liquid crystal compound)

In the case where a smectic phase was separated out or crystals were deposited at 25° C. at this ratio of the liquid crystal compound and the mother liquid crystals, the ratio of the compound and the mother liquid crystals was changed step by step in the order of (10% by weight/90% by weight), (5% by weight/95% by weight), (1% by weight/99% by weight), respectively. The value of characteristics of the sample was measured at a ratio where no smectic phase was separated out or no crystal was deposited at 25° C., and an extrapolated value was obtained by the aforementioned equation, which was designated as a value of characteristics of the liquid crystal compound.

While there are various kinds of mother crystals for the aforementioned measurement, the composition of the mother crystals A was as follows, for example.

Mother Liquid Crystals A:

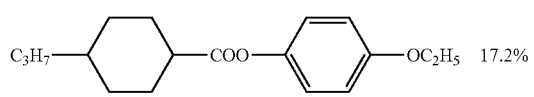

-continued

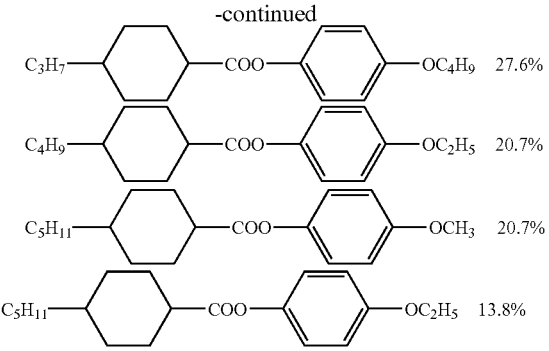

As a sample for measuring a value of characteristics of a liquid crystal composition, the liquid crystal composition itself was used.

Measurement Method of Characteristics of Liquid Crystal Compound

Measurement of the characteristics was carried out according to the following methods. Most methods are described in the Standard of Electric Industries Association of Japan, EIAJ ED-2521A or those with some modifications. A TFT was not attached to a TN device or a VA device used for measurement.

Among the measured values, the values obtained with the liquid crystal compound itself as a sample and the values obtained with the liquid crystal composition itself as a sample were described as experimental data. In the case where the values were obtained with the mixture of the compound with the mother liquid crystals, the extrapolated values were described as experimental data.

Phase Structure and Phase Transition Temperature (° C.): The measurement was carried out in the methods (1) and (2) below.

(1) A compound was placed on a hot plate (Hot Stage Model FP-52, produced by Mettler Co., Ltd.) in a melting point apparatus equipped with a polarizing microscope, and while heating at the rate of 3° C. per minute, the state of the phase and the changes thereof were observed with the polarizing microscope to determine the kind of the phase.

(2) A sample was heated and cooled at a rate of 3° C. per minute by using a scanning calorimeter, DSC-7 System or Diamond DSC System, produced by Perkin-Elmer, Inc., whereby a starting point of an endothermic peak or an exothermic peak associated with phase change of the sample was obtained by extrapolation (on set) to determine phase transition temperature.

In the following description, a crystal is denoted by "C." In the case where a crystal is distinguished into two crystals, they are denoted by "$C_1$" and "$C_2$," respectively. A smectic phase is denoted by "S," and a nematic phase is denoted by "N." A liquid (isotropic phase) is denoted by "Iso." In the case where a smectic phase is distinguished into a smectic B phase and a smectic A phase, they are denoted by "$S_B$" and "$S_A$," respectively. The expression of the phase transition temperature, C 50.0 N 100.0 Iso, for example, means that the transition temperature of from a crystal to a nematic phase (CN) is 50.0° C., and the transition temperature of from a nematic phase to a liquid (NI) is 100.0° C. The other expressions are applied with the same rule.

Maximum Temperature of Nematic Phase ($T_{NI}$; ° C.): A sample (a liquid crystal composition or a mixture of a liquid crystal compound and the mother liquid crystals) was placed on a hot plate (Hot Stage Model FP-52, produced by Mettler Co., Ltd.) in a melting point apparatus equipped with a polarizing microscope, and while heating at the rate of 1° C. per minute, was observed with the polarizing microscope. A temperature where a part of the sample was changed from a nematic phase to an isotropic liquid was designated as a maximum temperature of a nematic phase. The maximum temperature of a nematic phase may be abbreviated to "a maximum temperature" in some cases.

Low Temperature Compatibility: Samples were prepared by mixing the mother liquid crystals and a liquid crystal compound to make a ratio of the liquid crystal compound of 20% by weight, 15% by weight, 10% by weight, 5% by weight, 3% by weight and 1% by weight, respectively, and then placed in glass bottles. The glass bottles were stored in a freezer at −10° C. or −20° C. for a prescribed period of time, and then were observed as to whether or not a crystal or a smectic phase was deposited.

Viscosity (η; measured at 20° C.; mPa·s): The viscosity was measured by means of an E-type viscometer.

Rotation Viscosity (γ1; measured at 25° C.; mPa·s): The rotation viscosity was measured according to the method disclosed in M. Imai, et al., *Molecular Crystals and Liquid Crystals*, vol. 259, p. 37 (1995). A sample (a liquid crystal composition or a mixture of a liquid crystal compound and the mother liquid crystals) was placed in a VA device having a cell gap between two glass plates of 20 μm. The VA device was impressed with a voltage in a range of from 30 V to 50 V stepwise by 1 V. After a period of 0.2 second with no impress of voltage, voltage impress was repeated with only one rectangular wave (rectangular pulse of 0.2 second) and application of no voltage (2 seconds). A peak current and a peak time of a transient current generated by the voltage impress were measured. The rotation viscosity was obtained from the measured values and the calculating equation (8) in the literature by M. Imai, et al., p. 40. As the dielectric anisotropy necessary for the calculation, the value measured by the measuring method of dielectric anisotropy described below.

that of the rubbing. A refractive index (n⊥) was measured when the direction of polarized light was perpendicular to that of the rubbing. A value of optical anisotropy (Δn) was calculated from the equation; (Δn)=(n∥)−(n⊥).

Dielectric Anisotropy (Δ∈; measured at 25° C.): A solution of octadecyltriethoxysilane (0.16 mL) and ethanol (20 mL) was coated on a glass substrate having been well cleaned. The glass substrate was spun with a spinner and then heated to 150° C. for 1 hour. A VA device having a distance (cell gap) of 20 μm was fabricated with two sheets of the glass substrates.

A polyimide oriented film was prepared on a glass substrate in the similar manner. The oriented film of the glass substrate was rubbed, and a TN device having a distance between two glass substrates of 9 μm and a twist angle of 80° was fabricated.

A sample (a liquid crystal composition or a mixture of a liquid crystal compound and the mother liquid crystals) was put in the VA device, which was then impressed with a voltage of 0.5 V (1 kHz, sine wave) to measure a dielectric constant (∈∥) in the major axis direction of the liquid crystal molecule.

A sample (a liquid crystal composition or a mixture of a liquid crystal compound and the mother liquid crystals) was put in the TN device, which was then impressed with a voltage of 0.5 V (1 kHz, sine wave) to measure a dielectric constant (∈⊥) in the minor axis direction of the liquid crystal molecule.

The dielectric anisotropy was calculated from the equation; (Δ∈)=(∈∥)−(∈⊥).

Synthesis Example of Liquid Crystal Compound

Example 1

Synthesis of 3-methyl-6-(trans-4-pentylcyclohexyl) tetrahydro-2-pyranone (Compound No. 6)

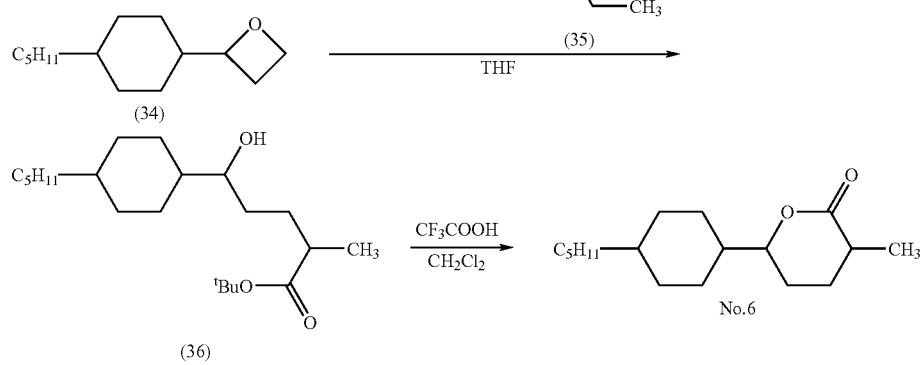

Optical Anisotropy (refractive index anisotropy; Δn; measured at 25° C.): Measurement was carried out with an Abbe refractometer mounting a polarizing plate on an ocular using light having a wavelength of 589 nm at a temperature of 25° C. The surface of a main prism was rubbed in one direction, and then a sample (a liquid crystal composition or a mixture of a liquid crystal compound and the mother liquid crystals) was dropped on the main prism. A refractive index (n∥) was measured when the direction of polarized light was parallel to First Step 76 mL of lithium diisopropylamide (2M toluene solution, corresponding to 152.0 mmol) was added dropwise to a solution of tert-butyl propionate (35) (19.8 g, 152.0 mmol) dissolved in 100 mL of THF while keeping at −70° C. or less, and reacted at that temperature for 30 minutes. A solution of 2-(trans-4-pencylcyclohexyl)oxetane (34) (8.6 g 40.9 mmol) dissolved in 40 mL of THF and 17.9 mL (142.5 mmol) of diethyl boron trifluoride were added dropwise to the reaction solution while keeping at −70° C. or less, and reacted at that temperature for 1 hour. The reaction mixture was put in 300 mL of a saturated NH₄Cl aqueous solution having been cooled with ice, and then extracted with 200 mL of ethyl acetate. The resulting organic layer was washed with water (150 mL×2) and dried over anhydrous sodium sulfate, and the solvent was distilled off under reduced pressure. The resulting residue was purified by column chromatography (element: heptane/ethyl acetate=4/1, medium: silica gel) to obtain tert-butyl-2-methyl-5-hydroxy-5-(trans-4-pentylcyclohexyl)pentanoate (36) (12.6 g, 37.0 mmol). The yield based on the compound (34) was 90%.

Second Step

A solution of 14.2 mL (185 mmol) of trifluoroacetic acid dissolved in 60 mL of dichloromethane was added dropwise under cooling with ice to a solution of 12.6 g (37.0 mmol) of tert-butyl 2-methyl-5-hydroxy-5-(trans-4-pentylcyclohexyl) pentanoate (36) obtained in the first step dissolved in 60 mL of dichloromethane, and reacted at room temperature for 5 hours. The reaction mixture was put in 200 mL of water, and then extracted with 100 mL of dichloromethane. The resulting organic layer was washed with water (150 mL×2) and dried over anhydrous sodium sulfate, and the solvent was distilled off under reduced pressure. The resulting residue was purified by column chromatography (developing solvent: heptane/ethyl acetate=9/1, column packing: silica gel) and then recrystallized from heptane to obtain 3.7 g (13.7 mmol) of 3-methyl-6-(trans-4-pentylcyclohexyl)tetrahydro-2-pyranone (Compound No. 6). The resulting compound was in the form of colorless crystals, and the yield based on the compound (36) was 37%.

The resulting Compound No. 6 had a transition temperature (° C.) of C 52.4 Iso. The chemical shift δ (ppm) in ¹H-NMR analysis was as follows, and thus the resulting compound was identified as 3-methyl-6-(trans-4-pentylcyclohexyl)tetrahydro-2-pyranone (Compound No. 6). The solvent for measurement was CDCl₃. Chemical shift δ (ppm): 4.10-4.00 (m, 1H), 2.63-2.37 (m, 1H), 2.10-1.85 (m, 3H), 1.79 (d, 2H), 1.70-1.44 (m, 4H), 1.32-0.98 (m, 16H), 0.86 (t, 3H).

Example 2

Synthesis of 3-(2-(4-ethylphenyl)-1-ethyl)-6-(trans-4-propylcyclohexyl)tetrahydro-2-pyranone (Compound No. 50)

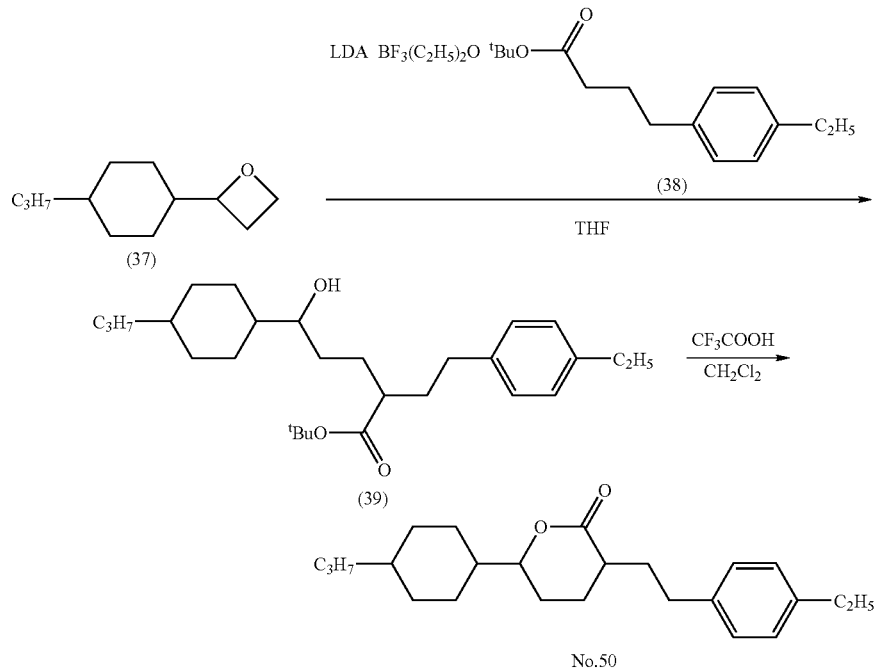

No.50

First Step

Reaction operations were carried out according to the first step of Example 1 by using 2-(trans-4-propylcyclohexyl)oxetane (37) (3.5 g, 19.5 mmol) and tert-butyl 3-(4-ethylphenyl) butyrate (38) (15.5 g, 62.4 mmol) as starting materials to obtain tert-butyl 2-(2-(4-ethylphenyl)-1-ethyl)-5-hydroxy-5-(trans-4-propylcyclohexyl)pentanoate (39) (7.5 g, 17.5 mmol). The yield based on the compound (37) was 90%.

Second Step

Reaction operations were carried out according to the second step of Example 1 by using tert-butyl 2-(2-(4-ethylphenyl)-1-ethyl)-5-hydroxy-5-(trans-4-propylcyclohexyl)pentanoate (39) (7.5 g, 17.5 mmol) as a starting material to obtain 2.7 g (7.5 mmol) of 3-(2-(4-ethylphenyl)-1-ethyl)-6-(trans-4-propylcyclohexyl)tetrahydro-2-pyranone (Compound No. 50). The resulting compound was in the form of colorless crystals, and the yield based on the compound (39) was 43%.

The resulting Compound No. 50 had a transition temperature (° C.) of C 116.2 S_A 159.7 I. The chemical shift δ (ppm) in ¹H-NMR analysis was as follows, and thus the resulting compound was identified as 3-(2-(4-ethylphenyl)-1-ethyl)-6-(trans-4-propylcyclohexyl)tetrahydro-2-pyranone (Compound No. 50). The solvent for measurement was CDCl₃. Chemical shift δ (ppm): 7.13 (s, 4H), 4.08-3.94 (m, 1H), 2.70 (t, 2H), 2.62 (q, 2H), 2.45-1.81 (m, 6H), 1.78 (d, 2H), 1.70-1.43 (m, 4H), 1.34-0.97 (m, 12H), 0.86 (t, 3H).

Example 3

Synthesis of 3-(trans-4-ethylcyclohexyl)-6-(trans-4-propylcyclohexyl)tetrahydro-2-pyranone (Compound No. 34)

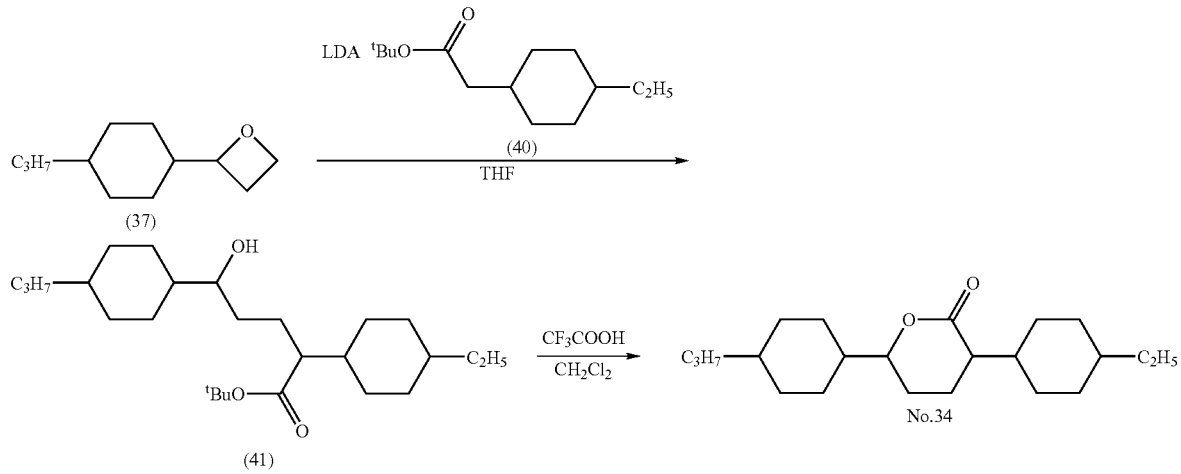

First Step

Reaction operations were carried out according to the first step of Example 1 by using 1-(trans-4-propylcyclohexyl)oxetane (37) (3.1 g, 17.0 mmol) and tert-butyl 2-(trans-4-ethylcyclohexyl)acetate (40) (12.3 g, 54.4 mmol) as starting materials to obtain tert-butyl 2-(trans-4-ethylcyclohexyl)-5-hydroxy-5-(trans-4-propylcyclohexyl)pentanoate (41) (6.8 g, 14.5 mmol). The yield based on the compound (37) was 85%.

Second Step

Reaction operations were carried out according to the second step of Example 1 by using tert-butyl 2-(trans-4-ethylcyclohexyl)-5-hydroxy-5-(trans-4-propylcyclohexyl)pentanoate (41) (6.8 g, 14.5 mmol) as a starting material to obtain 1.9 g (5.8 mmol) of 3-(trans-4-ethylcyclohexyl)-6-(trans-4-propylcyclohexyl)tetrahydro-2-pyranone (Compound No. 34). The resulting compound was in the form of colorless crystals, and the yield based on the compound (41) was 40%.

The resulting Compound No. 34 had a transition temperature (° C.) of C 211.6 I. The chemical shift δ (ppm) in $^1$H-NMR analysis was as follows, and thus the resulting compound was identified as 3-(trans-4-ethylcyclohexyl)-6-(trans-4-propylcyclohexyl)tetrahydro-2-pyranone (Compound No. 34). The solvent for measurement was $CDCl_3$. Chemical shift δ (ppm): 4.03-3.99 (m, 1H), 2.36-2.31 (m, 1H), 2.03-1.46 (m, 13H), 1.36-0.87 (m, 23H).

Example 4

Synthesis of 3-propyl-6-(trans-4-(4-ethylphenyl)cyclohexyl)tetrahydro-2-pyranone (Compound No. 75)

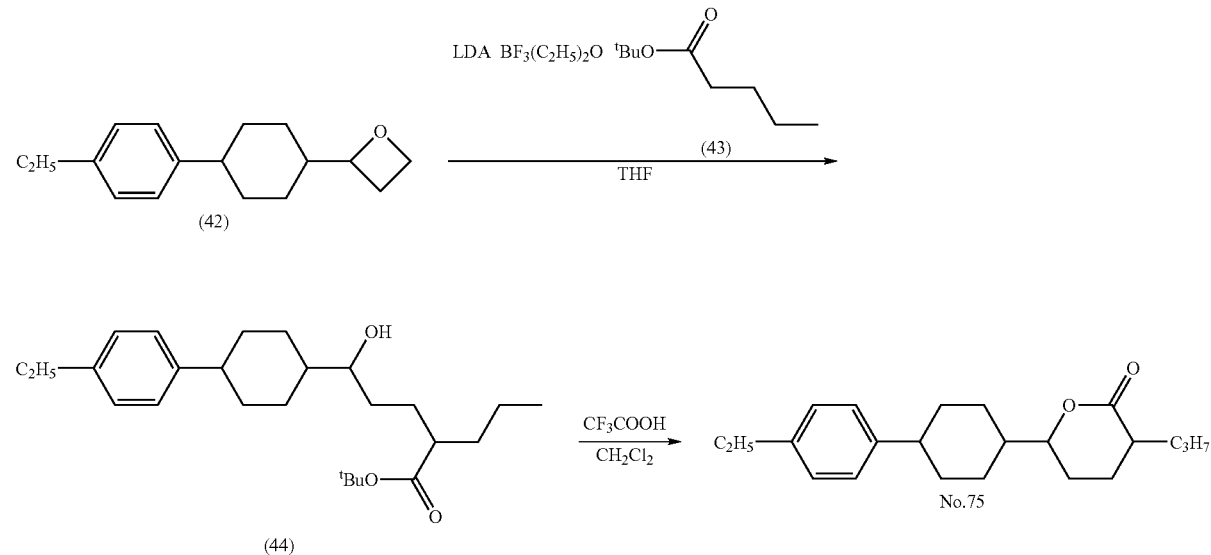

First Step

Reaction operations were carried out according to the first step of Example 1 by using 2-(trans-4-(4-ethylphenyl)cyclohexyl)oxetane (42) (7.5 g, 30.9 mmol) and tert-butylpentanoate (43) (15.6 g, 98.9 mmol) as starting materials to obtain tert-butyl 2-propyl-5-hydroxy-5-(trans-4-(4-ethylphenyl)cyclohexyl)pentanoate (44) (11.6 g, 28.8 mmol). The yield based on the compound (42) was 93%.

Second Step

Reaction operations were carried out according to the second step of Example 1 by using tert-butyl 2-propyl-5-hydroxy-5-(trans-4-(4-ethylphenyl)cyclohexyl)pentanoate (44) (11.6 g, 28.8 mmol) as a starting material to obtain 3.6 g (10.9 mmol) of 3-propyl-6-(trans-4-(4-ethylphenyl)cyclohexyl)tetrahydro-2-pyranone (Compound No. 75). The resulting compound was in the form of colorless crystals, and the yield based on the compound (44) was 38%.

The resulting Compound No. 75 had a transition temperature (° C.) of C 119.2 I. The chemical shift δ (ppm) in $^1$H-NMR analysis was as follows, and thus the resulting compound was identified as 3-propyl-6-(trans-4-(4-ethylphenyl)cyclohexyl)tetrahydro-2-pyranone (Compound No. 75). The solvent for measurement was CDCl$_3$. Chemical shift δ (ppm): 7.11 (s, 4H), 4.13-4.05 (m, 1H), 2.62 (t, 2H), 2.49-2.35 (m, 2H), 2.15-2.02 (m, 2H), 1.97-1.82 (m, 5H), 1.72-1.25 (m, 10H), 1.21 (t, 3H), 0.94 (t, 3H).

Example 5

Synthesis of 3-(trans-4-methoxycyclohexyl)-6-hexyl-tetrahydro-2-pyranone (Compound No. 25)

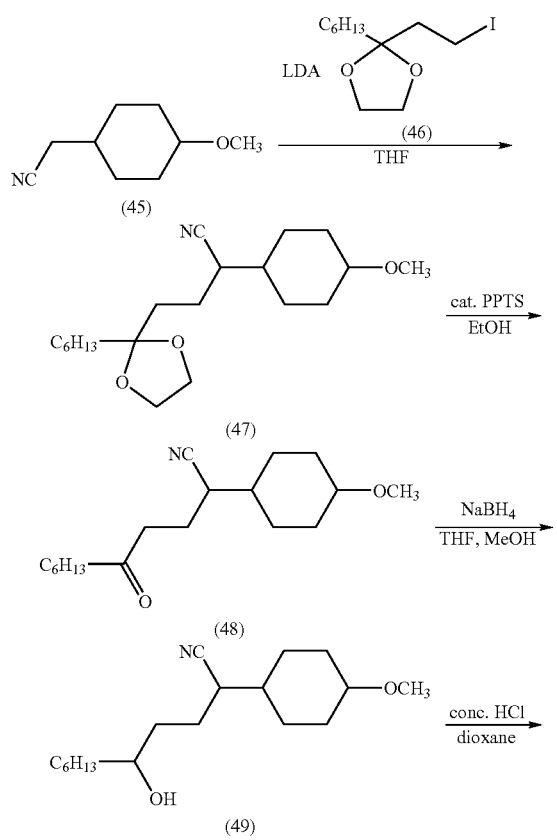

-continued

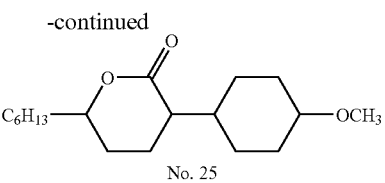

No. 25

First Step 15 mL of lithium diisopropylamide (2M toluene solution, corresponding to 30.0 mmol) was added dropwise to a solution of 1-(trans-4-methoxycyclohexyl)acetonitrile (45) (3.9 g, 25.5 mmol) dissolved in 150 mL of THF in a nitrogen atmosphere while keeping at −70° C. or less, and after increasing the temperature, reacted for 30 minutes at 0° C. A solution of 1-iodo-3,3-(ethylenedioxy)nonane (46) (9.6 g, 30.0 mmol) dissolved in 90 mL of THF was added dropwise to the reaction solution in a nitrogen atmosphere while keeping 0° C., and reacted at that temperature for 2 hours. The reaction mixture was put in 200 mL of a saturated NH$_4$Cl aqueous solution having been cooled with ice, and then extracted with 200 mL of ethyl acetate. The resulting organic layer was washed with water (150 mL×2) and dried over anhydrous sodium sulfate, and the solvent was distilled off under reduced pressure. The resulting residue was purified by column chromatography (developing solvent: heptane/ethyl acetate=30/1, column packing: silica gel) to obtain 1-cyano-1-(trans-4-methoxycyclohexyl)-4,4-(ethylenedioxy)decane (47) (6.2 g, 18.3 mmol). The resulting compound was in the form of a colorless liquid, and the yield based on the compound (45) was 72%.

Second Step

Pyridinium p-toluenesulfonate (0.9 g, 3.6 mmol) was added to a solution of 1-cyano-1-(trans-4-methoxycyclohexyl)-4,4-(ethylenedioxy)decane (47) (6.2 g, 18.3 mmol) obtained in the first step dissolved in 120 mL of ethanol, and refluxed under heating for 10 hours. The reaction mixture was cooled to room temperature and then put in 100 mL of a saturated sodium bicarbonate aqueous solution, and then extracted with 100 mL of ethyl acetate. The resulting organic layer was washed with water (100 mL×2) and dried over anhydrous sodium sulfate, and the solvent was distilled off under reduced pressure. The resulting residue was purified by column chromatography (developing solvent: heptane/ethyl acetate=9/1, column packing: silica gel) to obtain 1-cyano-1-(trans-4-methoxycyclohexyl)-4-decanone (48) (5.1 g, 17.4 mmol). The resulting compound was in the form of a colorless liquid, and the yield based on the compound (47) was 95%.

Third Step

A solution of 1-cyano-1-(trans-4-methoxycyclohexyl)-4-decanone (48) (5.1 g, 17.4 mmol) obtained in the second step dissolved in 100 mL of THF and 50 mL of methanol was cooled with ice, to which sodium borohydride (0.79 g, 20.9 mmol) was then gradually added, followed by stirring under cooling with ice for 1 hour. The reaction mixture was put in 100 mL of iced water, and then extracted with 100 mL of ethyl acetate. The resulting organic layer was washed with water (100 mL×2) and dried over anhydrous sodium sulfate, and the solvent was distilled off under reduced pressure. The resulting residue was purified by column chromatography (developing solvent: heptane/ethyl acetate=4/1, column packing: silica gel) to obtain 1-cyano-1-(trans-4-methoxycyclohexyl)-4-decanol (49) (5.1 g, 17.4 mmol). The resulting compound was in the form of colorless crystals, and the yield based on the compound (48) was 100%.

Fourth Step 20 mL of concentrated hydrochloric acid was added to a solution of 1-cyano-1-(trans-4-methoxycyclohexyl)-4-decanol (49) (5.1 g, 17.4 mmol) obtained in the third step dissolved in 200 mL of 1,3-dioxane, and refluxed under heating for 20 hours. The reaction mixture was cooled to room temperature and then put in 100 mL of water, and then extracted with 100 mL of ethyl acetate. The resulting organic layer was washed with water (100 mL×2) and dried over anhydrous sodium sulfate, and the solvent was distilled off under reduced pressure. The resulting residue was purified by column chromatography (developing solvent: heptane/ethyl acetate=20/1, column packing: silica gel) and then recrystallized from heptane to obtain 3-(trans-4-methoxycyclohexyl)-6-hexyl-tetrahydro-2-pyranone (Compound No. 25) (2.1 g, 6.9 mmol). The resulting compound was in the form of a colorless liquid, and the yield based on the compound (49) was 40%.

The resulting Compound No. 25 had a transition temperature (° C.) of C 48.3 I. The chemical shift δ (ppm) in $^1$H-NMR analysis was as follows, and thus the resulting compound was identified as 3-(trans-4-methoxycyclohexyl)-6-hexyl-tetrahydro-2-pyranone (Compound No. 25). The solvent for measurement was CDCl$_3$. Chemical shift δ (ppm): 4.28-4.17 (m, 1H), 3.34 (s, 3H), 3.11-3.04 (m, 1H), 2.44-2.31 (m, 1H), 2.10-1.08 (m, 26H), 0.88 (t, 3H).

Example 6

Synthesis of 3-(trans-4-(trans-4-pentylcyclohexyl) cyclohexyl)-6-hexyl-tetrahydro-2-pyranone (Compound No. 86)

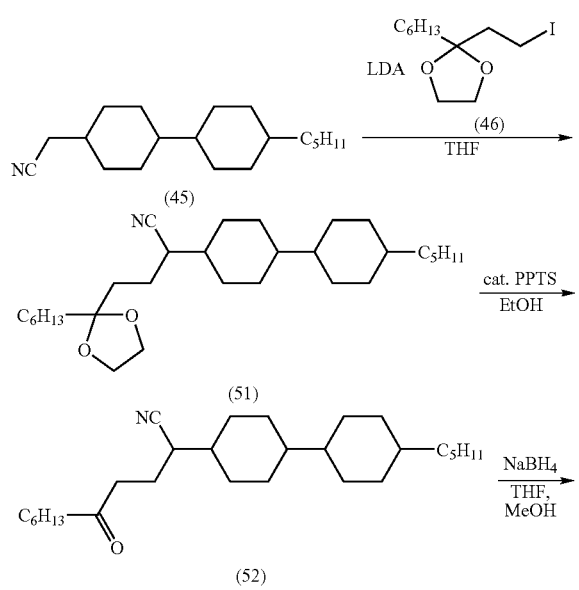

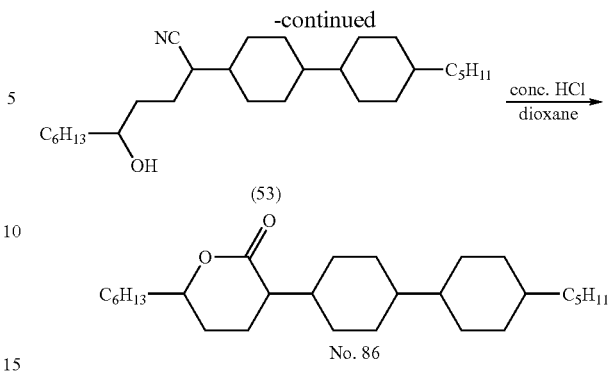

First Step

Reaction operations were carried out according to the first step of Example 5 by using 1-(trans-4-(trans-4-pengylcyclohexyl)cyclohexyl)acetonitrile (50) (4.6 g, 17.0 mmol) and 1-iodo-3,3-(ethylenedioxy)nonane (46) (6.4 g, 20.4 mmol) as starting materials to obtain 1-cyano-1-(trans-4-(trans-4-pentylcyclohexyl)cyclohexyl)-4,4-(ethylenedioxy)decane (51) (5.8 g, 12.6 mmol). The resulting compound was in the form of colorless crystals, and the yield based on the compound (50) was 74%.

Second Step

Reaction operations were carried out according to the second step of Example 5 by using 1-cyano-1-(trans-4-(trans-4-pentylcyclohexyl)cyclohexyl)-4,4-(ethylenedioxy)decane (51) (5.8 g, 12.6 mmol) obtained in the first step as a starting material to obtain 1-cyano-1-(trans-4-(trans-4-pentylcyclohexyl)cyclohexyl)-4-decanone (52) (5.2 g, 12.5 mmol). The resulting compound was in the form of colorless crystals, and the yield based on the compound (51) was 99%.

Third Step

Reaction operations were carried out according to the third step of Example 5 by using 1-cyano-1-(trans-4-(trans-4-pentylcyclohexyl)cyclohexyl)-4-decanone (52) (5.2 g, 12.5 mmol) obtained in the second step as a starting material to obtain 1-cyano-1-(trans-4-(trans-4-pentylcyclohexyl)cyclohexyl)-4-decanol (53) (4.2 g, 10.0 mmol). The resulting compound was in the form of colorless crystals, and the yield based on the compound (52) was 80%.

Fourth Step

Reaction operations were carried out according to the fourth step of Example 5 by using 1-cyano-1-(trans-4-(trans-4-pentylcyclohexyl)cyclohexyl)-4-decanol (53) (4.2 g, 10.0 mmol) obtained in the third step as a starting material to obtain 3-(trans-4-(trans-4-pentylcyclohexyl)cyclohexyl)-6-hexyl-tetrahydro-2-pyranone (Compound No. 86) (2.9 g, 6.9 mmol). The resulting compound was in the form of colorless crystals, and the yield based on the compound (53) was 69%.

The resulting Compound No. 86 had a transition temperature (° C.) of C 76.7 S$_B$ 196.6 I. The chemical shift δ (ppm) in $^1$H-NMR analysis was as follows, and thus the resulting compound was identified as 3-(trans-4-(trans-4-pentylcyclohexyl)cyclohexyl)-6-hexyl-tetrahydro-2-pyranone (Compound No. 86). The solvent for measurement was CDCl$_3$. Chemical shift δ (ppm): 4.27-4.17 (m, 1H), 2.41-2.28 (m, 1H), 2.06-0.79 (m, 48H).

Characteristics of Liquid Crystal Compounds

The five compounds described above as the mother liquid crystals A were mixed to prepare mother liquid crystals A having a nematic phase. The mother liquid crystals A had the following characteristics:

Maximum Temperature ($T_{NI}$)=74.0° C.
Optical Anisotropy (Δn)=0.087
Dielectric Anisotropy (Δ∈)=−1.3

Example 7

Synthesis of 3-methyl-6-(2-(trans-4-pentylcyclohexyl)-1-ethyl)tetrahydro-2-pyranone (Compound No. 198)

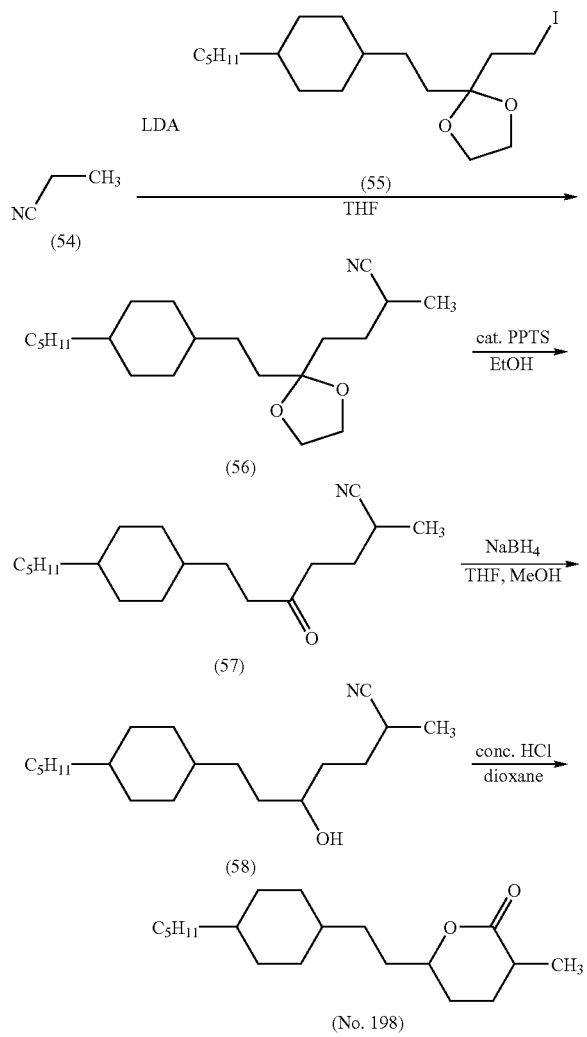

First Step

Reaction operations were carried out according to the first step of Example 5 by Propionitrile (54) (0.55 g, 10.1 mmol) and 1-iodo-3,3-(ethylenedioxy)-5-(trans-4-penthylcyclohexyl)pentane (55) (2.75 g, 6.73 mmol) as starting materials to obtain 2-cyano-7-(trans-4-pentylcyclohexyl)-5,5-(ethylenedioxy)heptane (56) (1.80 g, 5.36 mmol). The resulting compound was in the form of colorless liquid, and the yield based on the compound (55) was 80%.

Second Step

Reaction operations were carried out according to the second step of Example 5 by using 2-cyano-7-(trans-4-pentyl-cyclohexyl)-5,5-(ethylenedioxy)heptane (56) (1.80 g, 5.36 mmol) obtained in the first step as a starting material to obtain 2-cyano-7-(trans-4-pentylcyclohexyl)-5-heptanon (57) (1.25 g, 4.29 mmol). The resulting compound was in the form of colorless liquid, and the yield based on the compound (56) was 80%.

Third Step

Reaction operations were carried out according to the third step of Example 5 by using 2-cyano-7-(trans-4-pentyl-cyclohexyl)-5-heptanon (57) (1.25 g, 4.29 mmol) obtained in the second step as a starting material to obtain 2-cyano-7-(trans-4-pentylcyclohexyl)-5-heptanol (58) (0.98 g, 3.34 mmol). The resulting compound was in the form of colorless liquid, and the yield based on the compound (57) was 78%.

Fourth Step

Reaction operations were carried out according to the fourth step of Example 5 by using 2-cyano-7-(trans-4-pentyl-cyclohexyl)-5-heptanol (58) (0.98 g, 3.34 mmol) obtained in the third step as a starting material to obtain 3-methyl-6-(2-(trans-4-pentylcyclohexyl)-1-ethyl)tetrahydro-2-pyranone (Compound No. 198) (0.47 g, 1.66 mmol). The resulting compound was in the form of colorless crystals, and the yield based on the compound (58) was 50%.

The resulting Compound No. 198 had a transition temperature (° C.) of C 53.24 I. The chemical shift δ (ppm) in $^1$H-NMR analysis was as follows, and thus the resulting compound was identified as 3-methyl-6-(2-(trans-4-pentylcyclohexyl)-1-ethyl)tetrahydro-2-pyranone (Compound No. 198). The solvent for measurement was $CDCl_3$.

Chemical shift δ (ppm): 4.27-4.17 (m, 1H), 2.41-2.28 (m, 1H), 2.06-0.79 (m, 48H)

Example 8

Characteristics of 3-methyl-6-(trans-4-pentylcyclohexyl)tetrahydro-2-pyrone (Compound No. 6)

85% by weight of the mother liquid crystals A and 15% by weight of 3-methyl-6-(trans-4-pentylcyclohexyl)tetrahydro-2-pyrone (Compound No. 6) were mixed to prepare a liquid crystal composition B. The liquid crystal composition B had the following characteristics.

Maximum Temperature ($T_{NI}$)=62.3° C.

Optical Anisotropy (Δn)=0.075

Dielectric Anisotropy (Δ∈)=−2.40

The liquid crystal compound (No. 6) had the following characteristics as calculated by extrapolation with the characteristics of the mother liquid crystals A and the liquid crystal composition B and the mixing ratio of them.

Maximum Temperature ($T_{NI}$)=−7.4° C.

Optical Anisotropy (Δn)=0.008

Dielectric Anisotropy (Δ∈)=−8.35

The dielectric anisotropy (Δ∈) was negatively increased by adding the liquid crystal compound (No. 6) to the mother liquid crystals A, and therefore, it was found that a liquid crystal display device using a liquid crystal composition containing the liquid crystal compound (No. 6) as a constitutional component could be driven at a low voltage. The liquid crystal composition B was not changed into crystals after storing at −10° C. or less for 30 days, and therefore, it was found that the liquid crystal compound (No. 6) has excellent compatibility at a low temperature.

Example 9

Characteristics of 3-(2-(4-ethylphenyl)-1-ethyl)-6-(trans-4-propylcyclohexyl)tetrahydro-2-pyranone (Compound No. 50)

90% by weight of the mother liquid crystals A and 10% by weight of 3-(2-(4-ethylphenyl)-1-ethyl)-6-(trans-4-propylcyclohexyl)tetrahydro-2-pyranone (Compound No. 50) were mixed to prepare a liquid crystal composition C. The liquid crystal composition C had the following characteristics.
Maximum Temperature $(T_{NI})$=74.0° C.
Optical Anisotropy ($\Delta$n)=0.087
Dielectric Anisotropy ($\Delta\in$)=−2.10
The liquid crystal compound (No. 50) had the following characteristics as calculated by extrapolation with the characteristics of the mother liquid crystals A and the liquid crystal composition C and the mixing ratio of them.
Maximum Temperature $(T_{NI})$=68.6° C.
Optical Anisotropy ($\Delta$n)=0.087
Dielectric Anisotropy ($\Delta\in$)=−7.68
The dielectric anisotropy ($\Delta\in$) was negatively increased by adding the liquid crystal compound (No. 50) to the mother liquid crystals A, and therefore, it was found that a liquid crystal display device using a liquid crystal composition containing the liquid crystal compound (No. 50) as a constitutional component could be driven at a low voltage.

Example 10

Characteristics of 3-(trans-4-ethylcyclohexyl)-6-(trans-4-propylcyclohexyl)tetrahydro-2-pyranone (Compound No. 34)

90% by weight of the mother liquid crystals A and 10% by weight of 3-(trans-4-ethylcyclohexyl)-6-(trans-4-propylcyclohexyl)tetrahydro-2-pyranone (Compound No. 34) were mixed to prepare a liquid crystal composition D. The liquid crystal composition D had the following characteristics.
Maximum Temperature $(T_{NI})$=77.5° C.
Optical Anisotropy ($\Delta$n)=0.084
Dielectric Anisotropy ($\Delta\in$)=−2.17
The liquid crystal compound (No. 34) had the following characteristics as calculated by extrapolation with the characteristics of the mother liquid crystals A and the liquid crystal composition D and the mixing ratio of them.
Maximum Temperature $(T_{NI})$=103.6° C.
Optical Anisotropy ($\Delta$n)=0.057
Dielectric Anisotropy ($\Delta\in$)=−8.83
The maximum temperature $(T_{NI})$ was largely increased by adding the liquid crystal compound (No. 34) to the mother liquid crystals A. The dielectric anisotropy ($\Delta\in$) was negatively increased by adding the liquid crystal compound (No. 34) to the mother liquid crystals A, and therefore, it was found that a liquid crystal display device using a liquid crystal composition containing the liquid crystal compound (No. 34) as a constitutional component could be driven at a low voltage.

Example 11

Characteristics of 3-propyl-6-(trans-4-(4-ethylphenyl)cyclohexyl)tetrahydro-2-pyranone (Compound No. 75)

95% by weight of the mother liquid crystals A and 5% by weight of 3-propyl-6-(trans-4-(4-ethylphenyl)cyclohexyl)tetrahydro-2-pyranone (Compound No. 75) were mixed to prepare a liquid crystal composition E. The liquid crystal composition E had the following characteristics.
Maximum Temperature $(T_{NI})$=74.5° C.
Optical Anisotropy ($\Delta$n)=0.087
Dielectric Anisotropy ($\Delta\in$)=−1.85
The liquid crystal compound (No. 75) had the following characteristics as calculated by extrapolation with the characteristics of the mother liquid crystals A and the liquid crystal composition E and the mixing ratio of them.
Maximum Temperature $(T_{NI})$=72.6° C.
Optical Anisotropy ($\Delta$n)=0.093
Dielectric Anisotropy ($\Delta\in$)=−9.45
The dielectric anisotropy ($\Delta\in$) was negatively increased by adding the liquid crystal compound (No. 75) to the mother liquid crystals A, and therefore, it was found that a liquid crystal display device using a liquid crystal composition containing the compound as a constitutional component could be driven at a low voltage.

Example 12

Characteristics of 3-(trans-4-methoxycyclohexyl)-6-hexyl-tetrahydro-2-pyranone (Compound No. 25)

85% by weight of the mother liquid crystals A and 15% by weight of 3-(trans-4-methoxycyclohexyl)-6-hexyl-tetrahydro-2-pyranone (Compound No. 25) were mixed to prepare a liquid crystal composition F. The liquid crystal composition F had the following characteristics.
Maximum Temperature $(T_{NI})$=56.1° C.
Optical Anisotropy ($\Delta$n)=0.074
Dielectric Anisotropy ($\Delta\in$)=−2.61
The liquid crystal compound (No. 25) had the following characteristics as calculated by extrapolation with the characteristics of the mother liquid crystals A and the liquid crystal composition F and the mixing ratio of them.
Maximum Temperature $(T_{NI})$=−48.7° C.
Optical Anisotropy ($\Delta$n)=−0.003
Dielectric Anisotropy ($\Delta\in$)=−9.35
The dielectric anisotropy ($\Delta\in$) was negatively increased by adding the liquid crystal compound (No. 25) to the mother liquid crystals A, and therefore, it was found that a liquid crystal display device using a liquid crystal composition containing the compound as a constitutional component could be driven at a low voltage.

Example 13

Characteristics of 3-(trans-4-(trans-4-pentylcyclohexyl)cyclohexyl)-6-hexyl-tetrahydro-2-pyranone (Compound No. 86)

90% by weight of the mother liquid crystals A and 10% by weight of 3-(trans-4-(trans-4-pentylcyclohexyl)cyclohexyl)-6-hexyl-tetrahydro-2-pyranone (Compound No. 86) were mixed to prepare a liquid crystal composition G. The liquid crystal composition G had the following characteristics.
Maximum Temperature $(T_{NI})$=77.3° C.
Optical Anisotropy ($\Delta$n)=0.085
Dielectric Anisotropy ($\Delta\in$)=−1.68
The liquid crystal compound (No. 86) had the following characteristics as calculated by extrapolation with the characteristics of the mother liquid crystals A and the liquid crystal composition G and the mixing ratio of them.

Maximum Temperature ($T_{NI}$)=128.6° C.
Optical Anisotropy ($\Delta n$)=0.051
Dielectric Anisotropy ($\Delta \in$)=−6.62

The maximum temperature ($T_{NI}$) was largely increased, and the dielectric anisotropy ($\Delta \in$) was negatively increased, by adding the liquid crystal compound (No. 86) to the mother liquid crystals A. The dielectric anisotropy ($\Delta \in$) was negatively increased by adding the liquid crystal compound (No. 86) to the mother liquid crystals A, and therefore, it was found that a liquid crystal display device using a liquid crystal composition containing the compound as a constitutional component could be driven at a low voltage.

Example 14

Characteristics of 3-methyl-6-(2-(trans-4-pentylcyclohexyl)-1-ethyl)tetrahydro-2-pyranone (Compound No. 198)

85% by weight of the mother liquid crystals A and 15% by weight of 3-methyl-6-(2-(trans-4-pentylcyclohexyl)-1-ethyl) tetrahydro-2-pyranone (Compound No. 198) were mixed to prepare a liquid crystal composition G. The liquid crystal composition H had the following characteristics.

Maximum Temperature ($T_{NI}$)=63.2° C.
Optical Anisotropy ($\Delta n$)=0.077
Dielectric Anisotropy ($\Delta \in$)=−2.30

The liquid crystal compound (No. 198) had the following characteristics as calculated by extrapolation with the characteristics of the mother liquid crystals A and the liquid crystal composition G and the mixing ratio of them.

Maximum Temperature ($T_{NI}$)=−1.4° C.
Optical Anisotropy ($\Delta n$)=0.020
Dielectric Anisotropy ($\Delta \in$)=−7.12

The dielectric anisotropy ($\Delta \in$) was negatively increased by adding the liquid crystal compound (No. 6) to the mother liquid crystals A, and therefore, it was found that a liquid crystal display device using a liquid crystal composition containing the liquid crystal compound (No. 6) as a constitutional component could be driven at a low voltage.

Example 15

The compounds Nos. 1 to 198 are synthesized in the similar manners as having been described. The compounds are shown along with the characteristic values including the transition temperature, the maximum temperature, the optical anisotropy and the dielectric anisotropy.

| No. | |
|---|---|
| 1 | 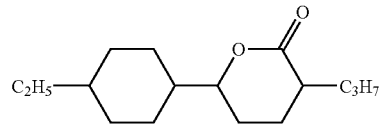 |
| 2 | 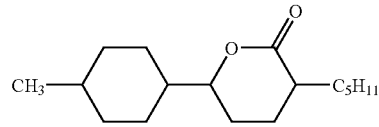 |
| 3 | 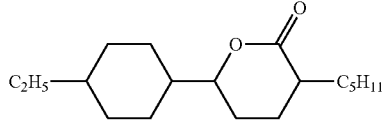 |
| 4 | 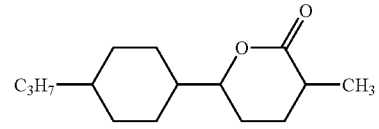 |
| 5 | 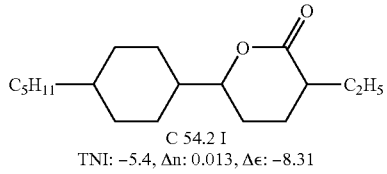<br>C 54.2 I<br>TNI: −5.4, Δn: 0.013, Δε: −8.31 |
| 6 | 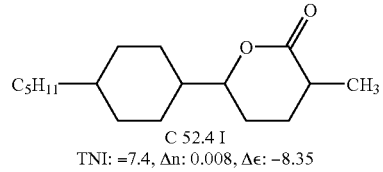<br>C 52.4 I<br>TNI: =7.4, Δn: 0.008, Δε: −8.35 |

-continued
| No. | |
|---|---|
| 7 | 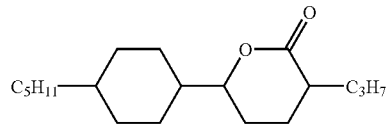 |
| 8 | 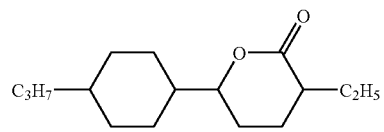 |
| 9 | 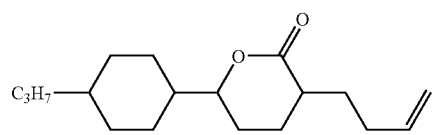 |
| 10 | 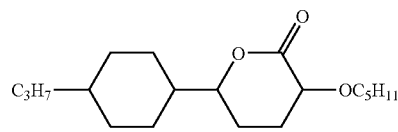 |
| 11 | 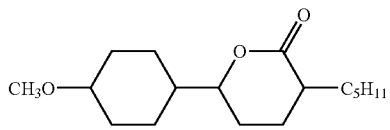 |
| 12 | 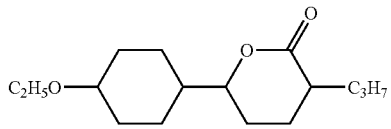 |
| 13 | 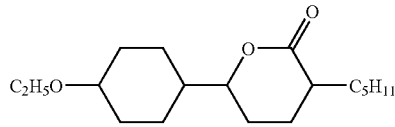 |
| 14 | 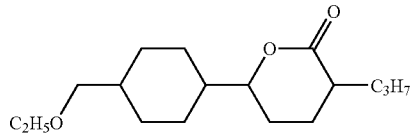 |
| 15 | 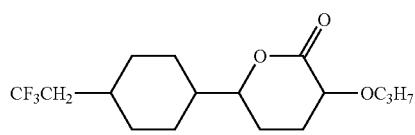 |
| 16 | 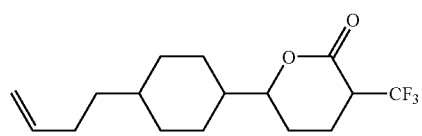 |
| 17 | 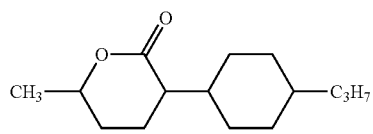 |

-continued
| No. | |
|---|---|
| 18 | 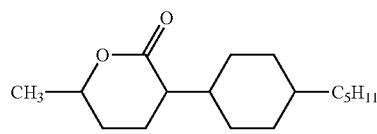 |
| 19 | 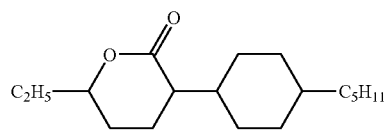 |
| 20 | 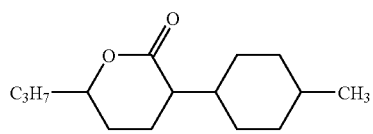 |
| 21 | 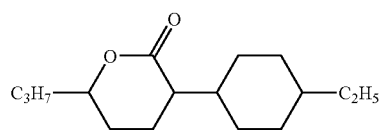 |
| 22 | 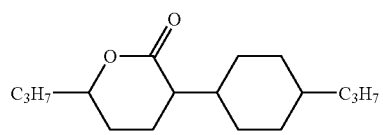 |
| 23 | 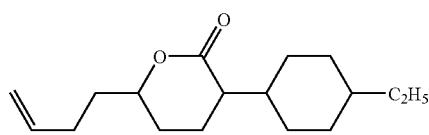 |
| 24 | 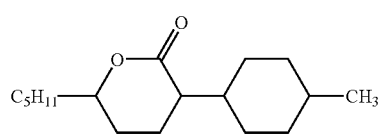 |
| 25 | 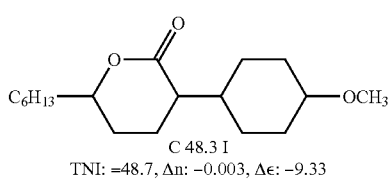<br>C 48.3 I<br>TNI: =48.7, Δn: −0.003, Δε: −9.33 |
| 26 | 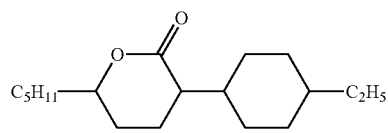 |
| 27 | 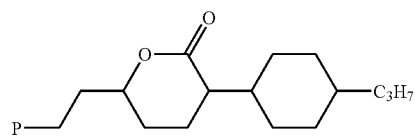 |
| 28 | 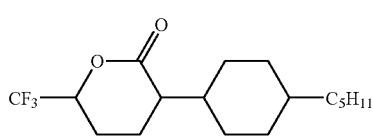 |

| No. | |
|---|---|
| 29 | 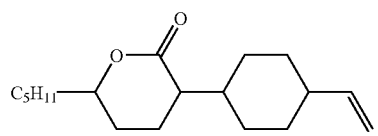 |
| 30 | 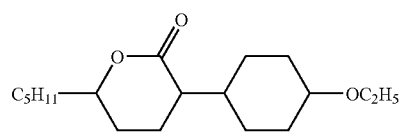 |
| 31 | 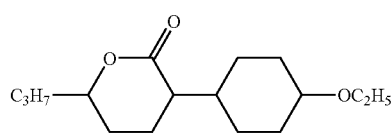 |
| 32 | 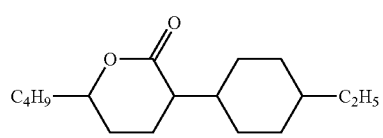 |
| 33 | 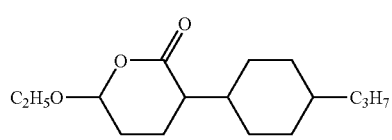 |
| 34 | 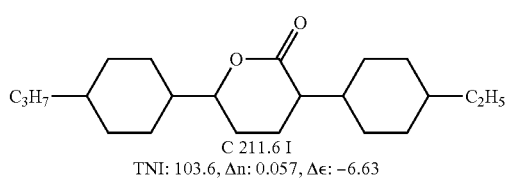<br>C 211.6 I<br>TNI: 103.6, Δn: 0.057, Δε: −6.63 |
| 35 | 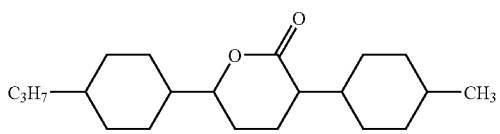 |
| 36 | 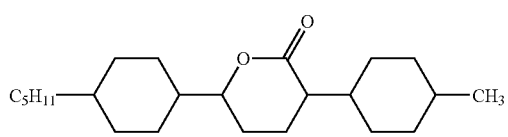 |
| 37 | 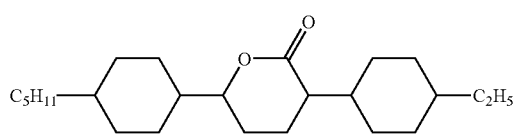 |
| 38 | 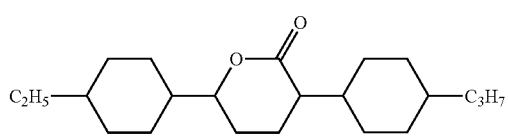 |

| No. | |
|---|---|
| 39 | 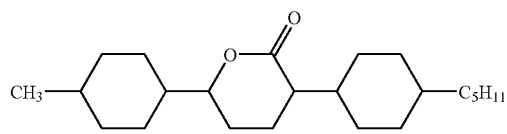 |
| 40 | 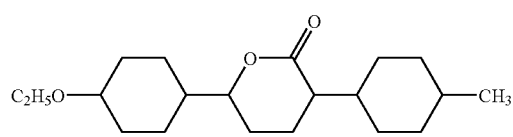 |
| 41 | 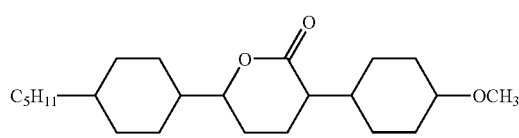 |
| 42 | 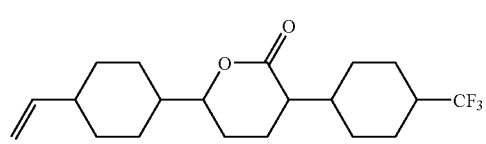 |
| 43 | 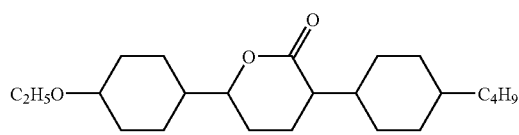 |
| 44 | 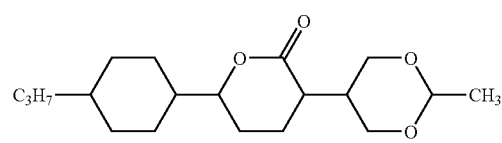 |
| 45 | 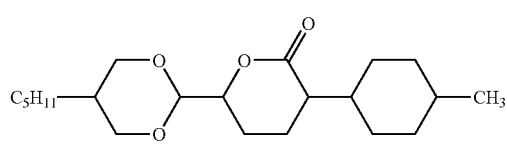 |
| 46 | 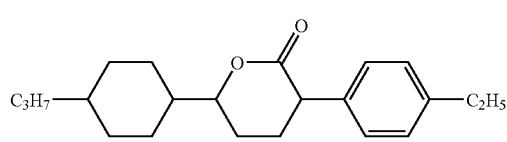<br>C 164.1 I<br>TNI: 55.6, Δn: 0.067, Δε: −8.66 |
| 47 | 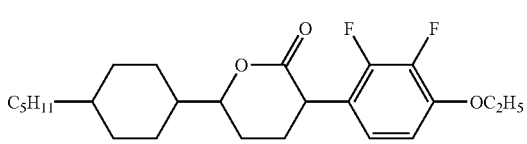 |
| 48 | 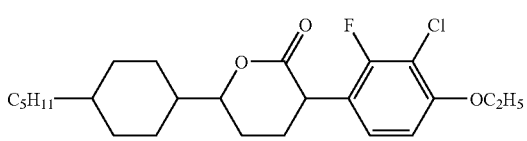 |

| No. | |
|---|---|
| 49 | 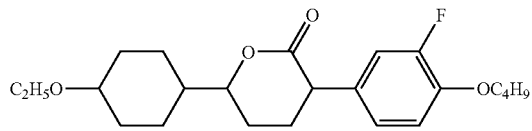 |
| 50 | 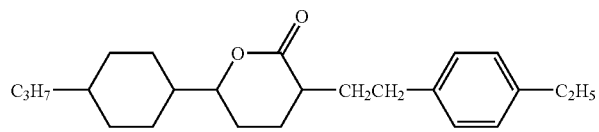
C 188.2 SA 159.7 I
TNI: 68.6, Δn: 0.087, Δε: −7.88 |
| 51 | 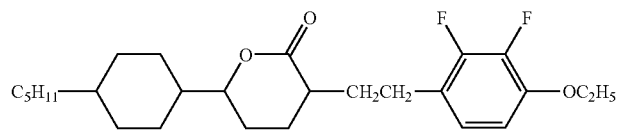 |
| 52 | 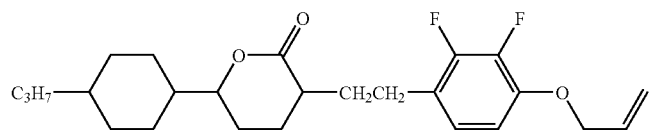 |
| 53 | 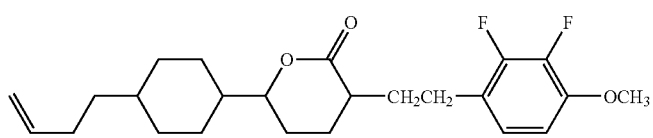 |
| 54 | 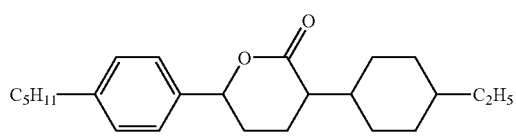 |
| 55 | 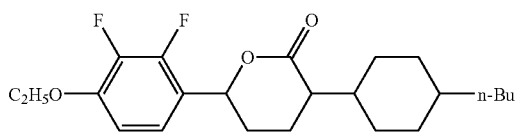 |
| 56 | 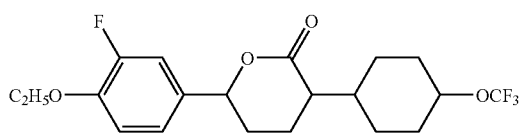 |
| 57 | 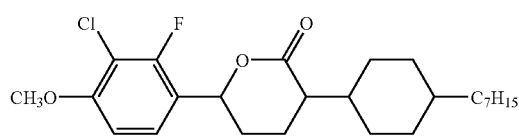 |
| 58 | 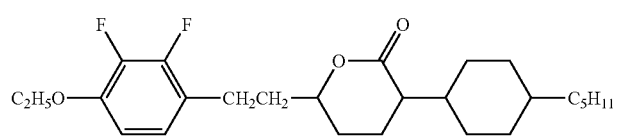 |

-continued
| No. | |
|---|---|
| 59 | 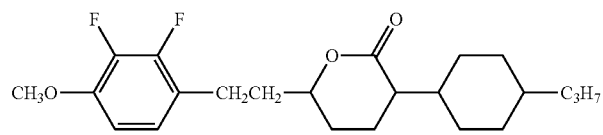 |
| 60 | 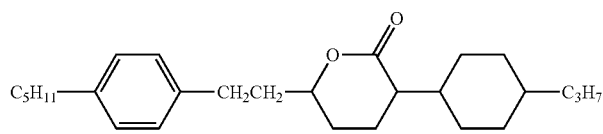 |
| 61 | 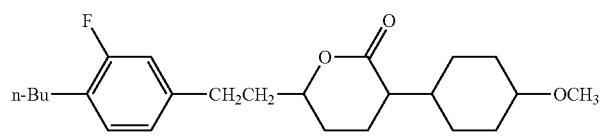 |
| 62 | 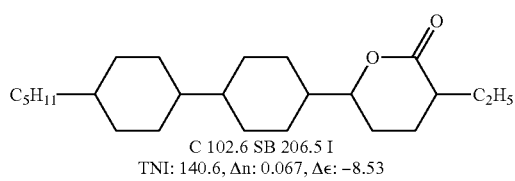<br>C 102.6 SB 206.5 I<br>TNI: 140.6, Δn: 0.067, Δε: −8.53 |
| 63 | 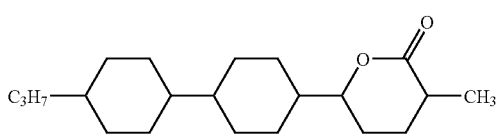 |
| 64 | 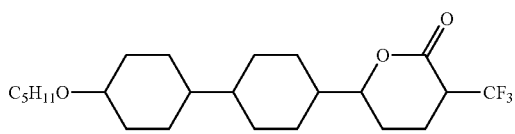 |
| 65 | 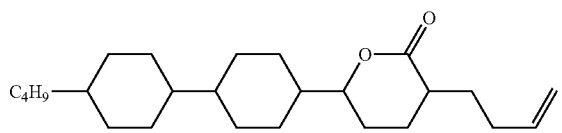 |
| 66 | 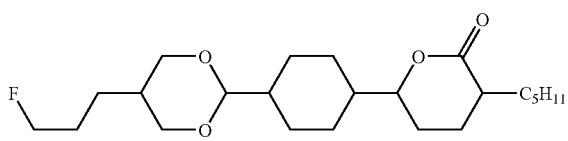 |
| 67 | 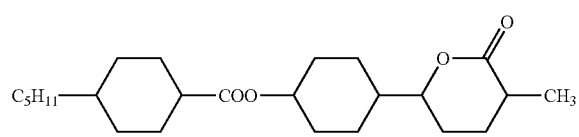 |
| 68 | 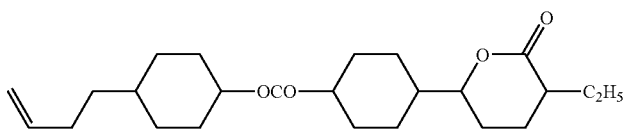 |

| No. | |
|---|---|
| 69 | 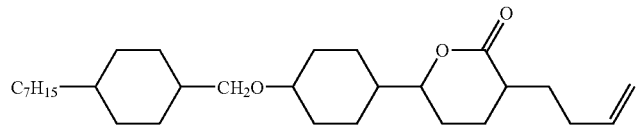 |
| 70 | 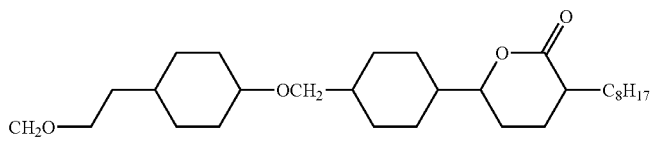 |
| 71 | 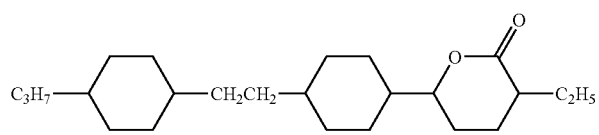 |
| 72 | 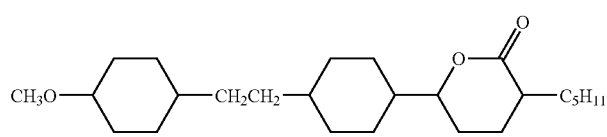 |
| 73 | 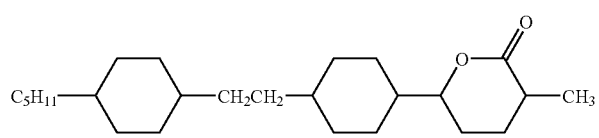 |
| 74 | 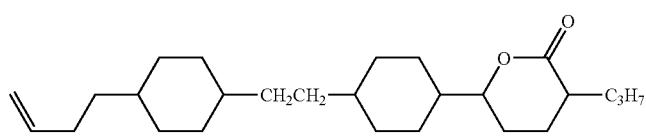 |
| 75 | 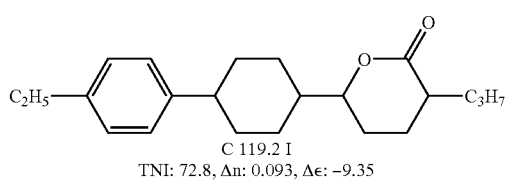<br>C 119.2 I<br>TNI: 72.8, Δn: 0.093, Δε: −9.35 |
| 76 | 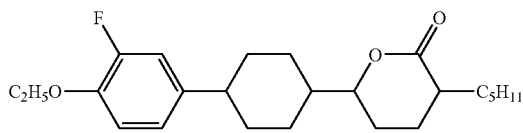 |
| 77 | 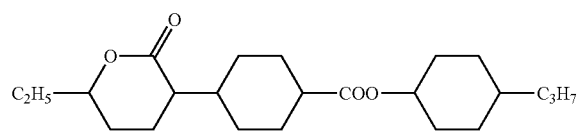 |
| 78 | 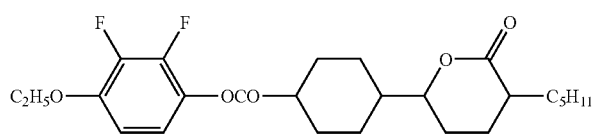 |

-continued
| No. | |
|---|---|
| 79 | 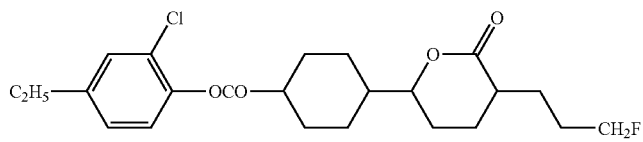 |
| 80 | 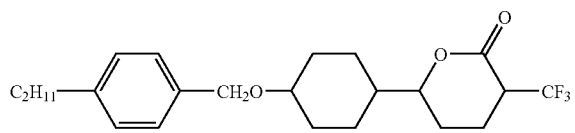 |
| 81 | 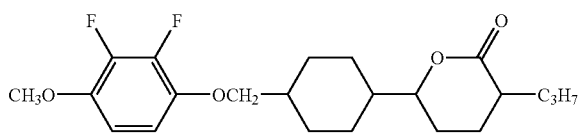 |
| 82 | 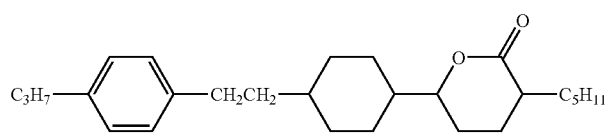 |
| 83 | 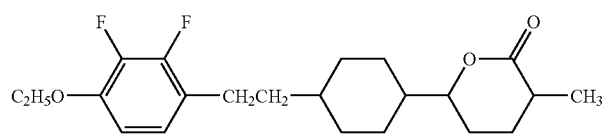 |
| 84 | 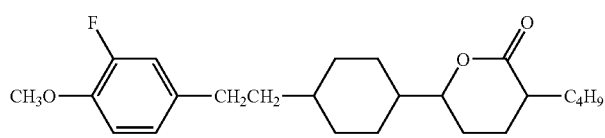 |
| 85 | 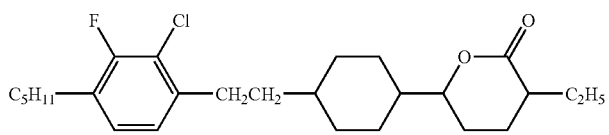 |
| 86 | 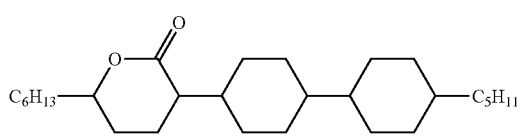<br>C 76.7 SB 196.6 I<br>TNI: 128.6. Δn: 0,051, Δε: −6.62 |
| 87 | 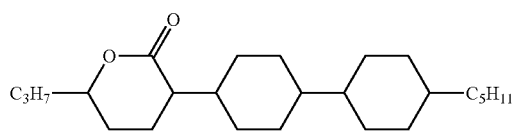 |
| 88 | 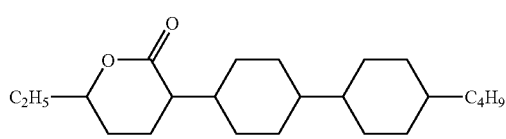 |

| No. | |
|---|---|
| 89 | 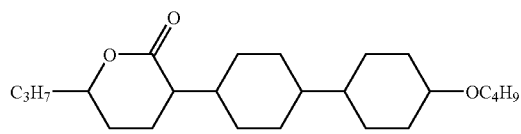 |
| 90 | 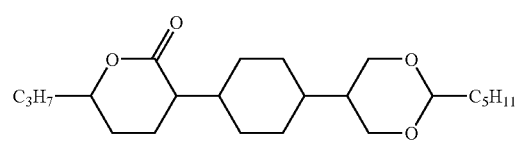 |
| 91 | 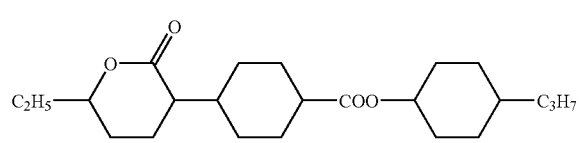 |
| 92 | 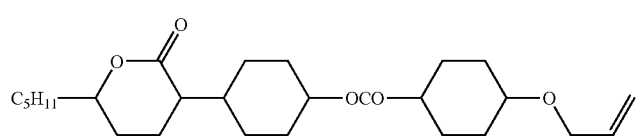 |
| 93 | 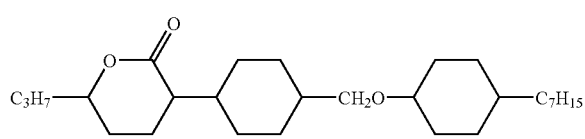 |
| 94 | 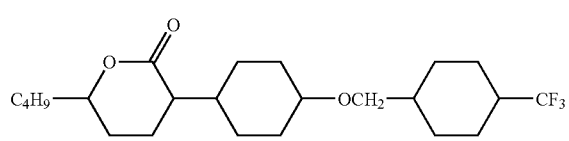 |
| 95 | 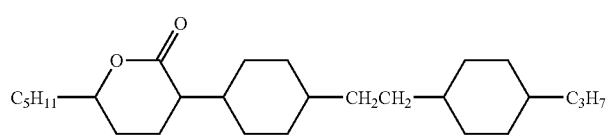 |
| 96 | 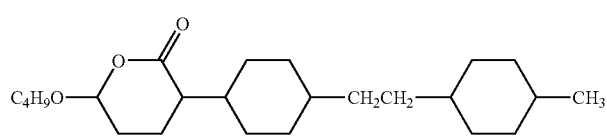 |
| 97 | 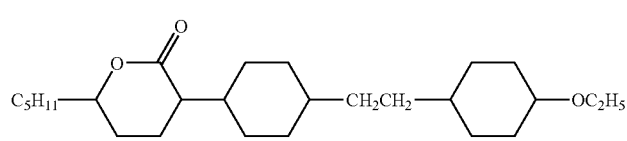 |
| 98 | 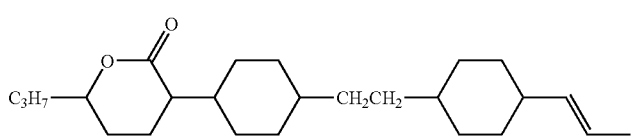 |
| 99 | 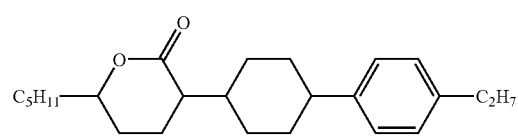 |

-continued
| No. | |
|---|---|
| 100 | 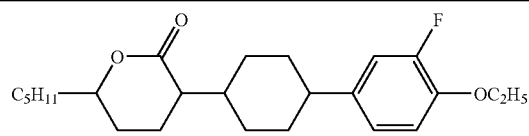 |
| 101 | 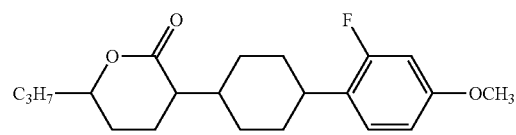 |
| 102 | 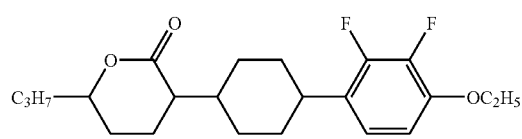 |
| 103 | 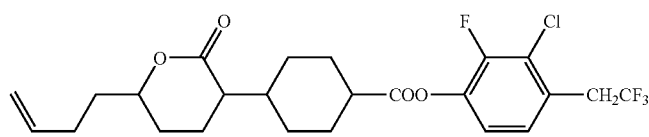 |
| 104 | 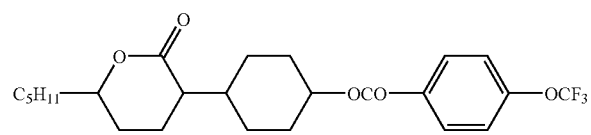 |
| 105 | 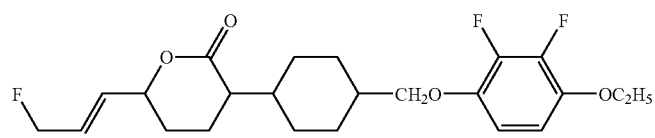 |
| 106 | 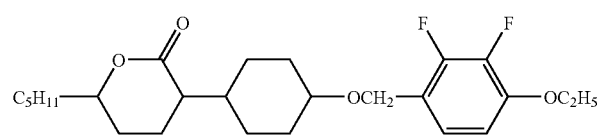 |
| 107 | 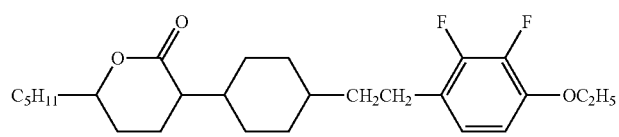 |
| 108 | 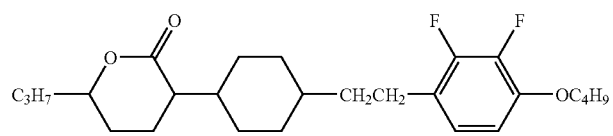 |
| 109 | 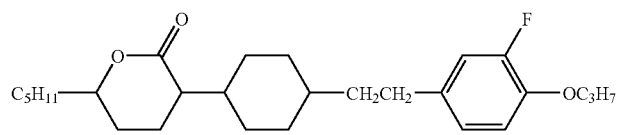 |
| 110 | 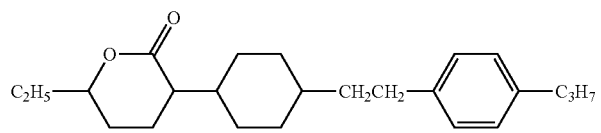 |

-continued
| No. | |
|---|---|
| 111 | 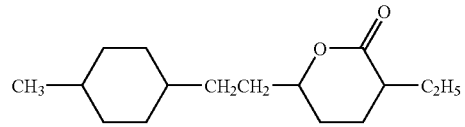 |
| 112 | 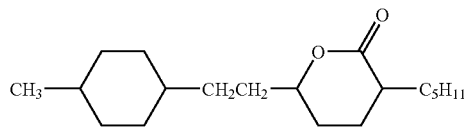 |
| 113 | 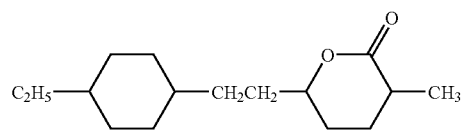 |
| 114 | 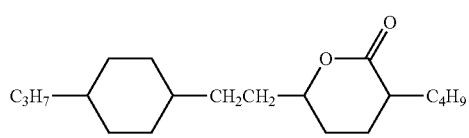 |
| 115 | 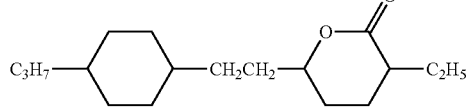 |
| 116 | 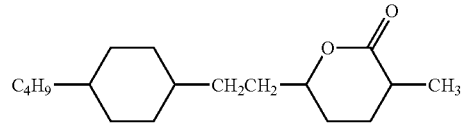 |
| 117 | 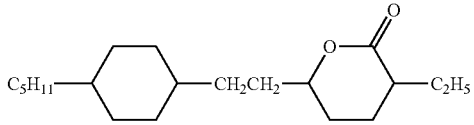 |
| 118 | 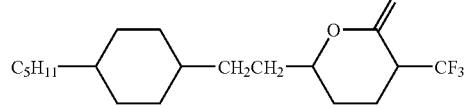 |
| 119 | 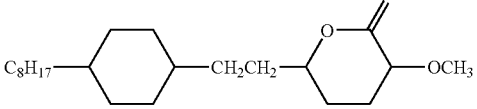 |
| 120 | 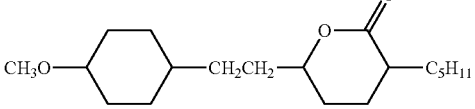 |
| 121 | 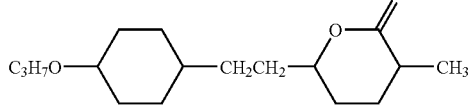 |

-continued
| No. | |
|---|---|
| 122 | 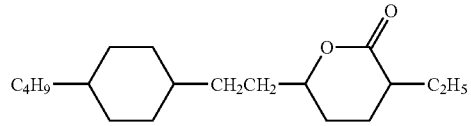 |
| 123 | 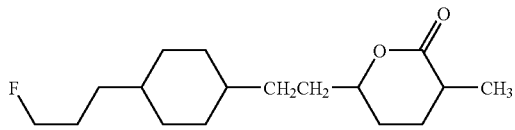 |
| 124 | 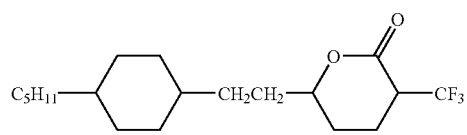 |
| 125 | 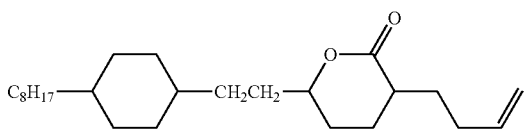 |
| 126 | 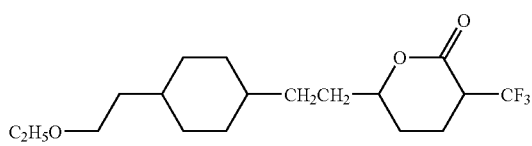 |
| 127 | 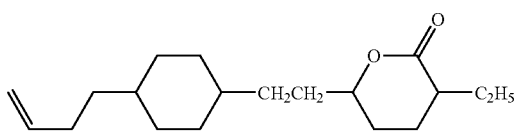 |
| 128 | 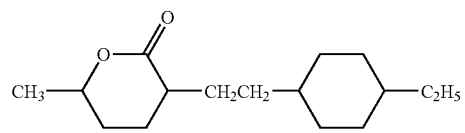 |
| 129 | 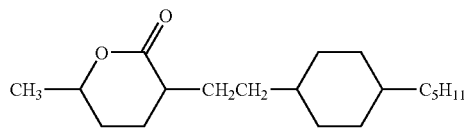 |
| 130 | 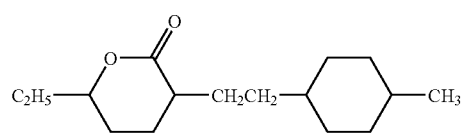 |
| 131 | 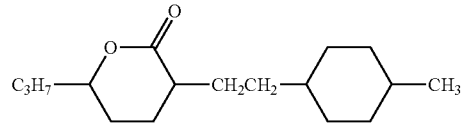 |
| 132 | 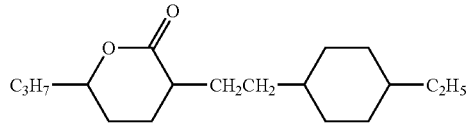 |

-continued
| No. | |
|---|---|
| 133 | 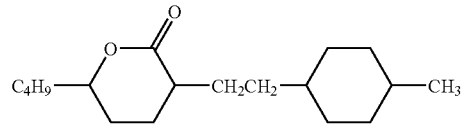 |
| 134 | 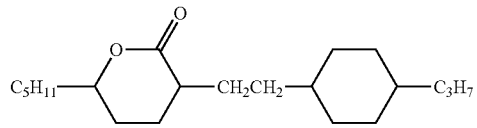 |
| 135 | 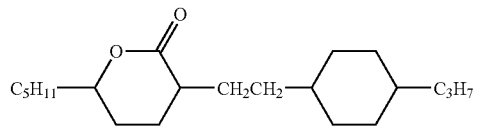 |
| 136 | 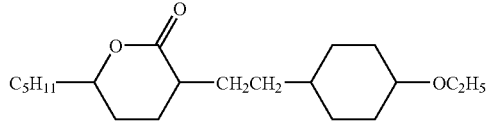 |
| 137 | 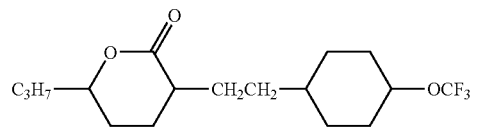 |
| 138 | 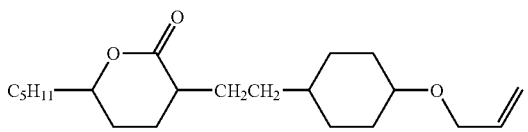 |
| 139 | 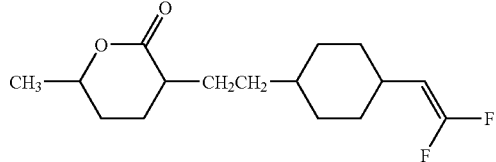 |
| 140 | 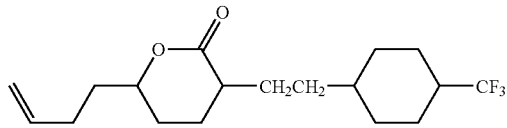 |
| 141 | 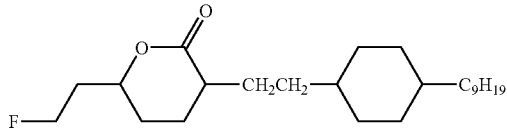 |
| 142 | 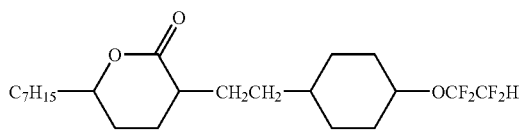 |

|No.||
|---|---|
|143|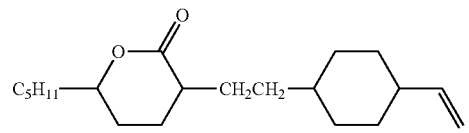|
|144|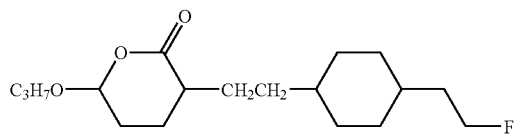|
|145|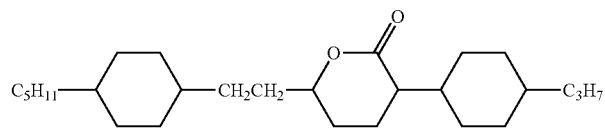|
|146|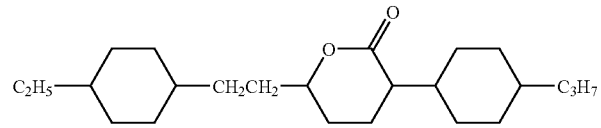|
|147|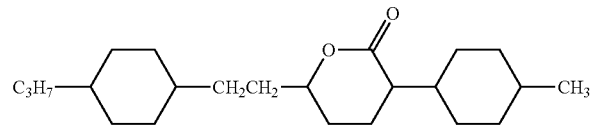|
|148|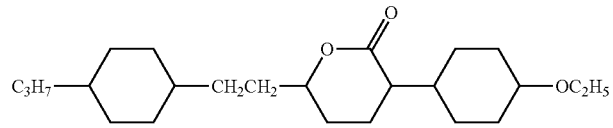|
|149|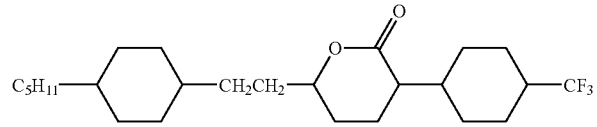|
|150|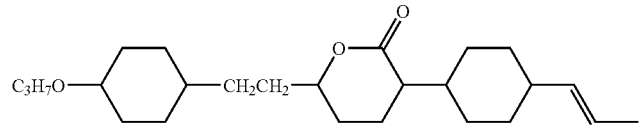|
|151|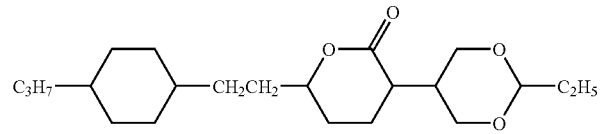|
|152|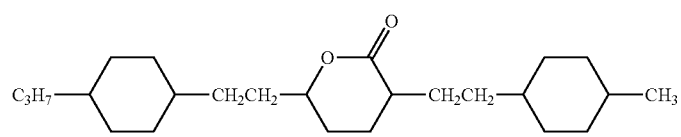|
|153|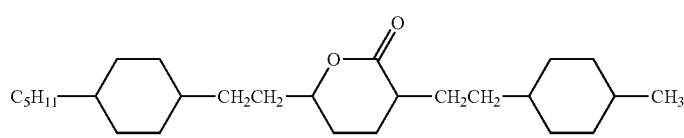|

| No. |
|---|
| 154 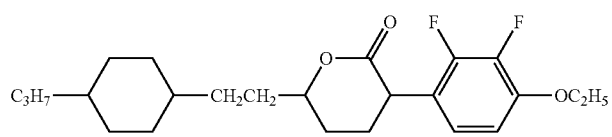 |
| 155 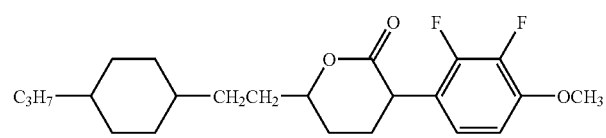 |
| 156 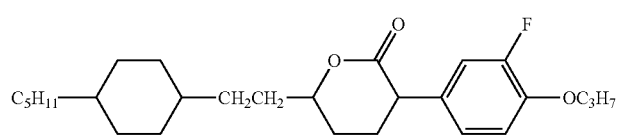 |
| 157 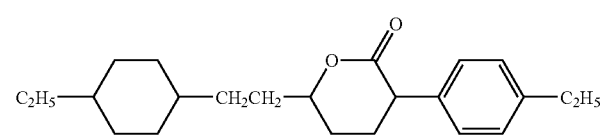 |
| 158 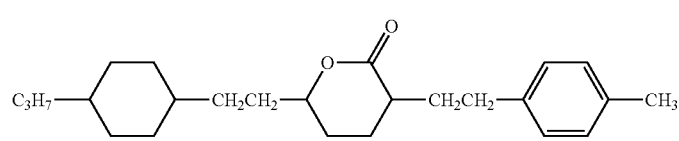 |
| 159 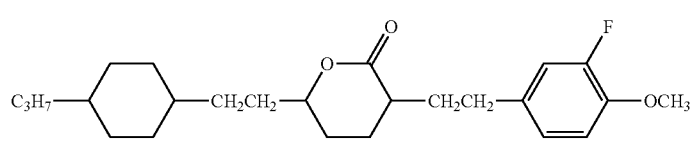 |
| 160 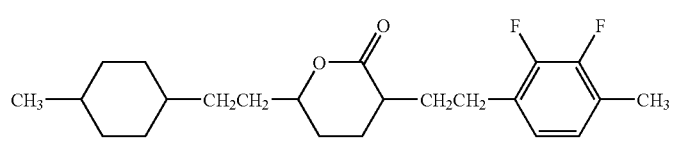 |
| 161 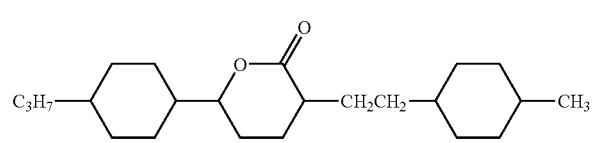 |
| 162 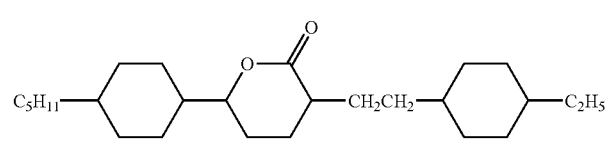 |
| 163 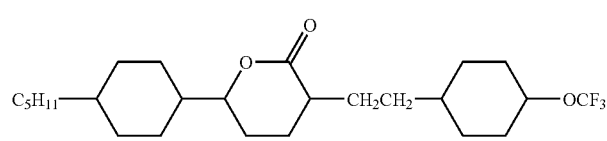 |
| 164 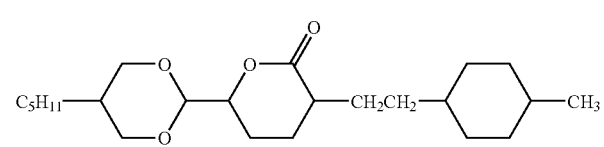 |

-continued
| No. | |
|---|---|
| 165 | 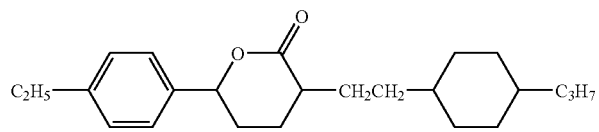 |
| 166 | 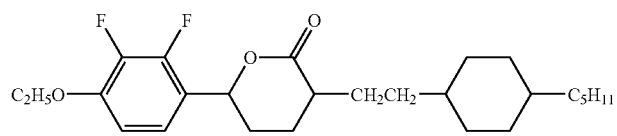 |
| 167 | 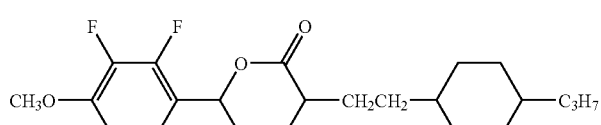 |
| 168 | 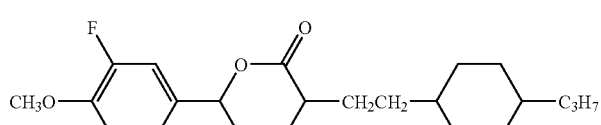 |
| 169 | 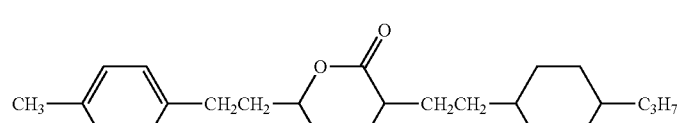 |
| 170 | 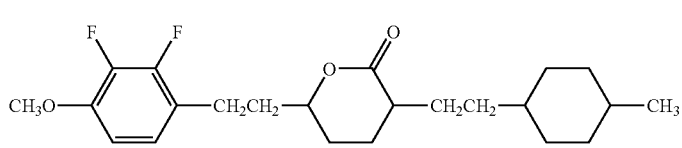 |
| 171 | 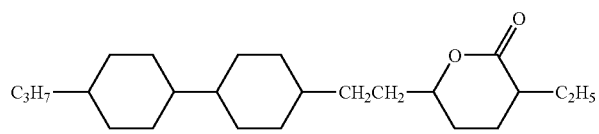 |
| 172 | 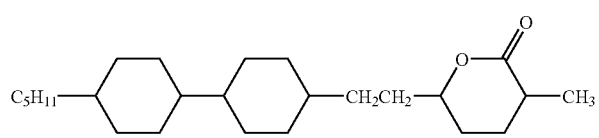 |
| 173 | 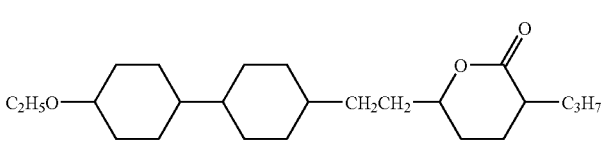 |
| 174 | 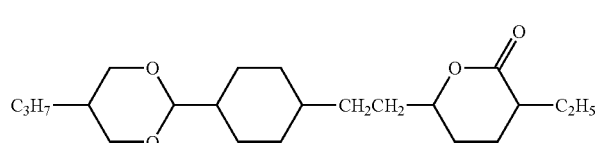 |
| 175 | 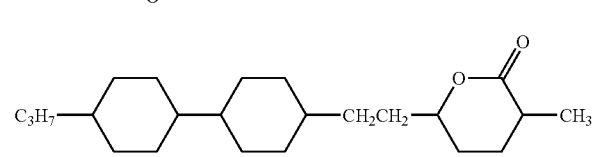 |

| No. | |
|---|---|
| 176 | 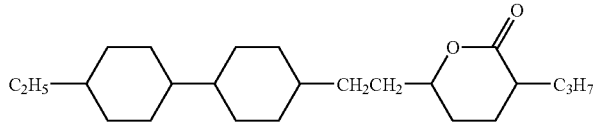 |
| 177 | 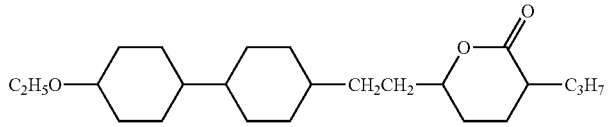 |
| 178 | 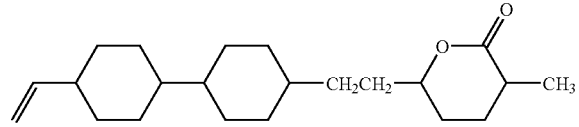 |
| 179 | 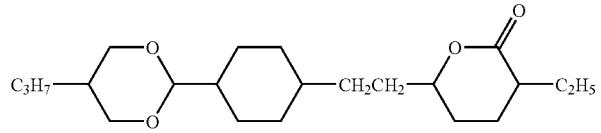 |
| 180 | 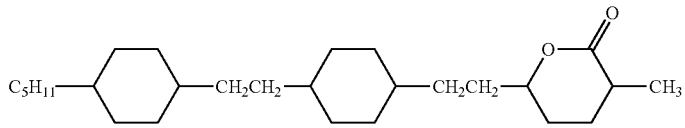 |
| 181 | 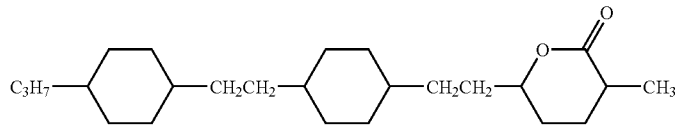 |
| 182 | 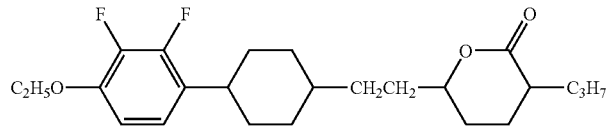 |
| 183 | 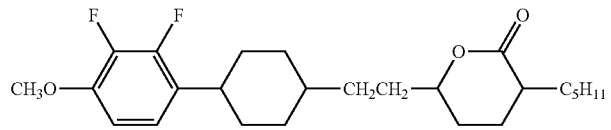 |
| 184 | 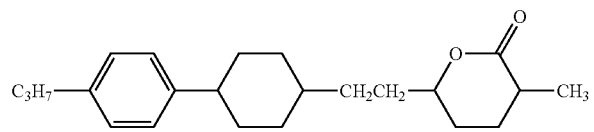 |
| 185 | 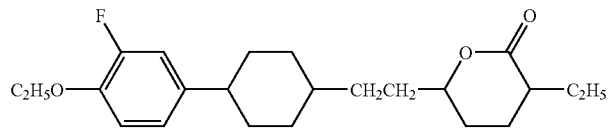 |
| 186 | 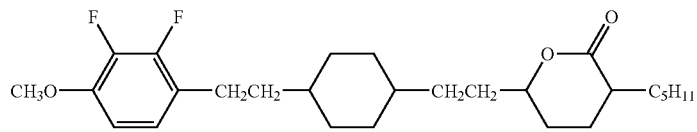 |

| No. | |
|---|---|
| 187 | 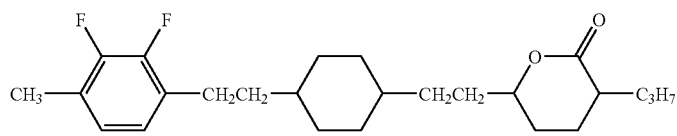 |
| 188 | 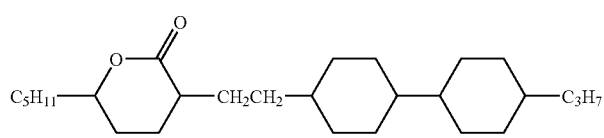 |
| 189 | 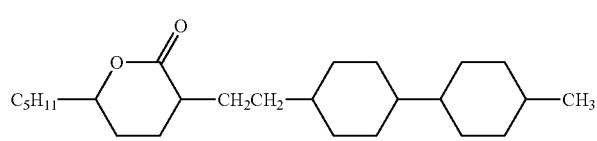 |
| 190 | 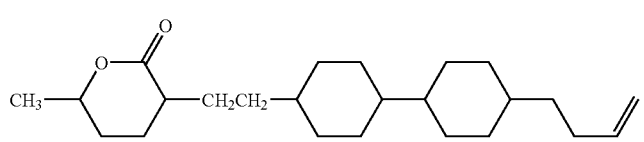 |
| 191 | 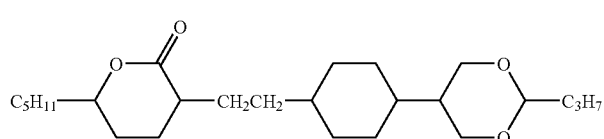 |
| 192 | 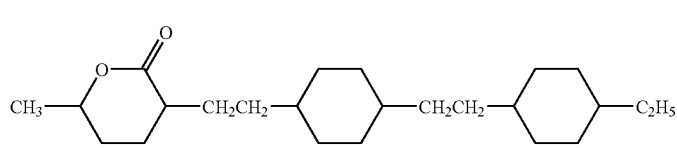 |
| 193 | 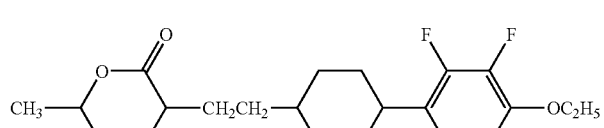 |
| 194 | 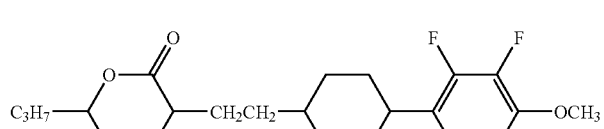 |
| 195 | 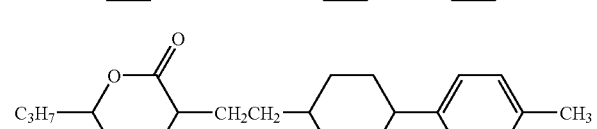 |
| 196 | 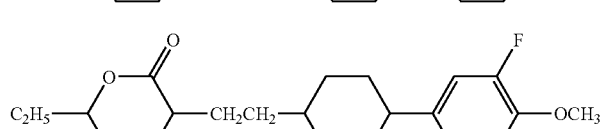 |
| 197 | 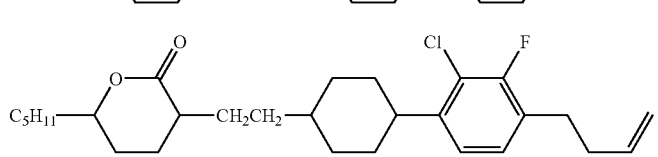 |

-continued

| No. | |
|---|---|
| 198 | 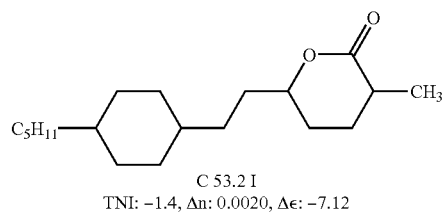 |
| | C 53.2 I |
| | TNI: −1.4, Δn: 0.0020, Δϵ: −7.12 |

Comparative Example 3-(4-Methoxyphenyl)-6-hexyl-tetrahydro-2-pyranone (comparative compound (e)) reported in JP 2004-292774 A/2004 shown below was synthesized.

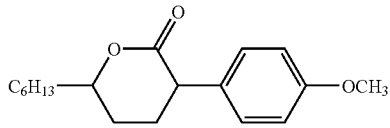
(e)

In order to compare to Example 11, a liquid crystal composition was tried to prepare by mixing 85% by weight of the mother liquid crystals A and 15% by weight of the comparative compound (e), but it was difficult to prepare due to deposition of crystals. The ratio of the comparative compound (e) was then gradually decreased to prepare a liquid crystal composition H containing 95% by weight of the mother liquid crystals A and 5% by weight of the comparative compound (e). The liquid crystal composition H had the following characteristics.

Maximum Temperature ($T_{NI}$)=68.2° C.

Optical Anisotropy (Δn)=0.085

Dielectric Anisotropy (Δ∈)=−1.73

The comparative compound (e) had the following characteristics as calculated by extrapolation with the characteristics of the mother liquid crystals A and the liquid crystal composition H and the mixing ratio of them.

Maximum Temperature ($T_{NI}$)=−53.4° C.

Optical Anisotropy (Δn)=0.045

Dielectric Anisotropy (Δ∈)=−7.24

The liquid crystal composition H (containing 95% by weight of the mother liquid crystals A and 5% by weight of the comparative compound (e)) was crystallized within one day at −10° C., whereas the liquid crystal composition F (containing 85% by weight of the mother liquid crystals A and 15% by weight of the compound No. 25) prepared in Example 11 maintained a nematic phase for 30 days at −10° C. Accordingly, it was found that the compound No. 25 of the invention had better low temperature compatibility than the comparative compound (e).

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A nematic liquid crystal compound represented by any one of formulas (a-1) to (a-6):

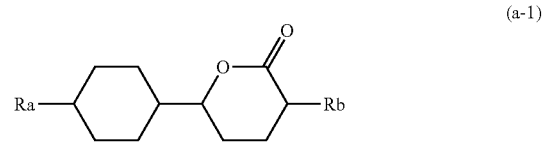
(a-1)

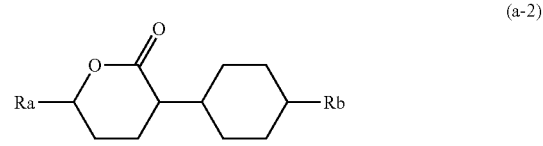
(a-2)

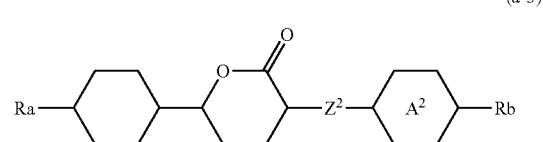
(a-3)

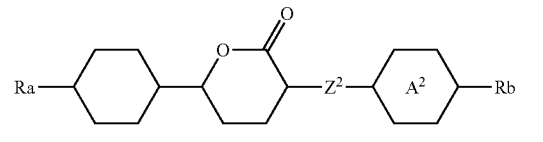
(a-4)

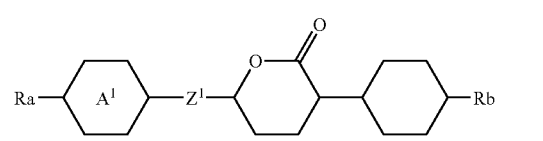
(a-5)

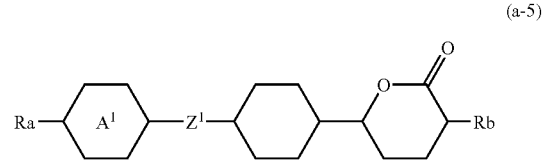
(a-6)

wherein in formulas (a-1) to (a-6), (i) Ra and Rb are each independently alkyl having 1 to 10 carbons, provided that in the alkyl, —CH$_2$— may be replaced by —O—, —(CH$_2$)$_2$— may be replaced by —CH═CH—, and hydrogen may be replaced by a halogen;

(ii) ring $A^1$ and ring $A^2$ are each independently trans-1,4-cyclohexylene or 1,4-phenylene, provided that in these rings hydrogen may be replaced by a halogen, and in the case where the ring is trans-1,4-cyclohexylene, —$CH_2$— may be replaced by —O—, and —$CH_2CH$— may be replaced by —CH=C—; and (iii) $Z^1$ and $Z^2$ are each independently a single bond, —COO—, —OCO—, —$OCH_2$—, —$CH_2O$— or —$CH_2CH_2$—; and wherein in formula (a-3) $Z^2$ is a single bond, —COO—, —OCO—, —$OCH_2$— or —$CH_2O$— when ring $A^2$ is trans-1,4-cyclohexylene; and $Z^2$ is a single bond and ring $A^2$ is trans-1,4-cyclohexylene, 1,3-dioxane-2,5-diyl, 2-fluoro-1,4-phenylene, 3-fluoro-1,4-phenylene, 2-fluoro-3-chloro-1,4-phenylene, 2-chloro-3-fluoro-1,4-phenylene or 2,3-dichloro-1,4-phenylene when Ra is —$C_3H_7$, Rb is —$OC_2H_5$; and wherein in formula (a-4) $Z^1$ is a single bond, —COO—, —OCO—, —$OCH_2$— or —$CH_2O$— when ring $A^1$ is trans-1,4-cyclohexylene.

2. The nematic liquid crystal compound according to claim 1, wherein the compound is represented by formula (a-1) or (a-2); and wherein Ra and Rb are each independently alkyl having approximately 1 to approximately 10 carbons or alkoxy having approximately 1 to approximately 9 carbons.

3. The nematic liquid crystal compound according to claim 1, wherein the compound is represented by formula (a-1) or (a-2); and wherein Ra and Rb are each independently alkyl having approximately 1 to approximately 10 carbons.

4. The nematic liquid crystal compound according to claim 1, wherein the compound is represented by formula (a-3), (a-4), (a-5) or (a-6); and wherein $Z^1$ or $Z^2$ is a single bond.

5. The nematic liquid crystal compound according to claim 1, wherein the compound is represented by formula (a-3), (a-4), (a-5) or (a-6); and wherein ring $A^1$ or ring $A^2$ is 1,4-cyclohexylene.

6. The nematic liquid crystal compound according to claim 1, wherein the compound is represented by formula (a-3), (a-4), (a-5) or (a-6); wherein $Z^1$ or $Z^2$ is a single bond; and wherein ring $A^1$ or ring $A^2$ is 1,4-cyclohexylene.

7. The nematic liquid crystal compound according to claim 1, wherein the compound is represented by formula (a-3), (a-4), (a-5) or (a-6); wherein Ra and Rb are independently alkyl having approximately 1 to approximately 10 carbons; wherein $Z^1$ or $Z^2$ is a single bond; and wherein ring $A^1$ or ring $A^2$ is 1,4-cyclohexylene.

8. The nematic liquid crystal compound according to claim 1, wherein the compound is represented by formula (a-3), (a-4), (a-5) or (a-6); and wherein ring $A^1$ or ring $A^2$ is 1,4-phenylene, arbitrary hydrogen of which may be replaced by a halogen.

9. The nematic liquid crystal compound according to claim 1, wherein the compound is represented by formula (a-3), (a-4), (a-5) or (a-6), wherein $Z^1$ or $Z^2$ is a single bond; and wherein ring $A^1$ or ring $A^2$ is 1,4-phenylene, arbitrary hydrogen of which may be replaced by a halogen.

10. The nematic liquid crystal compound according to claim 1, wherein the compound is represented by formula (a-3), (a-4), (a-5) or (a-6), wherein Ra and Rb are each independently hydrogen or alkyl having approximately 1 to approximately 10 carbons; wherein $Z^1$ or $Z^2$ is a single bond; and wherein ring $A^1$ or ring $A^2$ is 1,4-phenylene, arbitrary hydrogen of which may be replaced by a halogen.

11. A nematic liquid crystal composition comprising at least one compound selected from the group of the compound according claim 1.

12. The nematic liquid crystal composition according to claim 11, further comprising at least one compound selected from the group of compounds represented by formulas (1), (2), (3), (4), (5), (6), (7), (8) and (9):

(1)

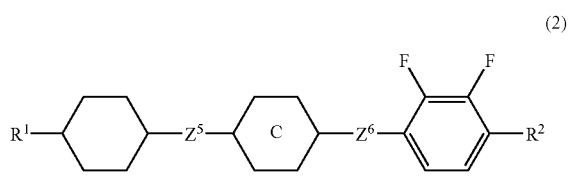
(2)

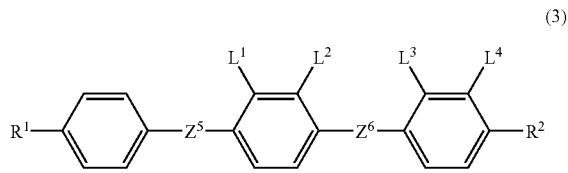
(3)

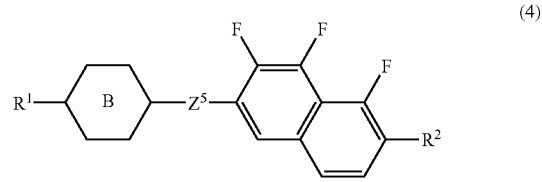
(4)

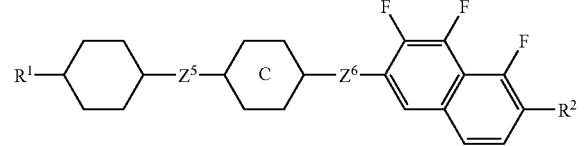
(5)

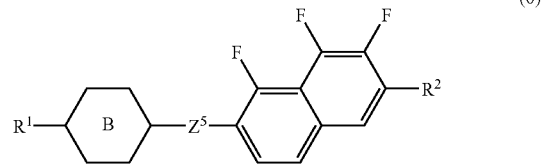
(6)

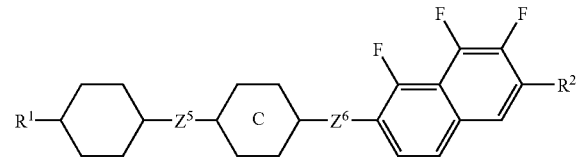
(7)

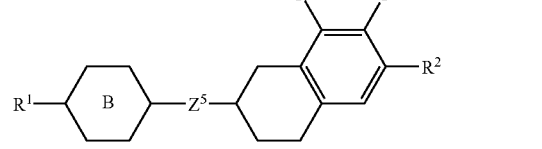
(8)

-continued (9)

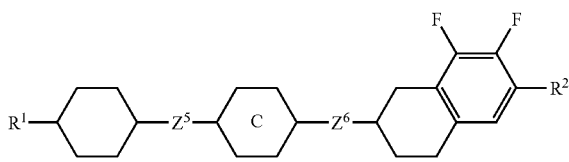

wherein in formulas (1) to (9):

R$^1$ and R$^2$ are each independently alkyl having approximately 1 to approximately 10 carbons, provided that in the alkyl, —CH$_2$— may be replaced by —O—, —(CH$_2$)$_2$— may be replaced by —CH=CH—, and hydrogen may be replaced by fluorine, and R$^1$ may be fluorine;

ring B and ring C are each independently 1,4-cyclohexylene, 1,4-phenylene or decahydro-2,6-naphthylene;

Z$^5$ and Z$^6$ are each independently —(CH$_2$)$_2$—, —COO— or a single bond; and L$^1$, L$^2$, L$^3$ and L$^4$ are each independently hydrogen or fluorine, provided that at least one of L$^1$, L$^2$, L$^3$ and L$^4$ is hydrogen.

13. The nematic liquid crystal composition according to claim 12, further comprising at least one compound selected from the group of compounds represented by formulas (10), (11) and (12):

(10)

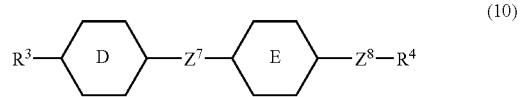

-continued (11)

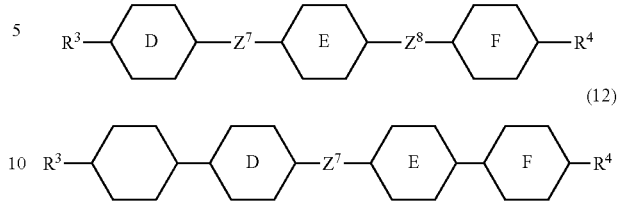

(12)

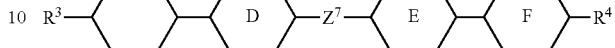

wherein in formulas (10) to (12):

R$^3$ and R$^4$ are each independently alkyl having approximately 1 to approximately 10 carbons, provided that in the alkyl, —CH$_2$— may be replaced by —O—, —(CH$_2$)$_2$— may be replaced by —CH=CH—, and hydrogen may be replaced by fluorine;

ring D, ring E and ring F are each independently 1,4-cyclohexylene, pyrimidine-2,5-diyl, or 1,4-phenylene, arbitrary hydrogen of which may be replaced by fluorine; and Z$^7$ and Z$^8$ are each independently —C≡C—, —COO—, —(CH$_2$)$_2$—, —CH=CH— or a single bond.

14. The nematic liquid crystal composition claim 11, wherein the composition further comprises at least one optically active compound.

15. A liquid crystal display device comprising the nematic liquid crystal composition according to claim 11.

* * * * *